US012280602B2

(12) United States Patent
Yabe et al.

(10) Patent No.: US 12,280,602 B2
(45) Date of Patent: Apr. 22, 2025

(54) LIQUID EJECTION HEAD AND LIQUID EJECTION APPARATUS

(71) Applicant: CANON KABUSHIKI KAISHA, Tokyo (JP)

(72) Inventors: Kenji Yabe, Kanagawa (JP); Naozumi Nabeshima, Tokyo (JP); Soji Kondo, Kanagawa (JP); Koichi Kubo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 18/197,927

(22) Filed: May 16, 2023

(65) Prior Publication Data

US 2023/0406000 A1 Dec. 21, 2023

(30) Foreign Application Priority Data

May 17, 2022 (JP) ................................ 2022-080993

(51) Int. Cl.
*B41J 2/175* (2006.01)
*B41J 2/19* (2006.01)

(52) U.S. Cl.
CPC ............ *B41J 2/17596* (2013.01); *B41J 2/19* (2013.01)

(58) Field of Classification Search
CPC . B41J 2/175; B41J 2/18; B41J 2/17596; B41J 2/19
See application file for complete search history.

(56) References Cited

U.S. PATENT DOCUMENTS

| | | | | |
|---|---|---|---|---|
| 9,902,157 | B2 * | 2/2018 | Okushima | B41J 2/14145 |
| 11,040,536 | B2 * | 6/2021 | Yoneta | B41J 2/1433 |
| 11,597,212 | B2 * | 3/2023 | Yamada | B41J 2/14032 |
| 2014/0292963 | A1 | 10/2014 | Hara et al. | |

FOREIGN PATENT DOCUMENTS

JP 2014-195932 A 10/2014

* cited by examiner

*Primary Examiner* — An H Do
(74) *Attorney, Agent, or Firm* — Venable LLP

(57) ABSTRACT

A liquid ejection head for ejecting a liquid while being scanned in a main scanning direction includes a circulation pump capable of supplying the liquid from a supply channel into a pressure chamber, and collecting the liquid in the pressure chamber through a collection channel and sending the liquid to the supply channel; a first pressure adjustment unit disposed between an outlet channel of the circulation pump and the supply channel; a second pressure adjustment unit disposed between an inlet channel of the circulation pump and the collection channel. At least one of the first pressure adjustment unit or the second pressure adjustment unit is configured such that pressures with different signs relative to a pressure at rest are generated in response to a forward scan and a backward scan in the main scanning direction.

16 Claims, 30 Drawing Sheets

(AT REST)

CARRIAGE SCANNING DIRECTION (BACKWARD)

(IN CARRIAGE SCAN)

CARRIAGE SCANNING DIRECTION (FORWARD)

(IN CARRIAGE SCAN)

LIQUID EJECTION HEAD AND LIQUID EJECTION APPARATUS

BACKGROUND OF THE INVENTION

Field of the Invention

The present disclosure relates to a liquid ejection head and a liquid ejection apparatus including a liquid ejection head.

Description of the Related Art

Circulation-type liquid ejection apparatuses have been known which circulate a liquid between a liquid ejection head and a liquid storage unit to discharge bubbles in channels and to suppress thickening of an ink in the vicinities of ejection ports. The circulation-type liquid ejection apparatuses include ones which circulate a liquid between a liquid ejection head and the main body by using a main body-side pump provided outside the liquid ejection head, and ones which circulate a liquid inside a liquid ejection head by using a pump provided inside the liquid ejection head.

Japanese Patent Laid-Open No. 2014-195932 (hereinafter referred to as Document 1) discloses a liquid ejection apparatus in which a piezoelectric circulation pump is mounted in a liquid ejection head to circulate an ink inside the liquid ejection head. In the configuration of Document 1, the ink supplied to a pressure control mechanism from the circulation pump is then supplied to pressure chambers through ink supply channels, and the ink not ejected is collected to the circulation pump through ink collection channels.

In Document 1, the ink supplied to the pressure chambers is only the ink supplied from the pressure control mechanism through the ink supply channels. That is, the ink is never supplied to the pressure chambers by backing up through the ink collection channels. This is because the circulation pump, which circulates the ink, is equipped with a check valve and the configuration is therefore such that the ink is circulated only in one direction through the circulation channel. Thus, in a case where bubbles accumulate in channels, for example, it is difficult to reduce the effect of the accumulated bubbles. This leads to a possibility of lowering the ejection stability.

SUMMARY OF THE INVENTION

A liquid ejection head according to an aspect of the present disclosure is a liquid ejection head for ejecting a liquid while being scanned in a main scanning direction, including: an ejection element configured to generate a pressure for ejecting the liquid in a pressure chamber; a supply channel through which the liquid is supplied to the pressure chamber; a collection channel connected to the supply channel through the pressure chamber and through which the liquid is collected from the pressure chamber; a circulation pump capable of supplying the liquid from the supply channel into the pressure chamber, and collecting the liquid in the pressure chamber through the collection channel and sending the liquid to the supply channel; a first pressure adjustment unit disposed between an outlet channel of the circulation pump and the supply channel and configured to adjust a pressure in the supply channel; a second pressure adjustment unit disposed between an inlet channel of the circulation pump and the collection channel and configured to adjust a pressure in the collection channel; and a bypass channel through which the first pressure adjustment unit and the second pressure adjustment unit communicate with each other. At least one of the first pressure adjustment unit or the second pressure adjustment unit is configured such that pressures with different signs relative to a pressure at rest are generated in response to a forward scan and a backward scan in the main scanning direction.

Further features of the present invention will become apparent from the following description of exemplary embodiments with reference to the attached drawings.

DESCRIPTION OF THE EMBODIMENTS

Figure 1A:
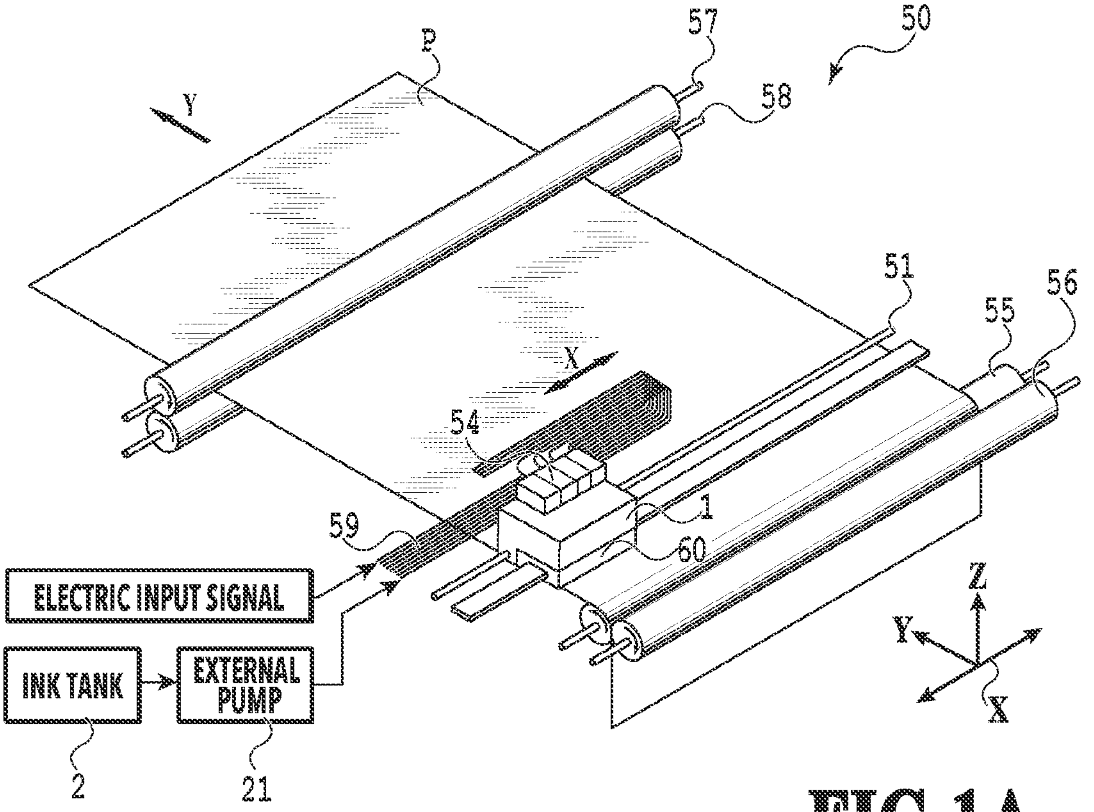
FIGS. 1A and 1B are a perspective view and a block diagram illustrating a liquid ejection apparatus.

A preferred embodiment of the present disclosure will be specifically described with reference to the accompanying drawings. Note that the following embodiment does not limit the contents of the present disclosure, and not all of the combinations of the features described in these embodiments are necessarily essential for the solving means of the present disclosure. Note that identical constituent elements are denoted by the same reference numeral. The present embodiment will be described using an example in which a thermal type ejection element that ejects a liquid by generating a bubble with an electrothermal conversion element is employed as each ejection element that ejects a liquid, but is not limited to this example. The present embodiment is applicable also to liquid ejection heads employing an ejection method in which a liquid is ejected using a piezoelectric element as well as liquid ejection heads employing other ejection methods. Moreover, the pumps, pressure adjustment units, and so on to be described below are not limited to the configurations described in the embodiment and illustrated in the drawings.

First Embodiment

Liquid Ejection Apparatus

FIG. 1A is a view for describing a liquid ejection apparatus, and is an enlarged view of a liquid ejection head of the liquid ejection apparatus and its vicinity. First, a schematic configuration of a liquid ejection apparatus 50 in the present embodiment will be described with reference to FIGS. 1A and 1B. FIG. 1A is a perspective view schematically illustrating the liquid ejection apparatus using the liquid ejection head 1. The liquid ejection apparatus 50 in the present embodiment is configured as a serial inkjet printing apparatus that performs printing on a print medium P by ejecting inks as liquids while scanning the liquid ejection head 1.

The liquid ejection head 1 is mounted on a carriage 60. The carriage 60 reciprocally moves in a main scanning direction (X direction) along a guide shaft 51. The print medium P is conveyed in a sub scanning direction (Y direction) crossing (in this example, perpendicularly crossing) the main scanning direction by conveyance rollers 55, 56, 57, and 58. Note that, in drawings to be referred to below, the Z direction represents a vertical direction and crosses (in this example, perpendicularly crosses) an X-Y plane defined by the X direction and the Y direction. The liquid ejection head 1 is configured to be attachable to and detachable from the carriage 60 by a user.

The liquid ejection head 1 includes circulation units 54 and a later-described ejection unit 3 (see FIGS. 2A and 2B). While a specific configuration will be described later, the ejection unit 3 includes a plurality of ejection ports and energy generation elements (hereinafter referred to as "ejection elements") that generate ejection energy for ejecting liquids from the respective ejection ports.

The liquid ejection apparatus 50 also includes ink tanks 2 serving as ink supply sources and external pumps 21. The inks stored in the ink tanks 2 are supplied to the circulation units 54 through ink supply tubes 59 by driving forces of the external pumps 21.

The liquid ejection apparatus 50 forms a predetermined image on the print medium P by repeating a printing scan involving performing printing by causing the liquid ejection head 1 mounted on the carriage 60 to eject the inks while moving in the main scanning direction, and a conveyance operation involving conveying the print medium P in the sub scanning direction. Note that the liquid ejection head 1 in the present embodiment is capable of ejecting four types of inks, namely black (B), cyan (C), magenta (M), and yellow (Y) inks, and printing full-color images with these inks. Here, the inks ejectable from the liquid ejection head 1 are not limited to the above four types of inks. The present disclosure is also applicable to liquid ejection heads for ejecting other types of inks. In short, the types and number of inks to be ejected from the liquid ejection head are not limited.

Also, in the liquid ejection apparatus 50, a cap member (not illustrated) capable of covering the ejection port surface of the liquid ejection head 1 in which its ejection ports are formed is provided at a position separated from the conveyance path for the print medium P in the X direction. The cap member covers the ejection port surface of the liquid ejection head 1 during a non-print operation, and is used for prevention of drying of the ejection ports, protection of the ejection ports, an ink suction operation from the ejection ports, and so on.

Note that the liquid ejection head 1 illustrated in FIG. 1A represents an example where four circulation units 54 corresponding to the tour types of inks are included in the liquid ejection head 1, but it suffices that the circulation units 54 included correspond to the types of liquids to be ejected. Also, a plurality of circulation units 54 may be included for the same type of liquid. In sum, the liquid ejection head 1 can have a configuration including one or more circulation units. The liquid ejection head 1 may be configured not to circulate all e four types of inks but only circulate at least one of the inks.

Figure 1B:
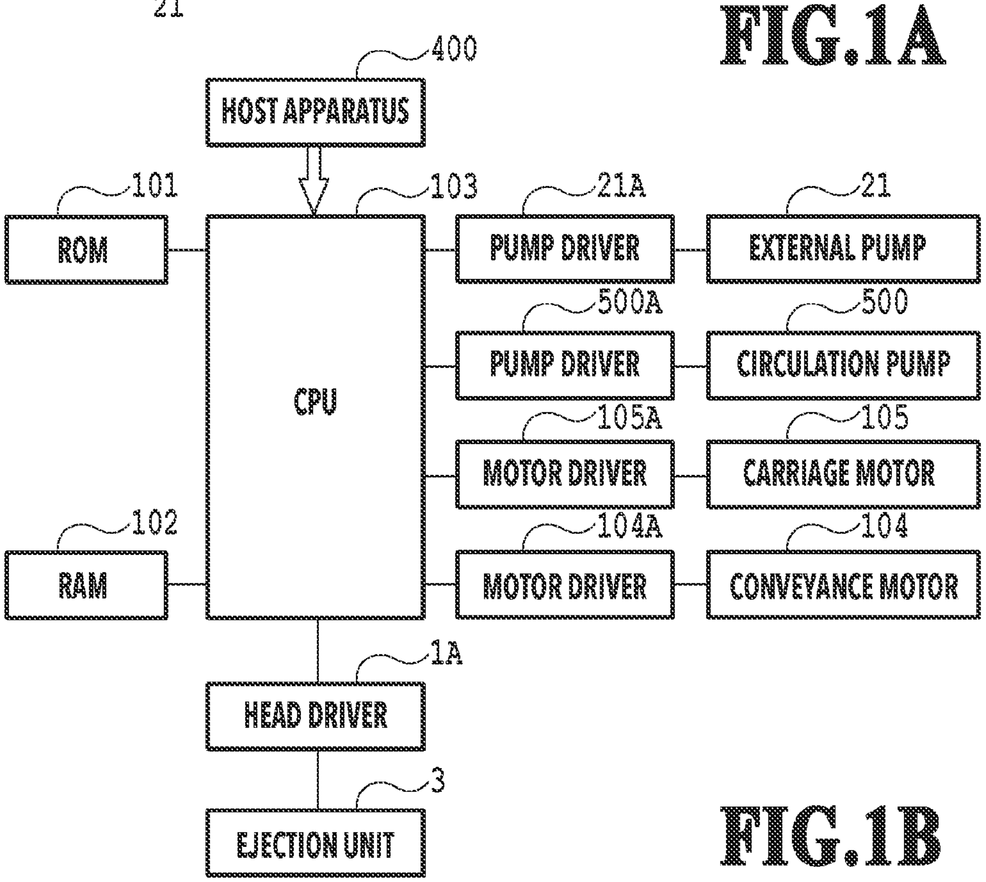

FIG. 1B is a block diagram illustrating a control system of the liquid ejection apparatus 50. A CPU 103 functions as a control unit that controls the operation of each unit of the liquid ejection apparatus 50 based on a program such as a process procedure stored in a ROM 101. A RAM 102 is used as a work area or the like for the CPU 103 to execute processes. The CPU 103 receives image data from a host apparatus 400 outside the liquid ejection apparatus 50 and controls a head driver 1A to control the driving of the ejection elements provided in the ejection unit 3. The CPU 103 also controls drivers for various actuators provided in the liquid ejection apparatus. For example, the CPU 103 controls a motor driver 105A for a carriage motor 105 for moving the carriage 60, a motor driver 104A for a conveyance motor 104 for conveying the print medium P, and the like. Moreover, the CPU 103 controls a pump driver 500A for later-described circulation pumps 500, a pump driver 21A for the external pumps 21, and the like. Note that FIG. 1B illustrates a configuration in which the image data is received from the host apparatus 400 and processes are performed, but the liquid ejection apparatus may perform the processes regardless of whether data is given from the host apparatus 400.

Basic Configuration of Liquid Ejection Head

Figure 2:
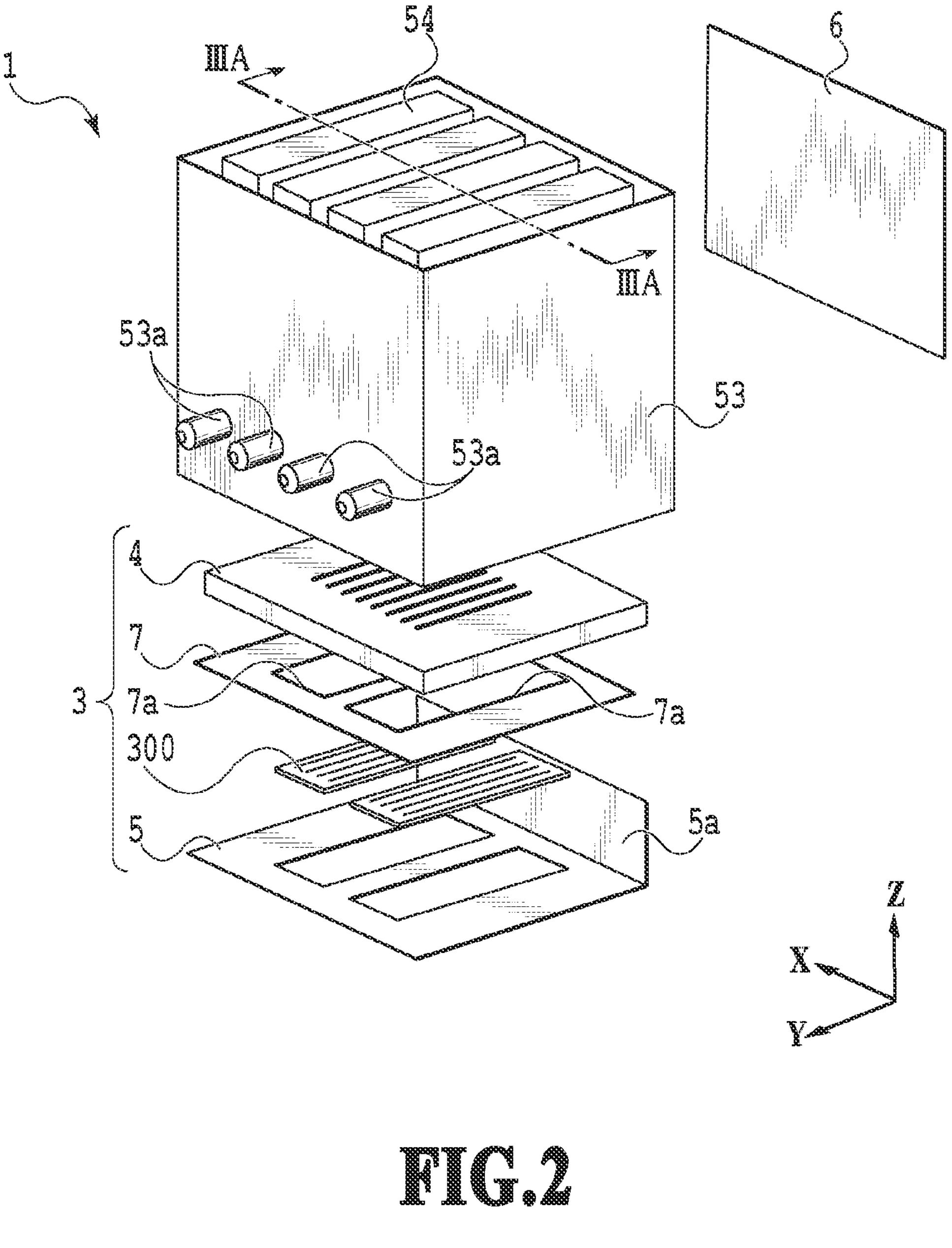
FIG. 2 is an exploded perspective view of a liquid ejection head.

FIG. 2 is an exploded perspective view and a top view of the liquid ejection head 1 in the present embodiment. FIGS.

Figure 3A:
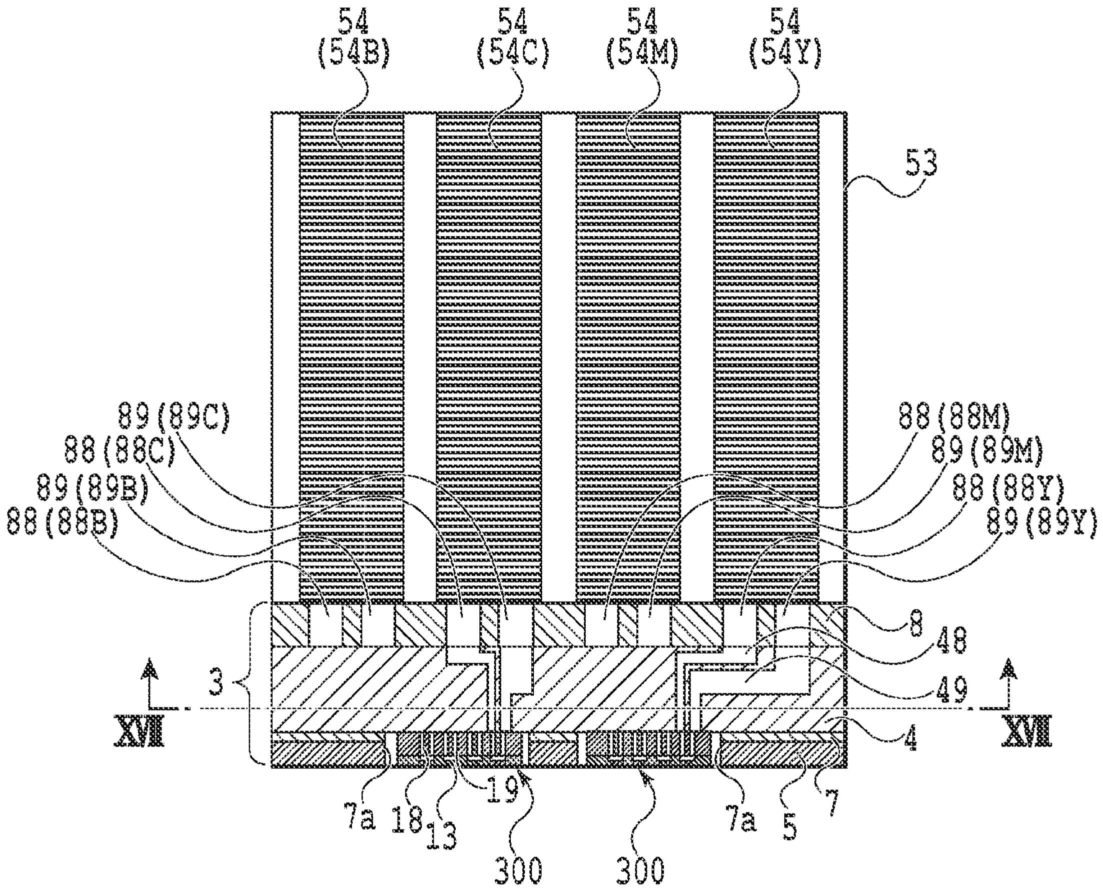
FIGS. 3A and 3B are a vertical cross-sectional view of the liquid ejection head and an enlarged cross-sectional view of an ejection module.
Figure 3B:
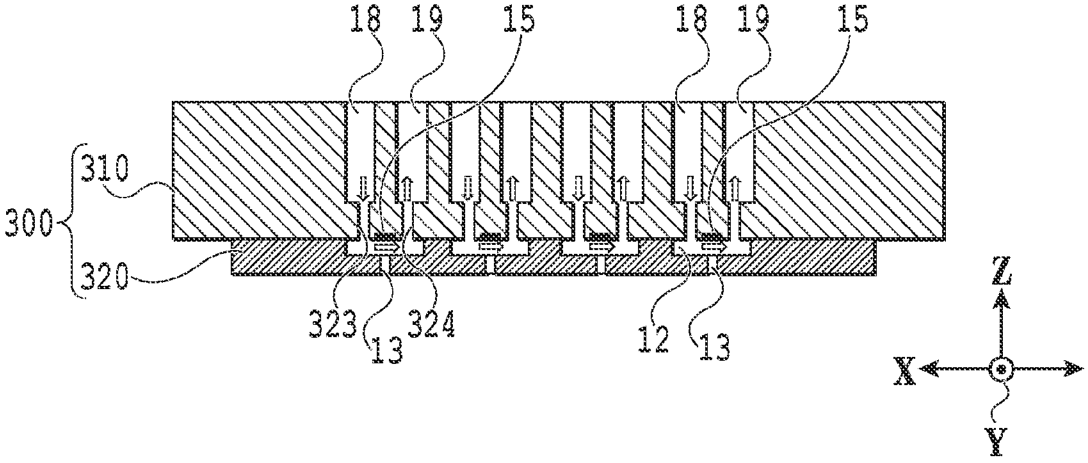

3A and 3B are cross-sectional views of the liquid ejection head 1 illustrated in FIG. 2 along the IIIA-IIIA line. FIG. 3A is a vertical cross-sectional view of the entire liquid ejection head 1, and FIG. 3B is an enlarged view of an ejection module illustrated in FIG. 3A. A basic configuration of the liquid ejection head 1 in the present embodiment will be described below with reference mainly to FIGS. 2 to 3B and to FIG. 1A as appropriate.

As illustrated in FIG. 2, the liquid ejection head 1 includes the circulation units 54 and the ejection unit 3 for ejecting the inks supplied from the circulation units 54 onto the print medium P. The liquid ejection head 1 in the present embodiment is fixedly supported on the carriage 60 of the liquid ejection apparatus 50 by a positioning unit and electric contacts (not illustrated) which are provided to the carriage 60. The liquid ejection head 1 performs printing on the print medium P by ejecting the inks while moving along with the carriage 60 in the main scanning direction (X direction) illustrated in FIG. 1A.

The external pumps 21 connected to the ink tanks 2 serving as ink supply sources include the ink supply tubes 59 (see FIG. 1A). A liquid connector (not illustrated) is provided at the tip of each of these ink supply tubes 59. In the state where the liquid ejection head 1 is mounted to the liquid ejection apparatus 50, the liquid connectors which are provided at the tips of the ink supply tubes 59 and are inlets through which the liquids are introduced are hermetically connected to liquid connector insertion slots 53*a* that are provided on a head housing 53 of the liquid ejection head 1. As a result, ink supply paths extending from the ink tanks 2 to the liquid ejection head 1 through the external pumps 21 are formed. In the present embodiment, four types of inks are used. Hence, four sets each including an ink tank 2, an external pump 21, an ink supply tube 59, and a circulation unit 54 are provided for the respective inks, and four ink supply paths corresponding to the respective inks are formed independently of each other. As described above, the liquid ejection apparatus 50 in the present embodiment includes ink supply systems to which the inks are supplied from the ink rinks 2 provided outside the liquid ejection head 1. Note that the liquid ejection apparatus 50 in the present embodiment does not include ink collection systems that collect the inks in the liquid ejection head 1 into the ink tanks 2. Accordingly, the liquid ejection head 1 includes the liquid connector insertion slots 53*a* to connect the ink supply tubes 59 of the ink tanks 2 but does not include connector insertion slots to connect tubes for collecting the inks in the liquid ejection head 1 into the ink tanks 2. Note that a liquid connector insertion slot 53*a* is provided fix each ink.

In FIG. 3A, reference signs 54B, 54C, 54M, and 54Y denote the circulation units for the black, cyan, magenta, and yellow inks, respectively. The circulation units have substantially the same configuration, and each circulation unit will be denoted as "circulation unit 54" in the present embodiment unless otherwise distinguished.

In FIGS. 2 and 3A, the ejection unit 3 includes two ejection modules 300, the first support member 4, the second support member 7, an electric wiring member (electric wiring tape) 5, and an electric contact substrate 6. As illustrated in FIG. 3B, each ejection module 300 includes a silicon substrate 310 with a thickness of 0.5 mm to 1 mm and a plurality of ejection elements 15 provided in one surface of the silicon substrate 310. The ejection elements 15 in the present embodiment each includes an electrothermal conversion element (heater) that generates thermal energy as ejection energy for ejecting the liquid. Electric power through an electric wiring formed on the silicon substrate 310 by a film forming technique is supplied to each of the ejection elements 15.

Also, a discharge port forming member 320 is formed on a surface of the silicon substrate 310 (the lower surface in FIG. 3B). In the discharge port forming member 320, a plurality of pressure chambers 12 corresponding to the plurality of ejection elements 15 and a plurality of ejection ports 13 to eject the inks are formed by a photolithographic technique. Moreover, common supply channels 18 and common collection channels 19 are formed in the silicon substrate 310. Furthermore, in the silicon substrate 310, there are formed supply connection channels 323 through which the common supply channels 18 and the pressure chambers 12 communicate with one another, and collection connection channels 324 through which the common collection channels 19 and the pressure chambers 12 communicate with one another. In the present embodiment, one ejection module 300 is configured to eject two types of inks. Specifically, in the two ejection modules illustrated in FIG. 3A, the ejection module 300 located on the left side in FIG. 3A ejects the black and cyan inks, and the ejection module 300 located on the right side in FIG. 3A ejects the magenta and yellow inks. Note that this combination is a mere example, and any combination of inks may be employed. The configuration may be such that one ejection module ejects one type of ink or ejects three or more types of inks. The two ejection modules 300 do not have to eject the same number of types of inks. The configuration may be such that only one ejection module 300 is included, or three or more ejection modules 300 are included. Moreover, in the example illustrated in FIGS. 3A and 3B, two ejection port arrays extending in the Y direction are formed for an ink of one color. A pressure chamber 12, a common supply channel 18, and a common collection channel 19 are formed for each of the plurality of ejection ports 13 forming each ejection port array.

Later-described ink supply ports and ink collection ports are formed on the back surface (the upper surface in FIG. 3B) side of the silicon substrate 310. Through the ink supply ports, the inks are supplied into the plurality of common supply channels 18 from ink supply channels 48. Through the ink collection ports, the inks are collected into ink collection channels 49 from the plurality of common collection channels 19.

Note that the ink supply ports and the ink collection ports correspond to openings for supplying and collecting the inks during later-described forward ink circulation, respectively. Specifically, during the forward ink circulation, the inks are supplied from the ink supply ports into the common supply channels 18, and the inks are collected from the common collection channels 19 into the ink collection ports. Note that ink circulation in which the inks are caused to flow in the opposite direction may also be performed. In this case, the inks are supplied from the above-described ink collection ports into the common collection channels 19, and the inks are collected from the common supply channels 18 into the ink supply ports.

As illustrated in FIG. 3A, the back surfaces (the upper surfaces in FIG. 3A) of the ejection modules 300 are adhesively fixed to one surface of the first support member 4 (the lower surface in FIG. 3A). The ink supply channels 48 and the ink collection channels 49, which penetrate from one surface of the first support member 4 to the opposite surface of the first support member 4, are formed in the first support member 4. The openings of the ink supply channels 48 on one side communicate with the above-mentioned ink supply ports in the silicon substrate 310. The openings of the ink collection channels 49 on the one side communicate with the above-mentioned ink collection ports in the silicon substrate 310. Note that the ink supply channels 48 and the ink collection channels 49 are provided independently for each type of ink.

Also, the second support member 7 having openings 7*a* (see FIG. 2) to insert the ejection modules 300 are adhesively fixed to one surface (the lower surface in FIG. 3A) of the first support member 4. The electric wiring member 5 to be electrically connected to the ejection modules 300 is held on the second support member 7. The electric wiring member 5 is a member for applying electric signals for ink ejection to the ejection modules 300. The electric connection parts of the ejection modules 300 and the electric wiring member 5 are sealed with a sealant (not illustrated) to be protected from corrosion by the inks and external impacts.

Also, the electric contact substrate 6 is joined to an end portion 5*a* of the electric wiring member 5 (see FIG. 2) by thermocompression bonding with an anisotropic conductive film (not illustrated), and the electric wiring member 5 and the electric contact substrate 6 are electrically connected to each other. The electric contact substrate 6 has external signal input terminals (not illustrated) for receiving electric signals from the liquid ejection apparatus 50.

Moreover, a joint member 8 (FIG. 3A) is provided between the first support member 4 and the circulation units 54. In the joint member 8, a supply port 88 and a collection port 89 are formed for each type of ink. Through the supply ports 88 and the collection ports 89, the ink supply channels 48 and the ink collection channels 49 in the first support member 4 and channels formed in the circulation units 54 communicate with each other. Incidentally, in FIG. 3A, a supply port 88B and a collection port 89B are for the black ink, and a supply port 88C and a collection port 89C are for the cyan ink. Moreover, a supply port 88M and a collection port 89M are for the magenta ink, and a supply port 88Y and a collection port 89Y are for the yellow ink.

Note that the openings at one end of the ink supply channels 48 and the ink collection channels 49 in the first support member 4 have small opening areas matching the ink supply ports and the ink collection ports in the silicon substrate 310. On the other hand, the openings at the other end of the ink supply channels 48 and the ink collection channels 49 in the first support member 4 have a large shape whose opening area is the same opening area formed in the joint member 8 to match the channels in the circulation units 54. Employing such a configuration can suppress an increase in channel resistance on the ink collected from each collection channel. Note that the shapes of the openings at one end and the other end of the ink supply channels 48 and the ink collection channels 49 are not limited to the above example.

In the liquid ejection head 1 having the above configuration, the inks supplied to the circulation units 54 pass through the supply ports 88 in the joint member 8 and the ink supply channels 48 in the first support member 4 and flow into the common supply channels 18 from the ink supply ports in the ejection modules 300. Thereafter, the inks flow from the common supply channels 18 into the pressure chambers 12 through the supply connection channels 323. Part of the inks flowing into the pressure chambers is ejected from the ejection ports 13 as the ejection elements 15 are driven. The remaining inks not ejected pass through the collection connection channels 324 and the common collection channels 19 from the pressure chambers 12, and flow from the ink collection ports into the ink collection channels 49 in the first support member 4. Then, the inks flowing into the ink collection channels 49 flow into the circulation units 54 through the collection ports 89 in the joint member 8 and are collected.

Constituent Elements of Circulation Units

Figure 4:
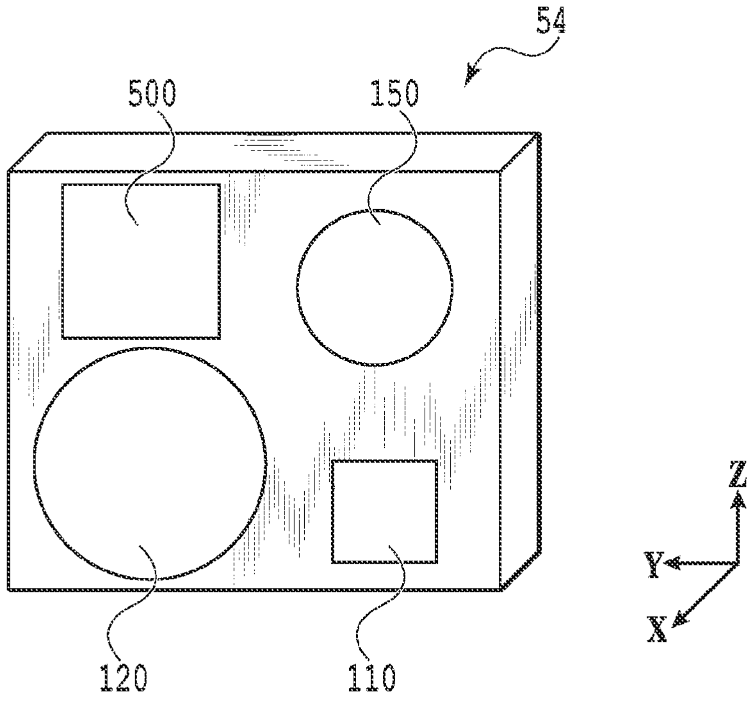
FIG. 4 is a schematic external view of a circulation unit.
Figure 5:
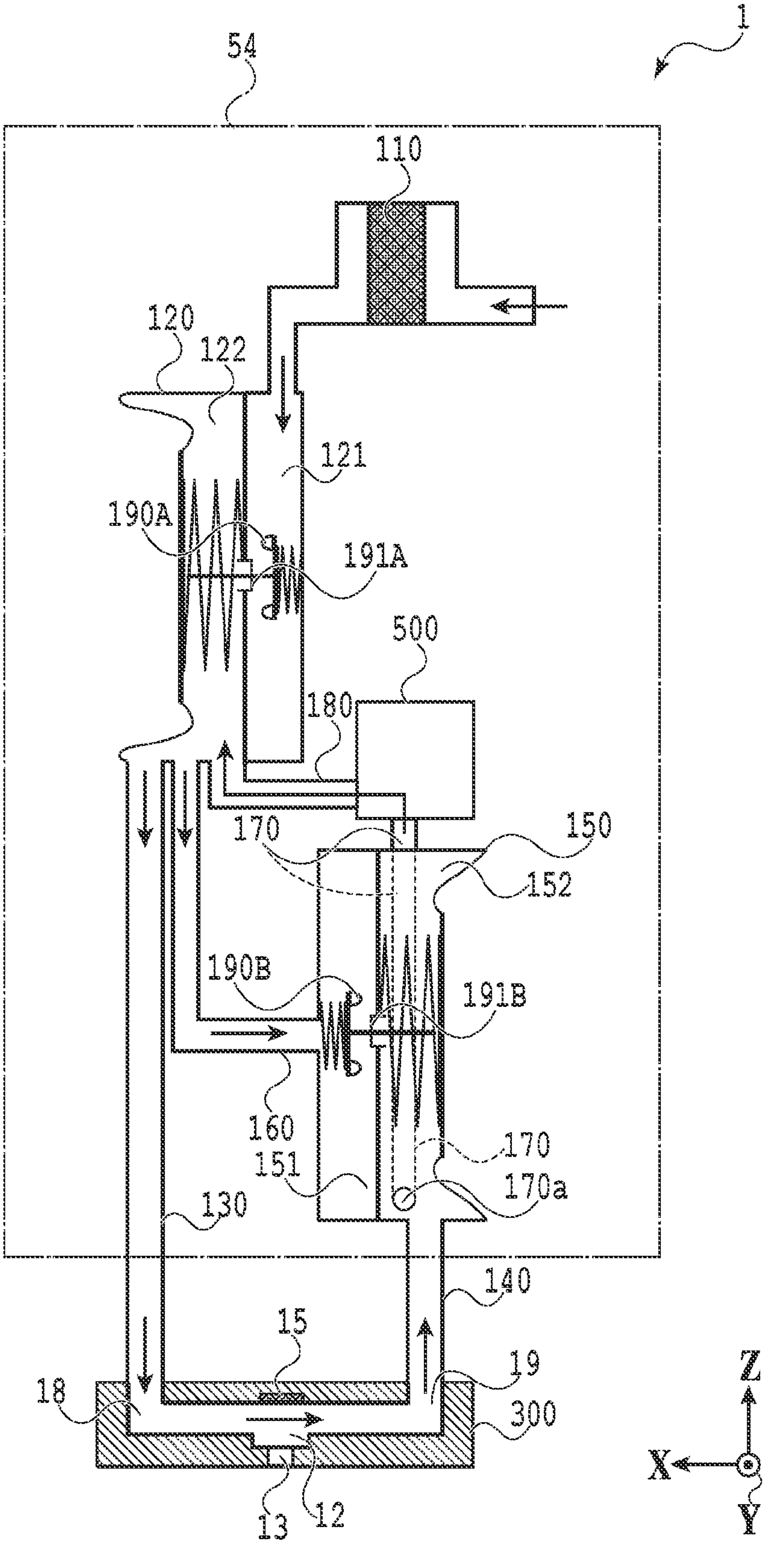
FIG. 5 is a vertical cross-sectional view illustrating a circulation path.
Figure 6:
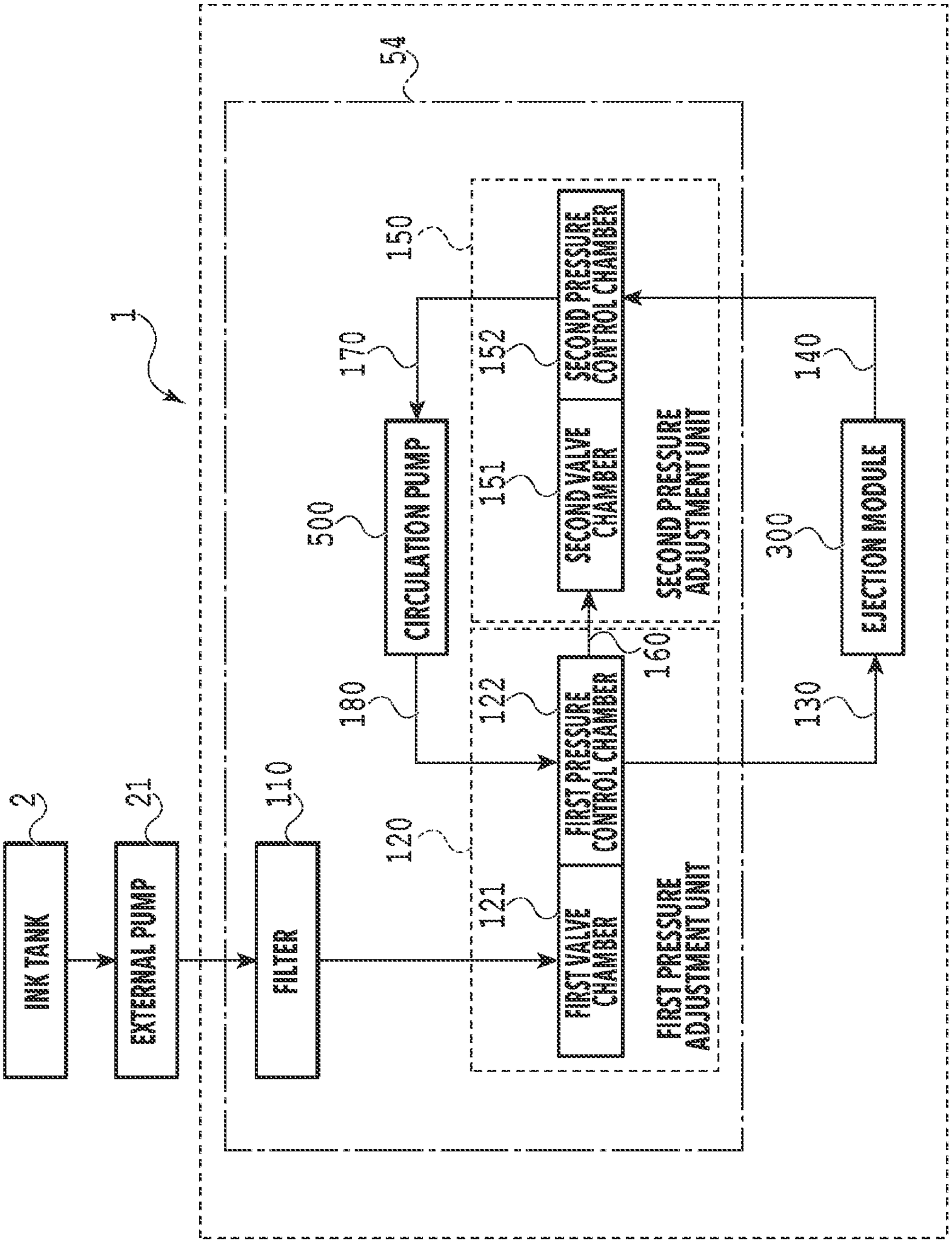
FIG. 6 is a block diagram schematically illustrating the circulation path.

FIG. 4 is a schematic external view of one circulation unit 54 for one type of ink used in a printing apparatus in the present embodiment. A filter 110, the first pressure adjustment unit 120, the second pressure adjustment unit 150, and a circulation pump 500 are disposed in the circulation unit 54. As illustrated in FIGS. 5 and 6, these constituent elements are connected by channels to form a circulation path for supplying and collecting the ink to and from the ejection module 300 in the liquid ejection head 1.

Circulation Path in Liquid Ejection Head

FIG. 5 is a vertical cross-sectional view schematically illustrating the circulation path for one type of ink (ink of one color) formed in the liquid ejection head 1. The relative positions of the components in FIG. 5 (such as the first pressure adjustment unit 120, the second pressure adjustment unit 150, and the circulation pump 500) are simplified for a clearer description of the circulation path. Thus, the relative positions of the components are different from those of the components in FIG. 19 to be mentioned later. Incidentally, FIG. 6 is a block diagram schematically illustrating the circulation path illustrated in FIG. 5. As illustrated in FIGS. 5 and 6, the first pressure adjustment unit 120 includes the first valve chamber 121 and the first pressure control chamber 122. The second pressure adjustment unit 150 includes the second valve chamber 151 and the second pressure control chamber 152. The first pressure adjustment unit 120 is configured such that the controlled pressure therein is higher than that in the second pressure adjustment unit 150. In the present embodiment, these two pressure adjustment units 120 and 150 are used to implement circulation within a certain pressure range inside the circulation path. Also, the configuration is such that the ink flows through the pressure chambers 12 (ejection elements 15) at a flow rate corresponding to the pressure difference between the first pressure adjustment unit 120 and the second pressure adjustment unit 150. A circulation path in the liquid ejection head 1 and a flow of the ink in the circulation path will be described below with reference to FIGS. 5 and 6. Note that the arrows in FIGS. 5 and 6 indicate the flow direction of the ink.

First, how the constituent elements in the liquid ejection head 1 are connected will be described.

The external pump 21, which sends the ink stored in the ink tank 2 (FIG. 6) disposed outside the liquid ejection head 1 to the liquid ejection head 1, is connected to the circulation unit 54 through the ink supply tube 59 (FIG. 1). The filter 110 is disposed in the ink channel located on an upstream side of the circulation unit 54. The ink supply path located downstream of the filter 110 is connected to the first valve chamber 121 of the first pressure adjustment unit 120. The first valve chamber 121 communicates with the first pressure control chamber 122 through a communication port 191A operable and closable by a first valve 190A illustrated in FIG. 5.

The first pressure control chamber 122 is connected to a supply channel 130, a bypass channel 160, and a pump outlet channel 180 of the circulation pump 500. The supply channel 130 is connected to the common supply channels 18 through the above-mentioned ink supply ports provided in the ejection module 300. Also, the bypass channel 160 is connected to the second valve chamber 151 provided in the second pressure adjustment unit 150. The second valve chamber 151 communicates with the second pressure control chamber 152 through a communication port 191B that is opened and closed by a second valve 190B illustrated in FIG. 5. Note that FIGS. 5 and 6 illustrate an example where one end of the bypass channel 160 is connected to the first pressure control chamber 122 of the first pressure adjustment unit 120, and the other end of the bypass channel 160 is connected to the second valve chamber 151 of the second pressure adjustment unit 150. However, the one end of the bypass channel 160 may be connected to the supply channel 130, and the other end of the bypass channel may be connected to the second valve chamber 151.

The second pressure control chamber 152 is connected to a collection channel 140. The collection channel 140 is connected to the common collection channels 19 through the above-mentioned ink collection ports provided in the ejection module 300. Moreover, the second pressure control chamber 152 is connected to the circulation pump 500 through a pump inlet channel 170. Note that reference sign 170*a* in FIG. 5 denotes an inlet port of the pump inlet channel 170.

Next, the flow of the ink in the liquid ejection head 1 having the above configuration will be described. As illustrated in FIG. 6, the ink stored in the ink tank 2 is pressurized by the external pump 21 provided in the liquid ejection apparatus 50, becomes an ink flow at a positive pressure, and is supplied to the circulation unit 54 of the liquid ejection head 1.

The ink supplied to the circulation unit 54 passes through the filter 110 so that foreign substances such as dust and bubbles are removed. The ink then flows into the first valve chamber 121 provided in the first pressure adjustment unit 120. The pressure on the ink decreases due to the pressure loss in a case where the ink passes through the filter 110, but the pressure on the ink is still positive at this point. Thereafter, in a case where the valve 190A is open, the ink flowing into the first valve chamber 121 passes through the communication port 191A and flows into the first pressure control chamber 122. Due to the pressure loss in a case where the ink passes through the communication port 191A, the pressure on the ink flowing into the first pressure control chamber 122 switches from the positive pressure to a negative pressure.

Next, the flow of the ink in the circulation path will be described. The circulation pump 500 operates such that the ink sucked from the pump inlet channel 170 located upstream of the circulation pump 500 is sent to the pump outlet channel 180 located downstream of the circulation pump 500. Thus, as the pump is driven, the ink supplied to the first pressure control chamber 122 flows into the supply channel 130 and the bypass channel 160 along with the ink sent from the pump outlet channel 180. In the present embodiment, while details will be described later, a piezoelectric diaphragm pump using a piezoelectric element attached to a diaphragm as a driving source is used as a circulation pump capable of sending the liquid. The piezoelectric diaphragm pump is a pump that sends a liquid by inputting a driving voltage to a piezoelectric element to change the volume of a pump chamber and alternatively moving two check valves in response to the changes in pressure.

The ink flowing into the supply channel 130 flows from the ink supply ports in the ejection module 300 into the pressure chambers 12 through the common supply channels 18. Part of the ink is ejected from the ejection ports 13 as the ejection elements are driven (generate heat). Also, the remaining ink not used in the ejection flows through the pressure chambers 12 and passes through the common collection channels 19. Thereafter, the ink flows into the collection channel 140 connected to the ejection module 300. The ink flowing into the collection channel 140 flows into the second pressure control chamber 152 of the second pressure adjustment unit 150.

On the other hand, the ink flowing from the first pressure control chamber 122 into the bypass channel 160 flows into the second valve chamber 151, passes through the communication port 191B, and then flows into the second pressure control chamber 152. The ink flowing into the second pressure control chamber 152 through the bypass channel 160 and the ink collected from the collection channel 140 are sucked into the circulation pump 500 through the pump inlet channel 170 as the circulation pump 500 is driven. Then, the inks sucked into the circulation pump 500 are sent to the pump outlet channel 180 and flow into the first pressure control chamber 122 again. Thereafter, the ink flowing from the first pressure control chamber 122 into the second pressure control chamber 152 through the supply channel 130 and the ejection module 300 and the ink flowing into the second pressure control chamber 152 through the bypass channel 160 flow into the circulation pump 500. Then, the inks are sent from the circulation pump 500 to the first pressure control chamber 122. The ink circulation is performed within the circulation path in this manner.

Here, a channel through which the first pressure adjustment unit 120 and the pressure chambers 12 communicate with each other will be referred to as "first channel", and a channel through which the pressure chambers 12 and the circulation pump 500 communicate with each other will be referred to as "second channel". Specifically, the supply channel 130 will be referred to as "first channel", and the collection channel 140, the second pressure adjustment unit 150, and the pump inlet channel 170 will be collectively referred to as "second channel". Note that the second channel does not have to include the second pressure adjustment unit 150 and the pump inlet channel 170. Also, the pump outlet channel 180 will be referred to as "third channel" as well. Thus, in the present embodiment, the liquid flows through the circulation pump 500, the third channel, the first pressure adjustment unit 120, the first channel, the pressure chambers 12, the second channel, and the circulation pump 500 in this order as a circulation path.

As described above, in the present embodiment, the liquids can be circulated through the respective circulation paths formed in the liquid ejection head 1 with the circulation pump 500. This makes it possible to suppress thickening of the inks and deposition of precipitating components of the inks of the color materials in the ejection modules 300. Accordingly, the excellent fluidity of the inks in the ejection modules 300 and excellent ejection characteristics at the ejection ports can be maintained.

Also, the circulation paths in the present embodiment are configured to complete within the liquid ejection head 1. Thus, the length of the circulation paths is significantly short as compared to a case where the inks are circulated between the ink tanks 2 disposed outside the liquid ejection head 1 and the liquid ejection head 1. Accordingly, the inks can be circulated with small circulation pumps.

Moreover, the configuration is such that only channels for supplying the inks are included as the channels connecting between the liquid ejection head 1 and the ink tanks 2. In other words, a configuration that does not require channels for collecting the inks from the liquid ejection head 1 into the ink tanks 2 is employed. Accordingly, only ink supply tubes connecting between the ink tanks 2 and the liquid ejection head 1 are needed, and no ink collection tube is required. The inside of the liquid ejection apparatus 50 therefore has a simpler configuration having less tubes. This can downsize the entire apparatus. Moreover, the reduction in the number of tubes reduces the fluctuations in ink pressure due to the swinging of the tubes caused by main scanning of the liquid ejection head 1. Also, the swinging of the tubes during main scanning of the liquid ejection head 1 increases a driving load on the carriage motor driving the carriage 60. Hence, the reduction of the number of tubes reduces the driving load of the carriage motor, which makes it possible to simplify the main scanning mechanism including the carriage motor and the like. Furthermore, since the inks do not need to be collected into the ink tanks from the liquid ejection head 1, the external pumps 21 can be downsized as well. As described above, according to the present embodiment, it is possible to downsize the liquid ejection apparatus 50 and reduce costs.

Pressure Adjustment Units

Figures 7A, 7B, 7C:
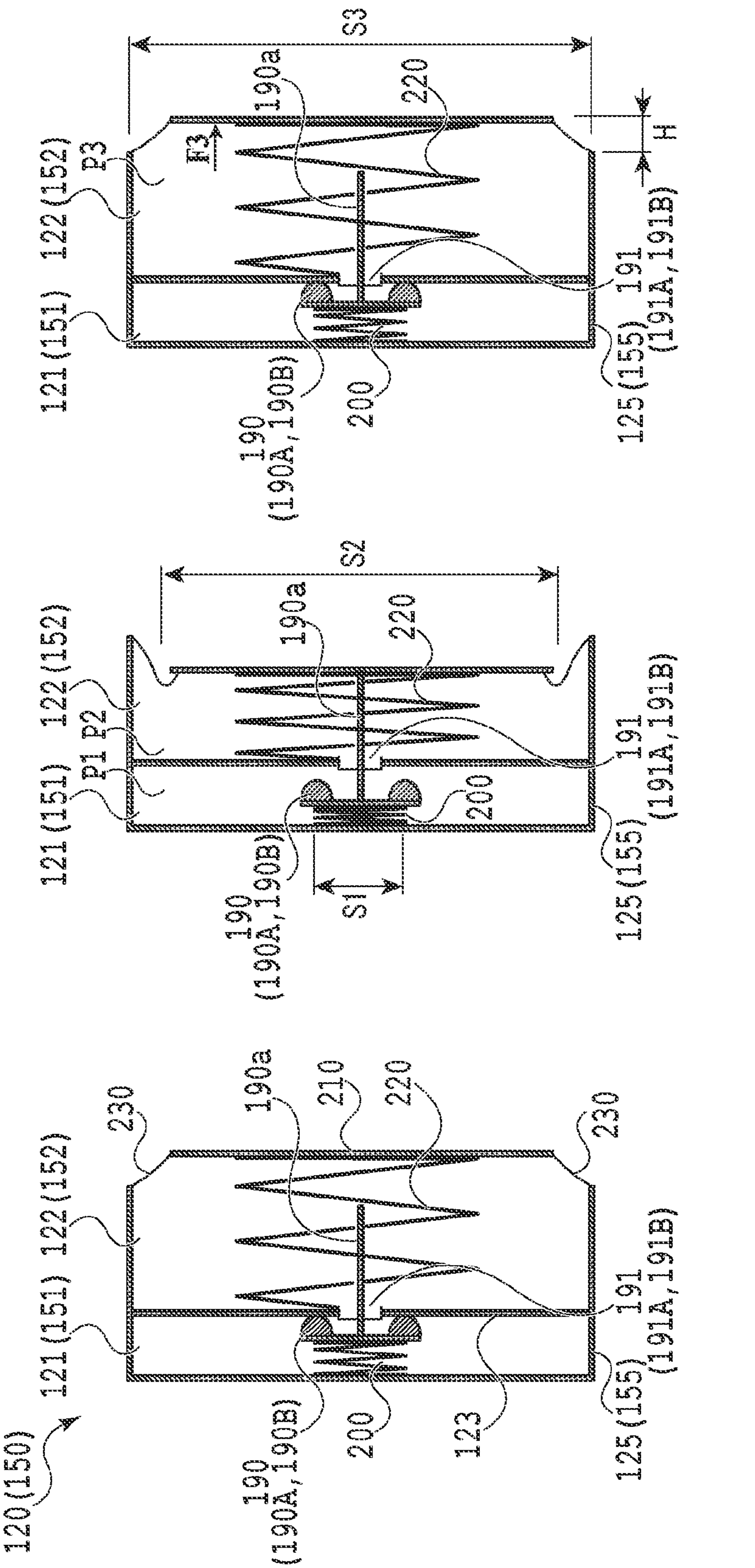
FIGS. 7A to 7C are cross-sectional views illustrating an example of pressure adjustment units.

FIGS. 7A to 7C are views illustrating an example of the pressure adjustment units. Configurations and operation of the pressure adjustment units incorporated in the above-described liquid ejection head 1 (first pressure adjustment unit 120 and second pressure adjustment unit 150) will be described in more detail with reference to FIGS. 7A to 7C. Note that the first pressure adjustment unit 120 and the second pressure adjustment unit 150 have substantially the same configuration. Thus, the following description will be given by taking the first pressure adjustment unit 120 as an example. As for the second pressure adjustment unit 150, only the reference signs of its portions corresponding to those of the first pressure adjustment unit are presented in FIGS. 7A to 7C. In a case of the second pressure adjustment unit 150, the first valve chamber 121 and the first pressure control chamber 122 described below should be read as the second valve chamber 151 and the second pressure control chamber 152, respectively.

The first pressure adjustment unit 120 has the first valve chamber 121 and the first pressure control chamber 122 formed in a cylindrical housing 125. The first valve chamber 121 and the first pressure control chamber 122 are separated by a partition 123 provided inside the cylindrical housing 125. However, the first valve chamber 121 communicates with the first pressure control chamber 122 through a communication port 191 formed in the partition 123. A valve 190, which switches between allowing communication between the first valve chamber 121 and the first pressure control chamber 122 through the communication port 191 and blocking the communication, is provided in the first valve chamber 121. The valve 190 is held by a valve spring 200 at a position opposite to the communication port 191, and has a tight contact configuration to the partition 123 by a biasing force from the valve spring 200. The valve 190 blocks the ink flow through the communication port 191 by being in tight contact with the partition 123. Note that the portion of the valve 190 to be in contact with the partition 123 is preferably formed of an elastic member in order to enhance the tightness of the contact with the partition 123. Also, a valve shaft 190*a* to be inserted through the communication port 191 is provided in a protruding manner on a center portion of the valve 190. By pressing this valve shaft 190*a* against the biasing force from the valve spring 200, the valve 190 gets separated from the partition 123, thereby allowing the ink to flow through the communication port 191. In the following, the state where the valve 190 blocks the ink flow through the communication port 191 will be referred to as "closed state", and the state where the ink can flow through the communication port 191 will be referred to as "open state".

The opening portion of the cylindrical housing 125 is closed by a flexible member 230 and a pressing plate 210. These flexible member 230 and pressing plate 210, the peripheral wall of the housing 125, and the partition 123 form the first pressure control chamber 122. The pressing plate 210 is configured to be displaceable with displacement of the flexible member 230. While the materials of the pressing plate 210 and the flexible member 230 are not particularly limited, for example, the pressing plate 210 can be made as a molded resin component, and the flexible member 230 can be made from a resin film. In this case, the pressing plate 210 can be fixed to the flexible member 230 by thermal welding.

A pressure adjustment spring 220 (biasing member) is provided between the pressing plate 210 and the partition 123. As illustrated in FIG. 7A, the pressing plate 210 and the flexible member 230 are biased by a biasing force from the pressure adjustment spring 220 in a direction in which the inner volume of the first pressure control chamber 122 increases. Also, as the pressure in the first pressure control chamber 122 decreases, the pressing plate 210 and the flexible member 230 get displaced against the pressure from the pressure adjustment spring 220 in the direction in which the inner volume of the first pressure control chamber 122 decreases. Then, in a case where the inner volume of the first pressure control chamber 122 decreases to a certain volume, the pressing plate 210 abuts the valve shaft 190*a* of the valve 190. As the inner volume of the first pressure control chamber 122 then decreases further, the valve 190 moves with the valve shaft 190*a* against the biasing force from the valve spring 200, thereby being separated from the partition 123. As a result, the communication port 191 shifts to the open state (the state of FIG. 7B).

In the present embodiment, the connections in the circulation path are set such that the pressure in the first valve chamber 121 in a case where the communication port 191 shifts to the open state is higher than the pressure in the first pressure control chamber 122. In this way, in a case where the communication port 191 shifts to the open state, the ink flows from the first valve chamber 121 into the first pressure control chamber 122. The inflow of the ink displaces the flexible member 230 and the pressing plate 210 in the direction in which the inner volume of the first pressure control chamber 122 increases. As a result, the pressing plate 210 gets separated from the valve shaft 190*a* of the valve 190, and the valve 190 is brought into tight contact with the partition 123 by the biasing force from the valve spring 200 so that the communication port 191 shifts to the closed state (the state of FIG. 7C).

As described above, in the first pressure adjustment unit 120 in the present embodiment, in a case where the pressure in the first pressure control chamber 122 decreases to a certain pressure or less (e.g., in a case where the negative pressure becomes strong), the ink flows in from the first valve chamber 121 through the communication port 191. This configuration limits the pressure in the first pressure control chamber 122 from decreasing any further. Accordingly, the pressure in the first pressure control chamber 122 is controlled to be maintained within a certain range.

Next, the pressure in the first pressure control chamber 122 will be described in more detail.

Consider a state where the flexible member 230 and the pressing plate 210 are displaced according to the pressure in the first pressure control chamber 122 as described above so that the pressing plate 210 abuts the valve shaft 190*a* and brings the communication port 191 into the open state (the state of FIG. 7B). The relation between the forces acting on the pressing plate 210 at this time is represented by Equation 1 below.

$$P2\times S2+F2+(P1-P2)\times S1+F1=0 \quad \text{Equation 1}$$

Moreover, Equation 1 is summarized for P2 as below.

$$P2=-(F1+F2+P1\times S1)/(S2-S1) \quad \text{Equation 2}$$

- P1: Pressure (gauge pressure) in the first valve chamber 121
- P2: Pressure (gauge pressure) in first pressure control chamber 122
- F1: Spring force of the valve spring 200
- F2: Spring force of the pressure adjustment spring 220
- S1: Pressure reception area of the valve 190
- S2: Pressure reception area of the pressing plate 210

Here, as for the spring force F1 of the valve spring 200 and the spring force F2 of the pressure adjustment spring 220, the direction in which they push the valve 190 and the pressing plate 210 is defined as the forward direction (the rightward direction in FIGS. 7A to 7C). Also, the configuration is such that the pressure P1 in the first valve chamber 121 and the pressure P2 in the first pressure control chamber 122 satisfy a relation of P1≥P2.

The pressure P2 in the first pressure control chamber 122 when the communication port 191 shifts to the open state is determined by Equation 2 and, since the configuration is such that the relation of P1≥P2 is satisfied, the ink flows into the first pressure control chamber 122 from the first valve chamber 121 when the communication port 191 shifts to the open state. As a result, the pressure P2 in the first pressure control chamber 122 does not decrease any further, and the pressure P2 is kept at a pressure within a certain range.

On the other hand, as illustrated in FIG. 7C, the relation between the forces acting on the pressing plate 210 in a case where the pressing plate 210 does not abut on the valve shaft 190*a* and the communication port 191 shifts to the closed state is represented by Equation 3 below.

$$P3\times S3+F3=0 \quad \text{Equation 3}$$

Here, Equation 3 is summarized for P3 as below.

$$P3=-F3/S3 \quad \text{Equation 4}$$

- F3: Springy force of the pressure adjustment spring 220 in a state where the pressing plate 210 does not abut on the valve shaft 190*a*
- P3: Pressure (gauge pressure) in the first pressure control chamber 122 in the state where the pressing plate 210 does not abut on the valve shaft 190*a*
- S3: Pressure reception area of the pressing plate 210 in the state where the pressing plate 210 does not abut on the valve 190

Here, FIG. 7C illustrates a state where the pressing plate 210 and the flexible member 230 are displaced in the rightward direction in FIG. 7C up to the limit to which they can be displaced. The pressure P3 in the first pressure control chamber 122, the spring force F3 of the pressure adjustment spring 220, and the pressure reception area S3 of the pressing plate 210 change depending on the amount of displacement of the pressing plate 210 and the flexible member 230 in displacement to the state of FIG. 7C. Specifically, in a case where the pressing plate 210 and the flexible member 230 are situated on the left side in FIG. 7C relative to themselves in FIG. 7C, the pressure reception area S3 of the pressing plate 210 is smaller and the spring force F3 of the pressure adjustment spring 220 is larger. Accordingly, the pressure P3 in the first pressure control chamber 122 is smaller in accordance with the relation in Equation 4. Thus, with Equations 2 and 4, the pressure in the first pressure control chamber 122 gradually increases (that is, the negative pressure weakens toward a value close to the positive pressure side) in shifting from the state of FIG. 7B to the state of FIG. 7C. Specifically, the pressure in the first pressure control chamber 122 gradually increases while the pressing plate 210 and the flexible member 230 are gradually displaced in the rightward direction from the state where the communication port 191 is in the open state to the state where the inner volume of the first pressure control chamber reaches the limit to which the pressing plate 210 and the flexible member 230 can be displaced. In other words, the negative pressure weakens. In the present embodiment, the first pressure adjustment unit 120 adjusts the pressure on the liquid in the first channel, and the second pressure adjustment unit 150 adjusts the pressure on the liquid in the pump inlet channel 170 (inlet channel).

Description of Ink Supply During Print Operation

Figure 8A:
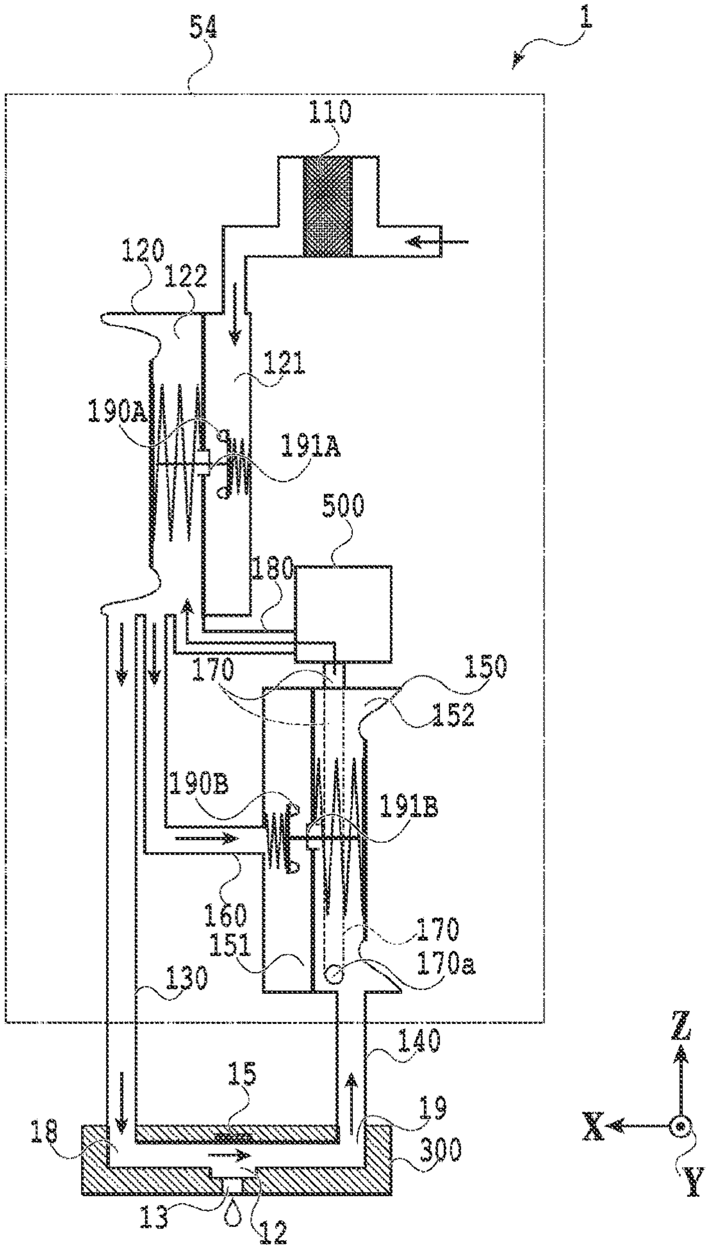
FIGS. 8A and 8B are views schematically illustrating flows of inks in a case of performing a print operation.
Figure 8B:
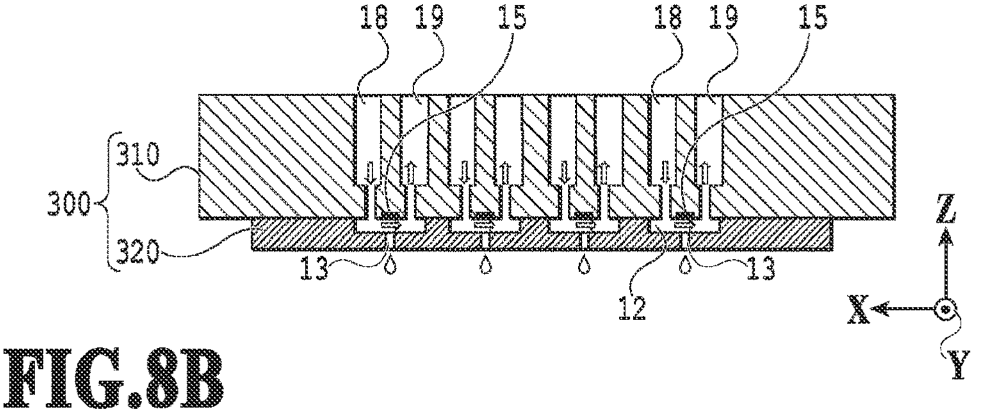

FIGS. 8A and 8B are views schematically illustrating the flows of inks in a case of performing a print operation of performing printing by ejecting the inks from the ejection ports 13. FIG. 8A is a view schematically illustrating the circulation path illustrated in FIG. 5. FIG. 8B is an enlarged view of the ejection module illustrated in FIG. 3B. The relative positions of the components in FIG. 8 (such as the first pressure adjustment unit 120, the second pressure adjustment unit 150, and the circulation pump 500) are simplified for a clearer description of the ink circulation path. Thus, the relative positions of the components are different from those of the components in FIG. 23 to be mentioned later. The arrows in FIGS. 8A and 8B indicate the flows of the inks.

In the present embodiment, to perform a print operation, both the external pump 21 and the circulation pump 500 start being driven. Incidentally, the external pump 21 and the circulation pump 500 may be driven regardless of whether a print operation is to be performed or not. The external pump 21 and the circulation pump 500 do not have to be driven in conjunction with each other, and may be driven independently of each other.

During the print operation, the circulation pump 500 is in an ON state (driven state) so that the ink flowing out of the first pressure control chamber 122 flows into the supply channel 130 and the bypass channel 160. The ink having flowed into the supply channel 130 passes through the ejection module 300 and then flows into the collection channel 140. Thereafter, the ink is supplied into the second pressure control chamber 152.

On the other hand, the ink that has flowed into the bypass channel 160 from the first pressure control chamber 122 flows into the second pressure control chamber 152 through the second valve chamber 151. The ink that has flowed into the second pressure control chamber 152 passes through the pump inlet channel 170, the circulation pump 500, and the pump outlet channel 180 and then flows into the first pressure control chamber 122 again. At this time, based on the relation in Equation 2 mentioned above, the controlled pressure in the first valve chamber 121 is set higher than the controlled pressure in the first pressure control chamber 122. Thus, the ink in the first pressure control chamber 122 does not flow into the first valve chamber 121 but is supplied to the ejection module 300 again through the supply channel 130. The ink that has flowed into the ejection module 300 flows into the first pressure control chamber 122 again through the collection channel 140, the second pressure control chamber 152, the pump inlet channel 170, the circulation pump 500, and the pump outlet channel 180. Ink circulation that is completed within the liquid ejection head 1 is performed as described above.

In the above ink circulation, the differential pressure between the controlled pressure in the first pressure control chamber 122 and the controlled pressure in the second pressure control chamber 152 determines the amount of circulation (flow rate) of the ink within the ejection module 300. Moreover, this differential pressure is set to obtain an amount of circulation that can suppress thickening of the ink near the ejection ports in the ejection module 300. Incidentally, the amount of the ink consumed by the printing is supplied from the ink tank 2 to the first pressure control chamber 122 through the filter 110 and the first valve chamber 121. How the consumed ink is supplied will now be described in detail. The ink in the circulation path decreases by the amount of the ink consumed by the printing. Accordingly, the pressure in the first pressure control chamber 122 decreases, resulting in decreasing the ink in the first pressure control chamber. As the ink in the first pressure control chamber 122 decreases, the inner volume of the first pressure control chamber 122 decreases accordingly. As this inner volume of the first pressure control chamber 122 decreases, the communication port 191A shifts to the open state so that the ink is supplied from the first valve chamber 121 to the first pressure control chamber 122. A pressure loss occurs in this supplied ink as this ink supplied from the first valve chamber 121 passes through the communication port 191A. As the ink flows into the first pressure control chamber 122, the positive pressure on the ink switches to a negative pressure. As the ink flows from the first valve chamber 121 into the first pressure control chamber 122, the pressure in the first pressure control chamber increases. The communication port 191A shifts to the closed state when the inner volume of the first pressure control chamber increases. As described above, the communication port 191A repetitively switches between the open state and the closed state according to the ink consumption. Incidentally, the communication port 191A is kept in the closed state in a case where the ink is not consumed.

Figure 9A:
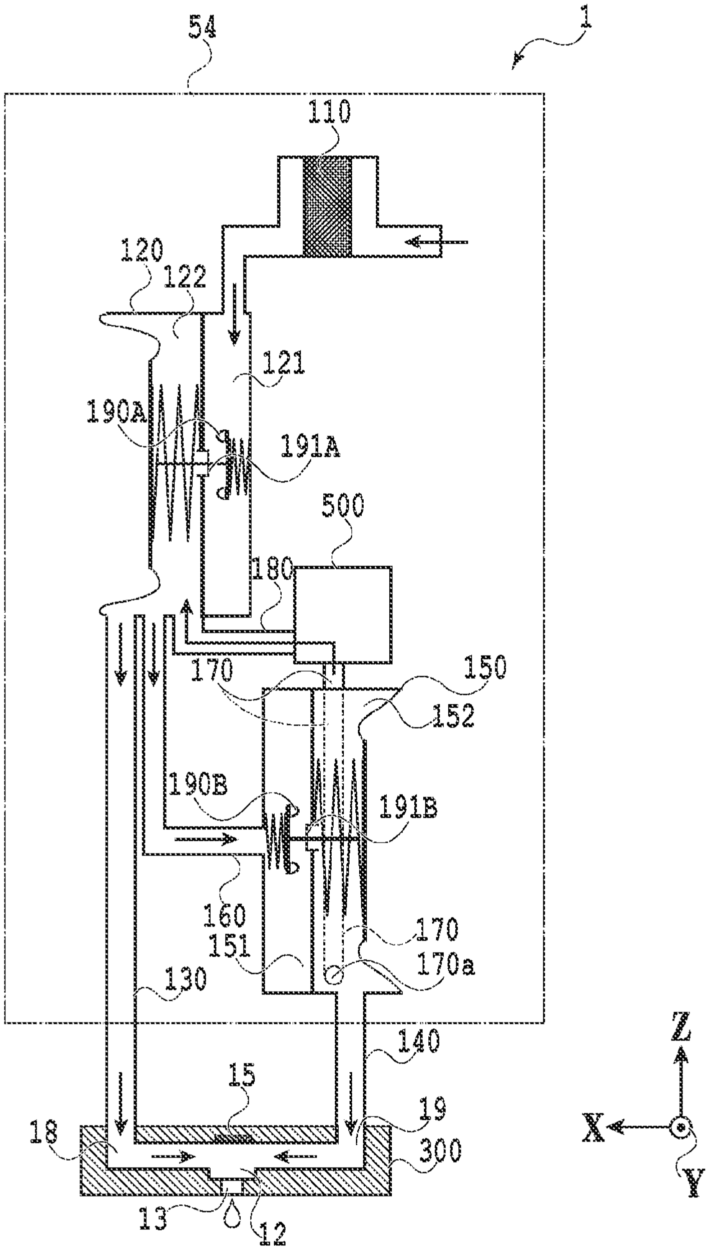
FIGS. 9A and 9B are views schematically illustrating backflows of inks in the vicinities of ejection ports.
Figure 9B:
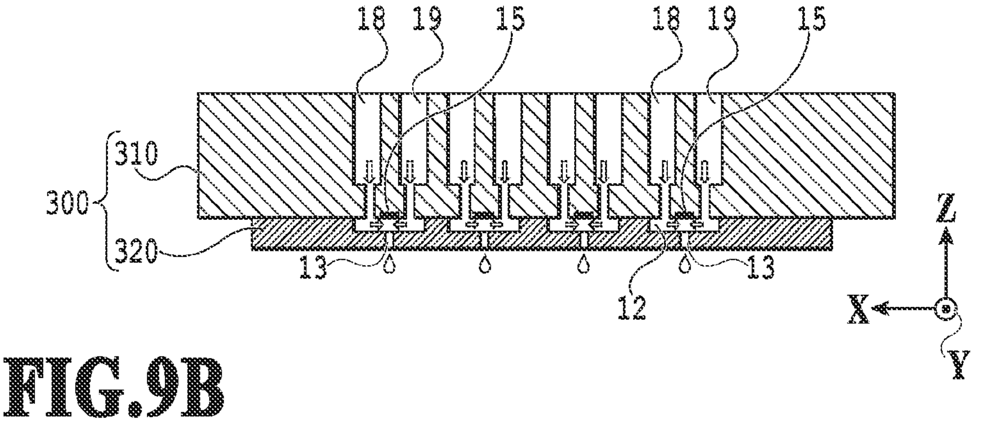

FIGS. 9A and 9B are views schematically illustrating backflows of inks in the vicinities of ejection ports. FIG. 9A is a view corresponding to FIG. 8A, and FIG. 9B is a view corresponding to FIG. 8B. FIGS. 8A and 8B illustrate flows such that the inks in the pressure chambers 12 have flowed thereinto from the common supply channels 18, and pass through the pressure chambers 12 and flow out through the common collection channels 19. Incidentally, in a case of continuing high-duty printing, the inks set back into the pressure chambers 12 from the collection channel 140 side as well. That is, as illustrated in FIGS. 9A and 9B, each pressure chamber 12 may be refilled with the ink from both the supply channel 130 (common supply channel 18) and the collection channel 140 (common collection channel 19). Hereinafter, a description will be given of an example where the bypass channel 160 is provided in order to supply the ink to the pressure chambers 12 from both the supply channel 130 and the collection channel 140. The pressure in the circulation path may fluctuate due to the ejection operations of the ejection elements 15. This is because the ejection operations generate a force that draws the ink into the pressure chambers.

In the following, a description will be given of the fact that the ink to be supplied to the pressure chambers 12 is supplied from both the supply channel 130 side and the collection channel 140 side in a case of continuing high-duty printing. While the definition of "duty" may vary depending on various conditions, in the following, a state where a 1200 dpi grid cell is printed with a single 4 pl ink droplet will be considered 100%. "High-duty printing" is, for example, printing performed at a duty of 100%.

In the case of continuing high-duty printing, the amount of the ink flowing into the second pressure control chamber 152 from the pressure chambers 12 through the collection channel 140 decreases. On the other hand, the circulation pump 500 causes the ink to flow out in a constant amount. This breaks the balance between the inflow into and the outflow from the second pressure control chamber 152. Consequently, the ink inside the second pressure control chamber 152 decreases and the negative pressure in the second pressure control chamber 152 becomes stronger, so that the second pressure control chamber 152 shrinks. As the negative pressure in the second pressure control chamber 152 becomes stronger, the amount of inflow of the ink into the second pressure control chamber 152 through the bypass channel 160 increases, and the second pressure control chamber 152 becomes stable in the state where the outflow and the inflow are balanced. Thus, in the end, the negative pressure in the second pressure control chamber 152 becomes stronger according to the duty. Also, with the configuration in which the communication port 191B is in the closed state in the case where the circulation pump 500 is driven, the communication port 191B shifts to the open state depending on the duty, so that the ink flows into the second pressure control chamber 152 from the bypass channel 160.

Moreover, as high-duty printing is continued further, the amount of inflow into the second pressure control chamber 152 from the pressure chambers 12 through the collection channel 140 decreases and conversely the amount of inflow into the second pressure control chamber 152 from the communication port 191B through the bypass channel 160 increases. As this state progresses further, the amount of the ink flowing into the second pressure control chamber 152 from the pressure chambers 12 through the collection channel 140 reaches zero, so that the ink flowing in from the communication port 191B is the entire ink flowing out into the circulation pump 500. As this state progresses further, this time, the ink backs up into the pressure chambers 12 from the second pressure control chamber 152 through the collection channel 140. In this state, the ink flowing out of the second pressure control chamber 152 into the circulation pump 500 and the ink flowing out of the second pressure control chamber 152 into the pressure chambers 12 will flow into the second pressure control chamber 152 from the communication port 191B through the bypass channel 160. In this case, the ink from the supply channel 130 and the ink from the collection channel 140 are filled into the pressure chambers 12 and ejected therefrom.

Note that this ink backflow that occurs in the case where the printing duty is high is a phenomenon that occurs due to the provision of the bypass channel 160. Also, in the above, an example has been described in which the communication port 191B in the second pressure adjustment unit shifts to the open state for the backflow of the ink. However, the backflow of the ink may also occur in the state where the communication port 191B in the second pressure adjustment unit is in the open state. Moreover, in a configuration without the second pressure adjustment unit, the above backflow of the ink can also occur by providing the bypass channel 160. Incidentally, it suffices that the bypass channel 160 allow at least one of the first channel or the first pressure adjustment unit 120 and the second channel to communicate with each other without the pressure chambers 12 therebetween.

As described above, the ink supplied to the bypass channel 160 from the first pressure control chamber 122 is supplied to the second pressure control chamber 152 of the second pressure adjustment unit 150 through the second valve chamber 151. Thereafter, part of the ink supplied to the second pressure control chamber 152 is supplied to the collection channel 140 and then supplied to the ejection ports 13 through the common collection channel 19.

Figure 10A:
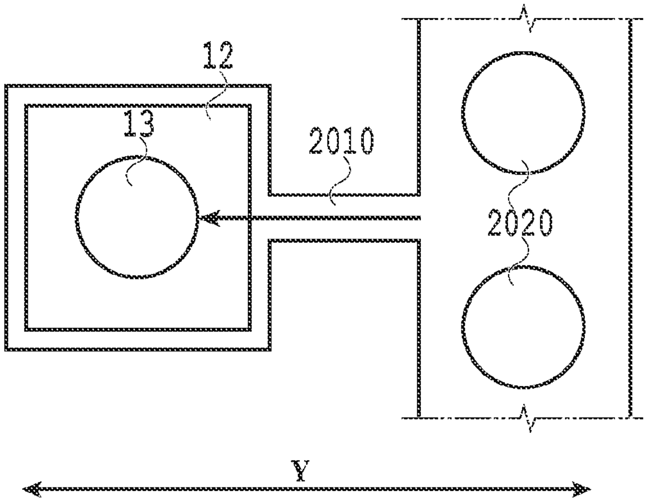
FIGS. 10A and 10B are views illustrating ink supply inside an ejection module.
Figure 10B:
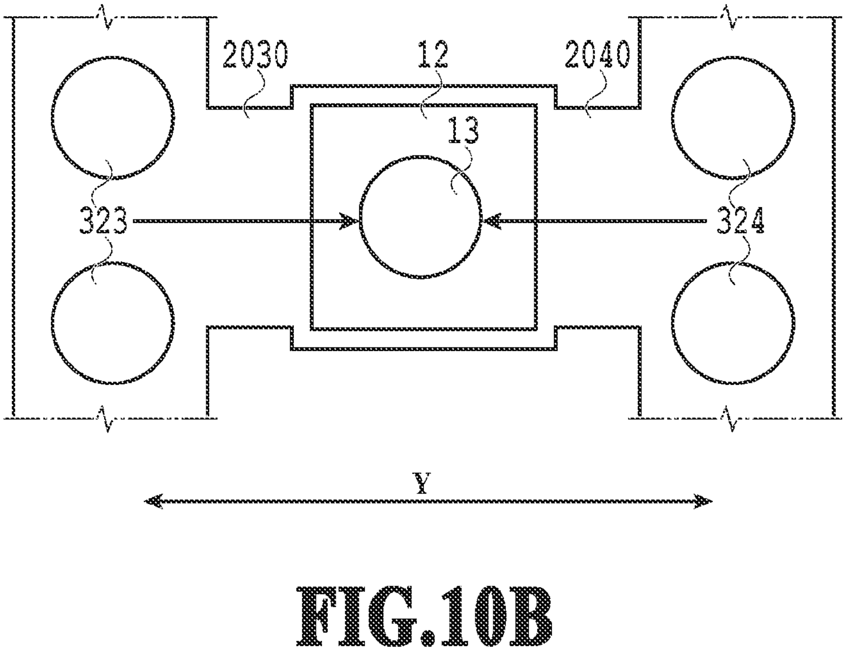

FIGS. 10A and 10B are views illustrating ink supply inside an ejection module 300. FIG. 10A is a view illustrating a channel configuration in the vicinity of a pressure chamber 12, and is a view illustrating a comparative example different from the present embodiment. FIG. 10A represents a configuration in which only one side of the pressure chamber 12 communicates with a flow channel 2010. In this configuration, the supply of an ink to the pressure chamber 12 is one-side supply in which the ink is supplied only from the channel 2010. In the configuration of FIG. 10A, independent supply ports 2020 communicating with the pressure chamber 12 are connected to either the common supply channel 18 or the common collection channel 19 or both of them. In a case of using in particular a thermal-type ejection element as the ejection element 15, the ink is ejected from the ejection port 13 by generating a bubble inside the pressure chamber 12. Also, the pressure chamber 12 is refilled with the ink by bubble disappearance corresponding to the bubble generation. In such a channel configuration, the channel 2010 connected to the pressure chamber 12 is narrowed and lengthened to increase the rear resistance at the time of the bubble generation. This makes the generated bubble more symmetrical and improves the formation of a droplet. On the other hand, in a configuration as illustrated in FIG. 10A, the increased rear resistance lowers the ease of supply in the ink refill of the pressure chamber 12 at the time of the bubble disappearance after ejection. Accordingly, with the channel configuration illustrated in FIG. 10A, it is generally difficult to improve the refill frequency. In particular, in a case of performing a high-duty print operation, the amount of the ink to be supplied to each ejection port becomes small, which leads to a possibility of lowering the ejection stability.

FIG. 10B, on the other hand, is a view illustrating a channel configuration in the vicinity of a pressure chamber 12 in the present embodiment. The supply connection channels 323 serving as first independent supply ports connect a first liquid channel 2030 communicating with the pressure chamber 12 and the common supply channel 18. The collection connection channels 324 serving as second independent supply ports connect a second liquid channel 2040 communicating with the pressure chamber 12 and the common collection channel 19. As mentioned earlier, in the present embodiment, the pressure chamber 12 is refilled with the amount of the ink ejected from the ejection port 13 from the first liquid channel 2030 and the second liquid channel 2040. As illustrated in FIG. 10B, a both-side supply configuration is employed in which both sides of the pressure chamber 12 communicate with the first liquid channel 2030 and the second liquid channel 2040. With such a configuration, although the channels communicating with the pressure chamber 12 are widened and shortened as illustrated in FIG. 10B, symmetrical rear resistances are exerted at the time of bubble generation so that it is easier for the generated bubble to be more symmetrical. This tends to improve the formation of an ink droplet. Moreover, the rear resistances do not have to be increased. This improves the ease of ink supply in the ink refill of the pressure chamber 12 at the time of the bubble disappearance after ejection. As described above, according to the present embodiment, the ejection stability is improved even in a case of performing a high-duty print operation. That is, both the droplet formation and the refill frequency are improved.

Note that a case of using thermal-type ejection elements has been mainly described in the above embodiment. However, piezoelectric-type ejection elements may be used. With the thermal type, however, it is more difficult to improve both the droplet formation and the refill frequency. Hence, the thermal type is more preferable in the present embodiment.

Ink Circulations by Carriage Scans

Next, that ink circulations are also generated in the liquid ejection head 1 in the present embodiment having a circulation path as described above by carriage scans will be described.

Figure 11A:
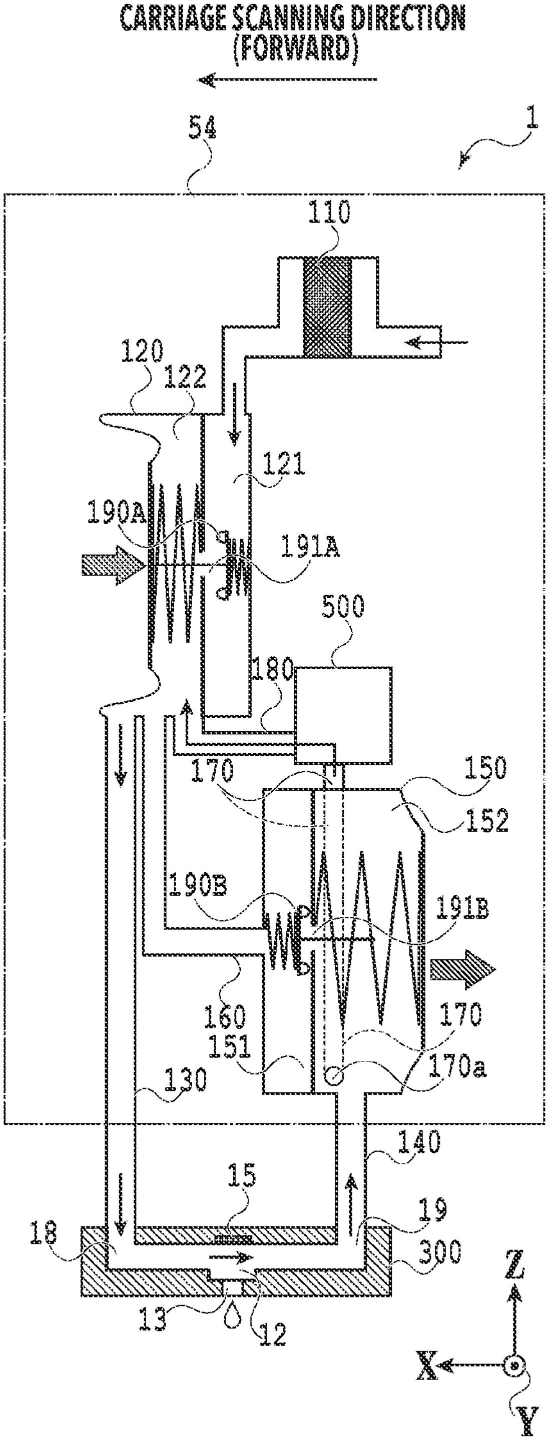
FIGS. 11A and 11B are views illustrating ink circulations generated by carriage scans.
Figure 11B:
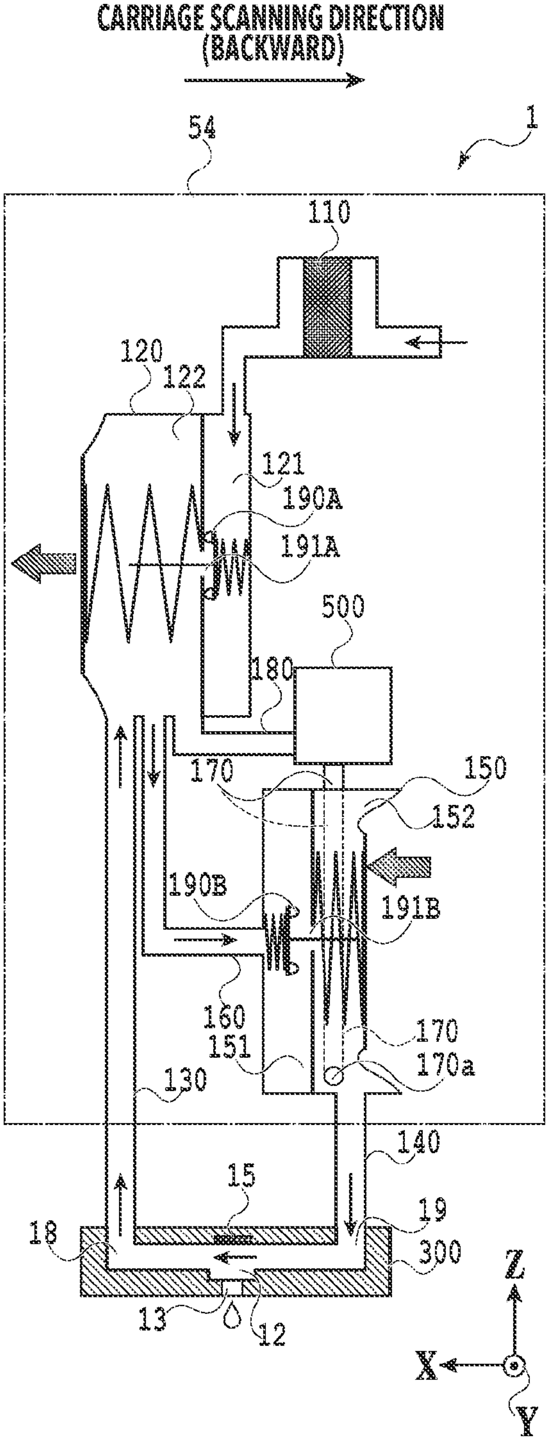

FIGS. 11A and 11B are views illustrating ink circulations generated by carriage scans. As mentioned earlier, the carriage 60 reciprocally moves in the X direction. The liquid ejection head 1 in the present embodiment is mounted on the carriage 60, and the reciprocal movement of the carriage 60 makes the inks inside the liquid ejection head 1 circulate as well. This is because a scan of the carriage 60 exerts an inertial force on each of the pressing plates 210 of the first pressure adjustment unit 120 and the second pressure adjustment unit 150, which are opposed to each other. These inertial forces change the negative pressures in the first pressure control chamber 122 and the second pressure control chamber 152. Consequently, the ink moves bidirectionally in the pressure chambers 12. FIGS. 11A and 11B illustrate ink flows generated in the circulation path including the supply channel 130 and the collection channel 140 due to the changes in the negative pressures caused by the inertial forces. The ink flows generated by the bidirectional carriage scans will be described below. FIG. 11A is a view of a case where the carriage 60 is scanned in the leftward direction (hereinafter "forward direction"). FIG. 11B is a view of a case where the carriage 60 is scanned in the rightward direction (hereinafter "backward direction").

As illustrated in FIG. 11A, as the carriage 60 is scanned in the leftward direction (forward direction), the first pressure control chamber 122 of the first pressure adjustment unit 120 of the liquid ejection head 1 gets contracted by the inertial force acting on the pressing plate 210. That is, the pressing plate 210 is pushed in, thereby contracting the first pressure control chamber 122. As the first pressure control chamber 122 gets contracted, the pressure in the first pressure control chamber 122 gets higher (more pressurized) so that the negative pressure becomes weaker than the negative pressure at rest. In contrast, the second pressure control chamber 152 of the second pressure adjustment unit 150 gets expanded by the inertial force acting on the pressing plate 210. That is, the pressing plate 210 is pulled, thereby expanding the second pressure control chamber 152. As the second pressure control chamber 152 gets expanded, the pressure in the second pressure control chamber 152 gets lower so that the negative pressure becomes stronger than the negative pressure at rest.

As a result, an ink flow is generated inside the liquid ejection head 1 such that, as illustrated in FIG. 11A, the ink flows from the first pressure adjustment unit 120 toward the second pressure adjustment unit 150 through the pressure chambers 12. Meanwhile, since the pressing plate 210 of the second pressure adjustment unit 150 is pulled, the pressing plate 210 moves away from the valve 190B. Accordingly, the valve 190B closes the communication port 191B. FIG. 11A therefore illustrates a state where no ink flow is generated in the bypass channel 160. However, in a state where the pressing plate 210 is not completely far away from the valve 190B and the communication port 191B is therefore not closed, an ink flow directed toward the second pressure adjustment unit 150 through the bypass channel 160 is generated as well.

Next, a case where the carriage 60 is scanned in the rightward direction (backward direction) as illustrated in FIG. 11B will be described. As the carriage 60 is scanned in the rightward direction (backward direction), the first pressure control chamber 122 of the first pressure adjustment unit 120 of the liquid ejection head gets expanded by the inertial force on the pressing plate 210. As the first pressure control chamber 122 gets expanded, the pressure in the first pressure control chamber 122 gets lower so that the negative pressure becomes stronger than the negative pressure at rest. In contrast, the second pressure control chamber 152 of the second pressure adjustment unit 150 gets contracted by the inertial force on the pressing plate 210. As the second pressure control chamber 152 gets contracted, the pressure in the second pressure control chamber 152 gets higher (more pressurized) so that the negative pressure becomes weaker than the negative pressure at rest.

As a result, an ink flow is generated inside the liquid ejection head 1 such that, as illustrated in FIG. 11B, the ink flows from the second pressure adjustment unit 150 toward the first pressure adjustment unit 120 through the pressure chambers 12. In FIG. 11B, a flow directed toward the second pressure adjustment unit 150 from the supply channel 130 through the bypass channel 160 is generated as well.

Note that the ink flows illustrated in FIGS. 11A and 11B are generated in both the state where the circulation pump 500 is driven and the state where the circulation pump 500 is stopped. In other words, the ink inside the circulation path can be circulated without driving the circulation pump 500. Also, scanning of the carriage 60 immediately after driving the circulation primp 500 can assist the ink circulation through the circulation path.

Figure 12A:
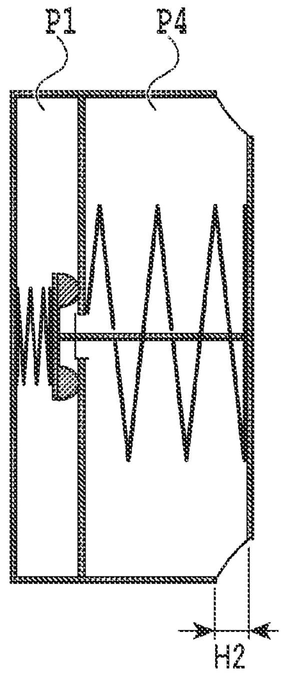
FIGS. 12A to 12C are views illustrating changes in the pressure inside a pressure control chamber caused by inertial forces.
Figure 12B:
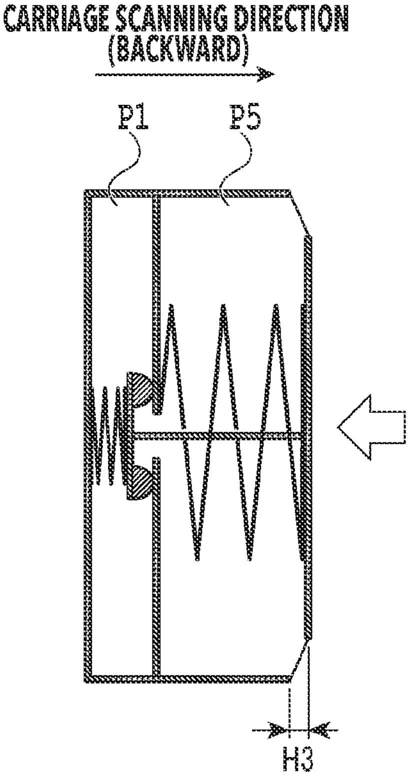
Figure 12C:
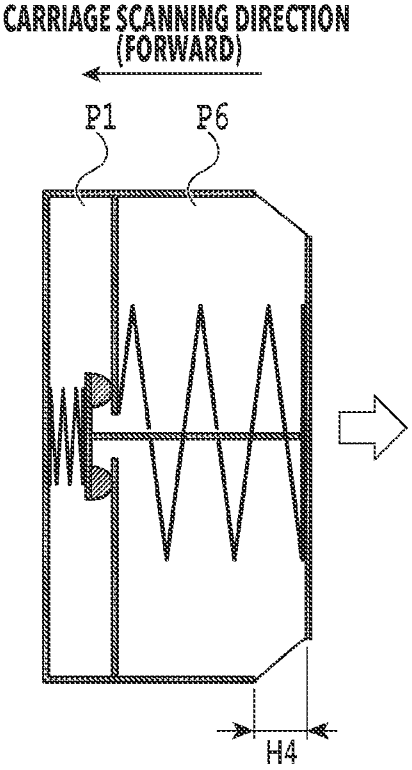

FIGS. 12A to 12C are views illustrating the changes in the pressure in the pressure control chamber of a pressure adjustment unit generated by the inertial forces exerted on the pressing plate 210 by scans of the carriage 60. FIGS. 12A to 12C illustrate facts that are common to both the first pressure adjustment unit 120 and the second pressure adjustment unit 150. Thus, the following description will be given without distinguishing the first and second pressure adjustment units.

FIG. 12A is a view illustrating a pressure P4 in the pressure control chamber at rest. The pressure P4 in the pressure control chamber at rest is determined from Equation 5 below, which is a relational expression indicating the balance between forces applied to members.

$$P4=P0-(P1Sv+k1x)/Sd \quad \text{Equation 5}$$

Sd: Pressure reception area of the pressing plate 210
Sv: Pressure reception area of the valve 190
P0: Atmospheric pressure
P1: Pressure in the valve chamber
P4: Pressure in the pressure control chamber [Pa]
k1: Combined spring constant of the biasing members (the valve spring and the pressure adjustment spring)
x: Spring displacement Here, as described earlier, the pressure P1 in the valve chamber is a positive pressure relative to the pressure in the pressure control chamber in order to supply the ink to the pressure control chamber. Thus, the second term of the right-hand side of Equation 5 "(P1Sv+k1*x*)" is always positive so that pressure P4<pressure P0 pressure, and the pressure P4 in the control chamber is negative. FIG. 12B is a view illustrating a pressure P5 in the pressure control chamber in a case where a carriage scan is performed in the rightward direction in FIG. 12B. FIG. 12C is a view illustrating a pressure P6 in the pressure control chamber in a case where a carriage scan is performed in the leftward direction in FIG. 12C. The pressures P5 and P6 are determined by Equations 6 and 7 below; respectively, from the relationship in Equation 5.

During a carriage scan (to the right)

$$P5=P0-(P1Sv+k1\cdot(H3-H2))/Sd \quad \text{Equation 6}$$

During a carriage scan (to the left)

$$P6=P0-(P1Sv+k1\cdot(H4-H2))/Sd \quad \text{Equation 7}$$

Here, it can be understood that a relationship of P6<P4<P5<0 is satisfied in a case where a relationship of H3<H2<H4 is satisfied. Thus, the signs of the negative pressures generated in the spring bags in the two pressure control chambers in forward and backward carriage scans relative to the negative pressures at rest are opposite between the forward and backward carriage scans. This allows bi-directional circulations.

Note that, in the present embodiment, in a case where the carriage 60 is at rest, there is a differential pressure between the first pressure adjustment unit 120 and the second pressure adjustment unit 150, as described earlier. In a case where the carriage is at rest, this differential pressure enables a circulation in one direction from the first pressure adjustment unit 120 toward the second pressure adjustment unit 150.

The pressures in the first valve chamber 121 and the first pressure control chamber 122 are determined by Equation 2 mentioned earlier, and the controlled pressure in the first valve chamber 121 is set higher than the controlled pressure in the first pressure control chamber 122. In this way, the ink is circulated through the ejection module 300 so as to be supplied from the first pressure control chamber 122 to the ejection module 300 through the supply channel 130 and then reaches the second pressure control chamber 152 through the collection channel 140. The amount of circulation through the ejection module 300 is determined by the differential pressure between the controlled pressure in the first pressure control chamber 122 and the controlled pressure in the second pressure control chamber 152, and is set to be an amount of circulation that can suppress thickening of the ink in the ejection module 300 in the vicinity of the ejection ports. That is, the first pressure control chamber 122 and the second pressure control chamber 152 use pressing plates 210 with different pressure reception areas (sizes) and valve springs 200 and pressure adjustment springs 220 with different spring constants (spring characteristics) as their constituent elements in order to generate the above differential pressure.

In the present embodiment, even under conditions as described above, bi-directional ink flows can be temporarily generated with inertial forces exerted on the pressing plates 210 of the opposed pressure adjustment units by scans of the carriage 60. Specifically, the negative pressure in the first pressure control chamber 122 of the first pressure adjustment unit 120 and the negative pressure in the second pressure control chamber 152 of the second pressure adjustment unit 150 are shifted by the inertial forces exerted on the pressing plates 210. In this way, it is possible to temporarily reverse the ink flow generated in the circulation path including the supply channel 130 and the collection channel 140. That is, it is possible to temporarily generate bi-directional ink flows. Accordingly, it is possible to provide a timing for bubbles having accumulated at narrow channel portions of channels to be moved back toward the upstream side. This reduces the effect of the accumulated bubbles and improves the ejection stability.

Figure 13:
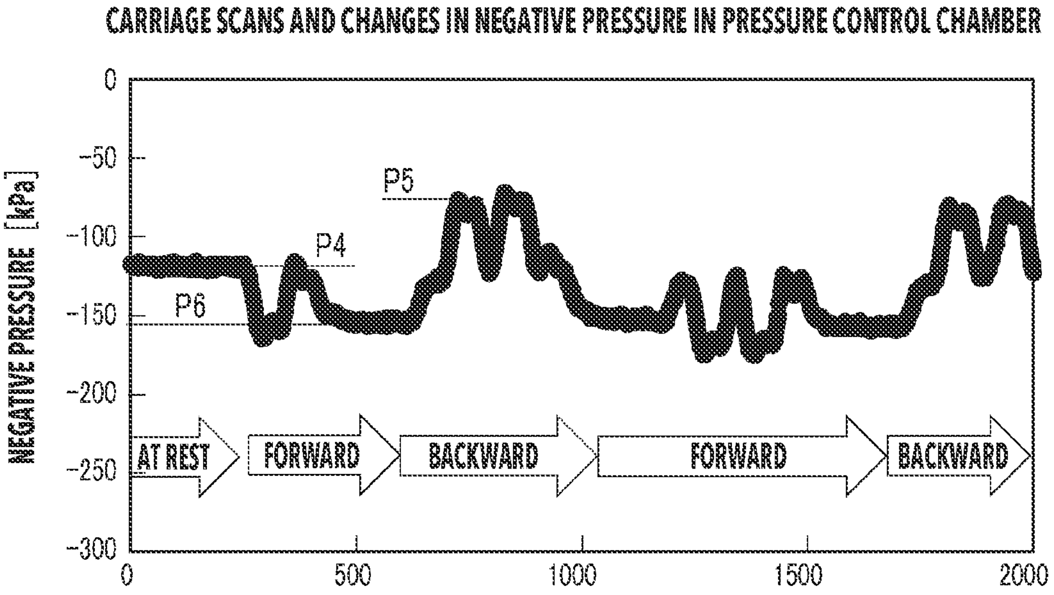
FIG. 13 is a graph illustrating exemplary measurement data of the value of a negative pressure in a pressure adjustment unit.

FIG. 13 is a graph illustrating exemplary measurement data of the values of the negative pressure in a pressure adjustment unit of the liquid ejection head generated by carriage scans. FIG. 13 illustrates exemplary measurement data of the values of the negative pressure in the second pressure control chamber 152 of the second pressure adjustment unit 150. The second pressure adjustment unit 150 is such that the negative pressure P6 in a case where the carriage 60 is scanned in the forward direction is stronger than the value of the negative pressure P4 in a case where the carriage 60 is at rest. That is, the pressure P6 in a forward scan is a pressure lower than the pressure P4. On the other hand, the negative pressure P5 in a case where the carriage 60 is scanned in the backward direction is weaker than the value of the negative pressure P4 in a case where the carriage 60 is at rest.

For the first pressure adjustment unit 120 provided so as to be opposed in the carriage scanning directions, the relationship between the negative pressures is the reverse of the relationship illustrated in FIG. 13. Being provided so as to be opposed in the carriage scanning directions refers to, for example, a state where the constituent members of the pressure adjustment unit are provided symmetrically about the communication port 191 in the carriage scanning directions. That is, the first pressure adjustment unit 120 and the second pressure adjustment unit 150 are configured such that the directions in which their pressing plates 210 are biased by the corresponding biasing members are opposite to each other. Specifically, being provided so as to be opposed in the carriage scanning directions refers to a state of being in such a relationship that one pressure control chamber gets contracted and the other pressure control chamber gets expanded in a case where the carriage 60 is scanned in one direction between the carriage scanning directions (e.g., forward direction). Thus, the first pressure adjustment unit 120 is such that the negative pressure P5 in a forward scan is weaker than the value of the negative pressure P4 at rest, as opposed to the second pressure adjustment unit 150. On the other hand, the negative pressure P6 in a backward scan is stronger than the value of the negative pressure P4 at rest.

As described above, the negative pressure in the first pressure adjustment unit 120 and the negative pressure in the second pressure adjustment unit 150 change in the mutually opposite positive and negative directions relative to the negative pressures at rest. In this way, ink flows are generated in opposite directions in each of a forward scan and a backward scan of the carriage 60. Incidentally, in the present embodiment, an example has been described in which the configuration is such that the pressures generated in the first pressure adjustment unit 120 and the second pressure adjustment unit 150 in response to each of forward and backward scans in the main scanning direction have different signs relative to the pressures at rest. Moreover, an example has been described in which the configuration is such that a negative pressure is generated in the second pressure adjustment unit 150 relative to the pressure at rest in a case where a positive pressure is generated in the first pressure adjustment unit 120 relative to the pressure at rest in response to a scan in the main scanning direction. Alternatively, the configuration may be such that pressures with different signs are generated in one of the first pressure adjustment unit 120 or the second pressure adjustment unit 150 relative to the pressure at rest in response to forward and backward scans in the main scanning direction. In this case too, a relationship between negative pressures as illustrated in FIG. 13, for example, is achieved so that bi-directional ink flows are generated according, to the main scanning direction of the carriage 60.

As described above, according to the present embodiment, it is possible to reduce the effect of bubbles having accumulated in channels. Specifically, the inks can be circulated bi-directionally so as to pass through the pressure chambers 12 in the liquid ejection head 1, thereby providing a timing for bubbles having accumulated at narrow channel portions of channels to be moved back toward the upstream side. This can reduce the frequency at which the liquid ejection apparatus recovers the ink filling state of the liquid ejection head 1, which can also reduce the waste ink.

Incidentally, the liquid ejection apparatus 50 may be configured such that, in a case where the carriage 60 is reciprocally scanned in the main scanning direction, the liquid ejection apparatus 50 ejects the inks during the scans in both directions or ejects the inks only during the scan in one direction.

Second Embodiment

In the first embodiment, an example has been described in which, in a case where the carriage 60 is at rest, an ink flow is generated in the circulation path by the pressure difference between the first pressure adjustment unit 120 and the second pressure adjustment unit 150. Moreover, an example in which the ink is bi-directionally moved through the circulation path by forward and backward scans of the carriage 60 has been described. In a second embodiment, a configuration in which no ink flow is generated in the circulation path in a case where the carriage 60 is at rest (continuously at rest) will be described.

Figures 14A, 14B:
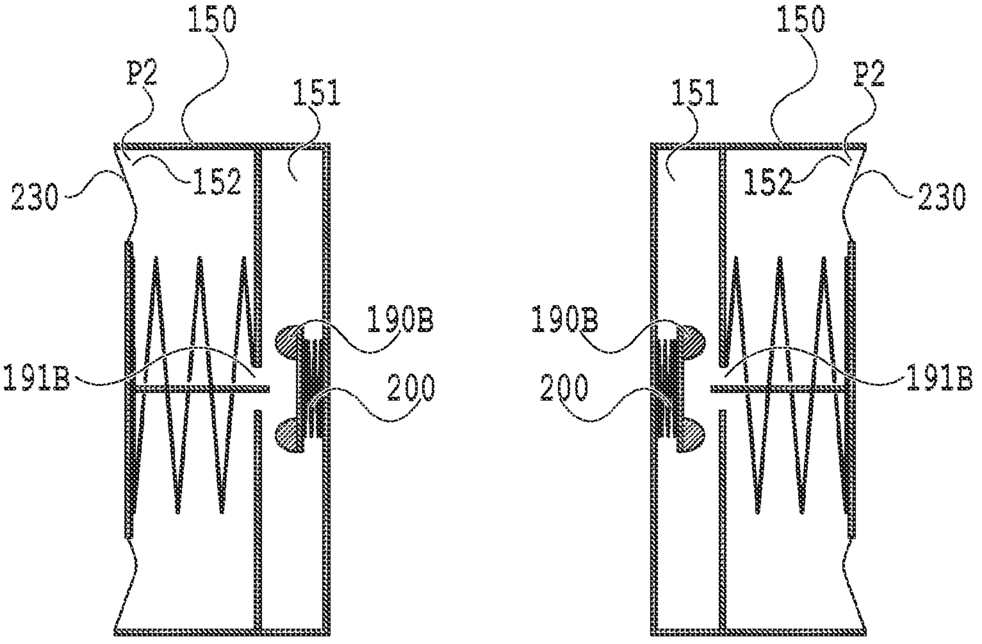
FIGS. 14A and 14B are views illustrating the pressure adjustment unit.

FIGS. 14A and 14B are views illustrating a pressure adjustment unit in the present embodiment. Here, an example in which the second pressure adjustment unit 150 is provided in place of the first pressure adjustment unit described in the first embodiment is illustrated. FIG. 14A illustrates the pressure adjustment unit disposed between the pressure chambers 12 and the pump inlet channel 170. FIG. 14B illustrates the pressure adjustment unit disposed between the pressure chambers 12 and the pump outlet channel 180. In this way, in the present embodiment, no pressure difference is provided between the two opposed pressure adjustment units. More specifically, identical pressure adjustment units are disposed. In this way, the ink flow in the circulation path stops in a case where the carriage 60 is at rest (continuously at rest). On the other hand, an ink flow can be generated in the circulation path by scanning the carriage 60, as described earlier.

Incidentally, while an example in which identical pressure adjustment units are disposed has been described above, the configuration only needs to be such that there is no pressure difference between two opposed pressure adjustment units. In other words, the sizes of the pressing plates 210 forming the first pressure control chamber 122 and the second pressure control chamber 152 and the spring constants of the valve springs 200 and the pressure adjustment springs 220 as well as their shapes, volumes, densities, or the like may be the same or different.

In the present embodiment too, it is possible to reduce the effect of bubbles having accumulated in channels, as in the example described in the first embodiment. This can reduce the frequency at which the liquid ejection apparatus recovers the ink filling state of the liquid ejection head 1, which can also reduce the waste ink.

Third Embodiment

In a third embodiment, a configuration by which the change in the negative pressure on the pressing plate 210 generated by a scan of the carriage 60 is made greater than that in the example described in the first embodiment will be described. Note that the basic configuration is similar to the one described in the first embodiment, and the difference will be mainly described below.

Figure 15:
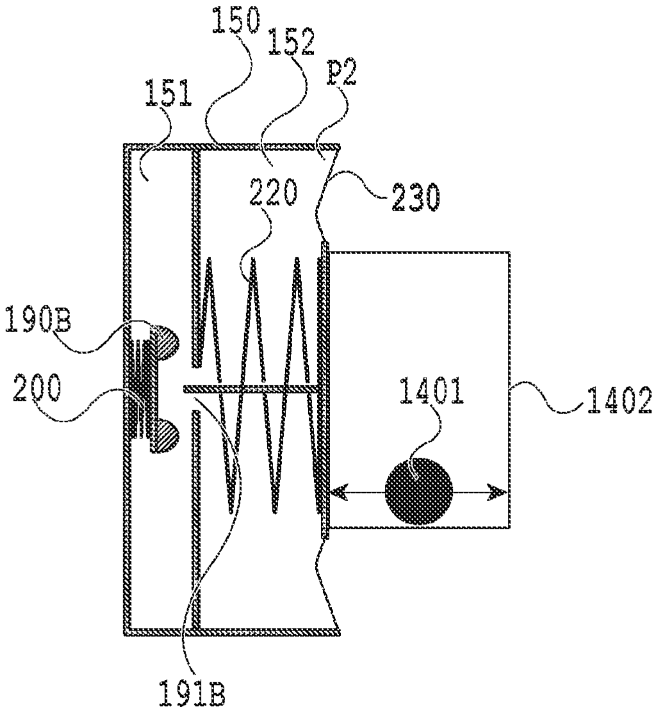
FIG. 15 is a cross-sectional view illustrating an example of the pressure adjustment unit.

FIG. 15 is a view illustrating an example of a pressure adjustment unit in the present embodiment. FIG. 15 illustrates the second pressure adjustment unit 150 as an example, and the first pressure adjustment unit can also employ a similar configuration. In the present embodiment, a pressure increase member 1401 is provided in the vicinity of the pressing plate 210. The pressure increase member 1401 is a spherical body that moves inside a box 1402 connected to the pressing plate 210, for example. With the pressure increase member 1401, the changes in the negative pressure corresponding to the inertias generated by scans of the carriage 60 can be made larger than those in the example of the first embodiment. Moreover, with the pressure increase member 1401, the duration of the changes in the negative pressure corresponding to the inertias generated by scans of the carriage 60 can be made longer than that in the example of the first embodiment. Incidentally, to achieve the above advantages, the mass and density of the pressure increase member 1401 only need to be such that the pressure increase member 1401 moves inside the box 1402 connected to the pressing plate 210. Thus, the shape, volume, and the like of the pressure increase member 1401 are not limited to those illustrated.

As described above, according to the present embodiment, the change in the negative pressure on the pressing plate 210 can be made larger and the duration of the change in the negative pressure can be made longer than those in the example described in the first embodiment. Accordingly, it is possible to reduce the effect of bubbles having accumulated in channels. Incidentally, in the present embodiment, an example in which the pressure increase member 1401 is provided to both the first pressure adjustment unit 120 and the second pressure adjustment unit 150 has been described, but the configuration may be such that the pressure increase member 1401 is provided to one of them.

Reference Example

A more detailed reference example of a liquid ejection apparatus described above will now be described. While the reference example to be described below represents a reference example based on the first embodiment, the second and third embodiments can have similar respective contents as well.

Flow of Ink Inside Liquid Ejection Head

FIGS. 16A to 16E are views illustrating a flow of an ink inside the liquid ejection head. Like FIG. 8A mentioned earlier, FIG. 16A illustrates a state where the ink is circulated through the circulation path by driving the circulation pump 500. Incidentally, for a simple description, the following description will be given on the assumption that the carriage 60 is stopped in FIGS. 16B to 16E. That is, the following description will be given on the assumption that no inertial force is generated by movement of the carriage 60 in the scanning direction described in the first embodiment.

Figures 16A, 16B, 16C, 16D, 16E:
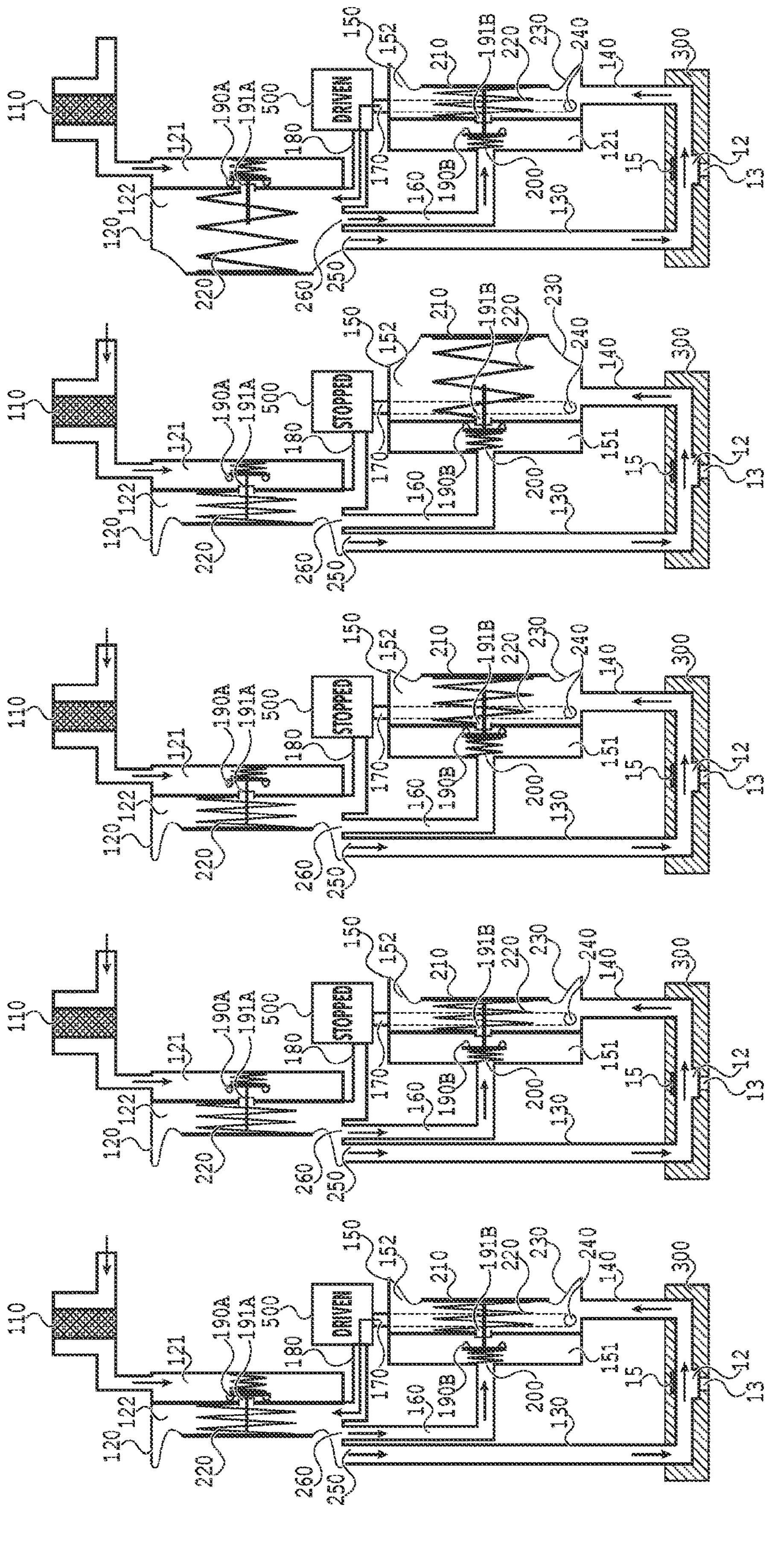
FIGS. 16A to 16E are views illustrating a flow of an ink inside the liquid ejection head.

FIG. 16B schematically illustrates the flow of the ink immediately after the print operation is finished and the circulation pump 500 shifts to an OFF state (stop state). At the point when the print operation is finished and the circulation pump 500 shifts to the OFF state, the pressure in the first pressure control chamber 122 and the pressure in the second pressure control chamber 152 are both the controlled pressures used in the print operation. For this reason, the ink moves as illustrated in FIG. 16B according to the differential pressure between the pressure in the first pressure control chamber 122 and the pressure in the second pressure control chamber 152. Specifically, the ink flow from the first pressure control chamber 122 to the ejection module 300 through the supply channel 130 and then to the second pressure control chamber 152 through the collection channel 140 continues to be generated. Moreover, the ink flow from the first pressure control chamber 122 to the second pressure control chamber 152 through the bypass channel 160 and the second valve chamber 151 continues to be generated.

The amount of the ink moved from the first pressure control chamber 122 to the second pressure control chamber 152 by these ink flows is supplied from the ink tank 2 to the first pressure control chamber 122 through the filter 110 and the first valve chamber 121. Accordingly, the inner volume of the first pressure control chamber 122 is maintained constant. According to the relation in Equation 2 mentioned earlier, the spring force F1 of the valve spring 200, the spring force F2 of the pressure adjustment spring 220, the pressure reception area S1 of the valve 190, and the pressure reception area S2 of the pressing plate 210 are maintained constant in the case where the inner volume of the first pressure control chamber 122 is constant. Thus, the pressure in the first pressure control chamber 122 is determined according to how the pressure (gauge pressure) P1 in the first valve chamber 121 Changes. In this way, in a case where the pressure P1 in the first valve chamber 121 does not change, the pressure P2 in the first pressure control chamber 122 is maintained at the same pressure as the controlled pressure in the print operation.

On the other hand, the pressure in the second pressure control chamber 152 changes with time according to the change in inner volume by the inflow of the ink from the first pressure control chamber 122. Specifically, the pressure in the second pressure control chamber 152 changes according to Equation 2 until the communication port 191 shifts from the state of FIG. 16B to the closed state to thereby allow no communication between the second valve chamber 151 and the second pressure control chamber 152 as illustrated in FIG. 16C. Thereafter, the pressing plate 210 and the valve shaft 190*a* come out of contact with each other, so that the communication port 191 shifts to the closed state. Then, as illustrated in FIG. 16D, the ink flows into the second pressure control chamber 152 from the collection channel 140. This inflow of the ink displaces the pressing plate 210 and the flexible member 230. The pressure in the second pressure control chamber 152 changes according to Equation 4, specifically, the pressure rises until the inner volume of the second pressure control chamber 152 reaches the maximum.

Note that, once the state of FIG. 16C is reached, there is no more ink flow from the first pressure control chamber 122 into the second pressure control chamber 152 through the bypass channel 160 and the second valve chamber 151. Thus, the only flow generated is the ink in the first pressure control chamber 122 that is supplied to the ejection module 300 through the supply channel 130 and then flows into the second pressure control chamber 152 through the collection channel 140. As mentioned earlier, the ink moves from the first pressure control chamber 122 to the second pressure control chamber 152 according to the differential pressure between the pressure in the first pressure control chamber 122 and the pressure in the second pressure control chamber 152. Thus, in a case where the pressure in the second pressure control chamber 152 becomes equal to the pressure in the first pressure control chamber 122, the ink stops moving.

Also, in the state where the pressure in the second pressure control chamber 152 is equal to the pressure in the first pressure control chamber 122, the second pressure control chamber 152 expands to the state illustrated in FIG. 16D. In the case where the second pressure control chamber 152 expands as illustrated in FIG. 16D, a reservoir portion capable of holding the ink is formed in the second pressure control chamber 152. Note that the transition to the state of FIG. 16D after stopping the circulation pump 500 takes about 1 to 2 minutes, although the time may vary depending on the shapes and sizes of the channels and properties of the ink. As the circulation pump 500 is driven in the state illustrated in FIG. 16D, in which the ink is held in the reservoir portion, the ink is the reservoir portion is supplied to the first pressure control chamber 122 by the circulation pump 500. Accordingly, as illustrated in FIG. 16E, the amount of the ink in the first pressure control chamber 122 increases, so that the flexible member 230 and the pressing plate 210 are displaced in the expanding direction. Then, as the circulation pump 500 continues to be driven, the state inside the circulation path changes as illustrated in FIG. 16A.

Note that, in the above description, FIG. 16A has been described as an example of the ink circulation during a print operation. However, the ink may be circulated without a print operation. Even in this case, the ink flows as illustrated in FIGS. 16A to 16E in response to the driving and stopping of the circulation pump 500.

Also, as described above, in the first embodiment, an example has been used in which the communication port 191B in the second pressure adjustment unit 150 shifts to the open state in the case where the ink is circulated by driving the circulation pump 500, and shifts to the closed state in the case where the ink circulation stops. However, the first embodiment is not limited to this example. The controlled pressure may be set such that the communication port 191B in the second pressure adjustment unit 150 is in the closed state even in the case where the ink is circulated by driving the circulation pump 500. This will be specifically described below along with the function of the bypass channel 160.

The bypass channel 160 connecting the first pressure adjustment unit 120 and the second pressure adjustment unit 150 is provided in order that, in a case where the negative pressure generated inside the circulation path becomes stronger than a preset value, for example, the ejection module 300 can avoid the effect of it. The bypass channel 160 is also provided in order to supply the ink to the pressure chambers 12 from both the supply channel 130 and the collection channel 140.

A description will be given of an example of avoiding the effect of the negative pressure becoming stronger than the preset value on the ejection module 300 by providing the bypass channel 160. For example, a change in environmental temperature sometimes changes a properly (e.g., viscosity) of the ink. As the viscosity of the ink changes, the pressure loss within the circulation path changes as well. For example, as the viscosity of the ink drops, the amount of pressure loss within the circulation path decreases. As a result, the flow rate of the circulation pump 500 driven at a constant driving amount increases, and the flow rate through the ejection module 300 increases. Here, the ejection module 300 is kept at a constant temperature by a temperature adjustment mechanism not illustrated. Hence, the viscosity of the ink inside the ejection module 300 is maintained constant even if the environmental temperature changes. The viscosity of the ink inside the ejection module 300 remains uncharged whereas the flow rate of the ink flowing through the ejection module 300 increases, and therefore the negative pressure in the ejection module 300 becomes accordingly stronger due to flow resistance. If the negative pressure in the ejection module 300 becomes stronger than the preset value as described above, there is a possibility that the menisci in the ejection ports 13 may break and the ambient air may be taken into the circulation path, which may lead to a failure to perform normal ejection. Also, even if the menisci do not break, there is still a possibility that the negative pressure in the pressure chambers 12 may become stronger than a predetermined level and affect the ejection.

For these reasons, in the first embodiment, the bypass channel 160 is formed in the circulation path. By providing the bypass channel 160, the ink flows through the bypass channel 160 in the case where the negative pressure is stronger than the preset value. Thus, the pressure in the ejection module 300 is kept constant. Thus, for example, the controlled pressure may be set such that the communication port 191B in the second pressure adjustment unit 150 is maintained in the closed state even in the case where the circulation pump 500 is driven. Moreover, the controlled pressure in the second pressure adjustment unit 150 may be set such that the communication port 191B in the second pressure adjustment unit 150 shifts to the open state in the case where the negative pressure becomes stronger than the preset value. In other words, the communication port 191B may be in the closed state in the case where the circulation pump 500 is driven as long as the menisci do not collapse or a predetermined negative pressure is maintained even if the flow rate of the pump changes due to the change in viscosity caused by an environmental change or the like.

Configuration of Ejection Unit

Figure 17A:
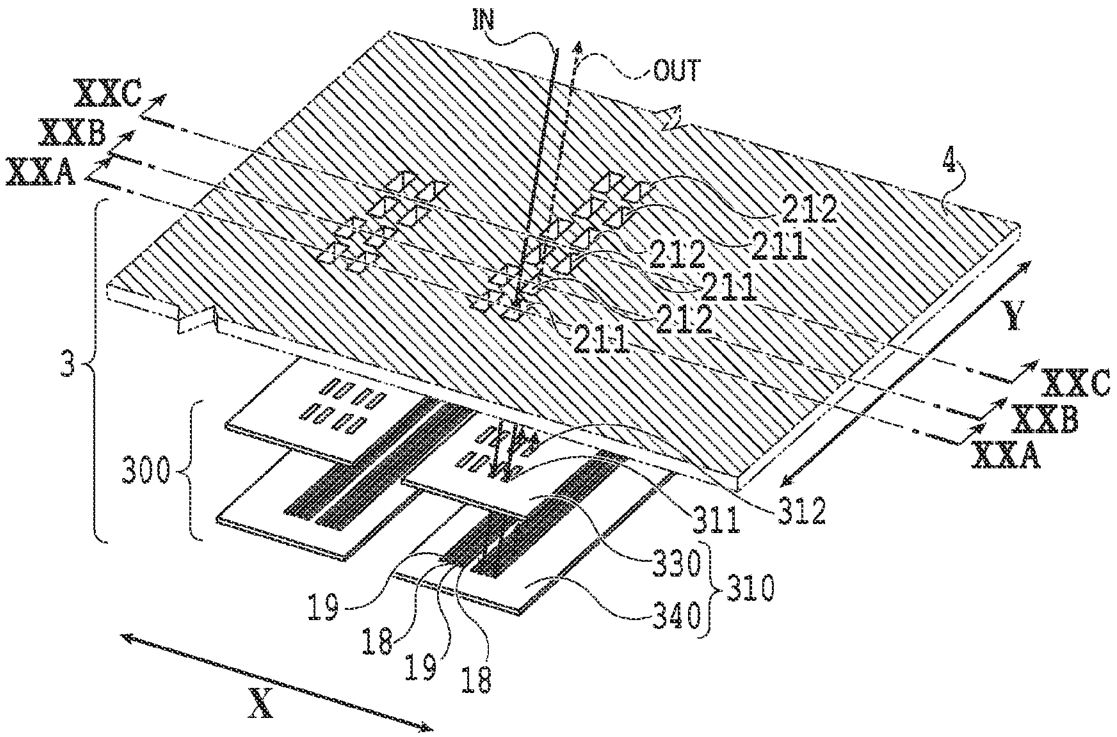
FIGS. 17A and 17B are schematic views illustrating a circulation path for one ink color.
Figure 17B:
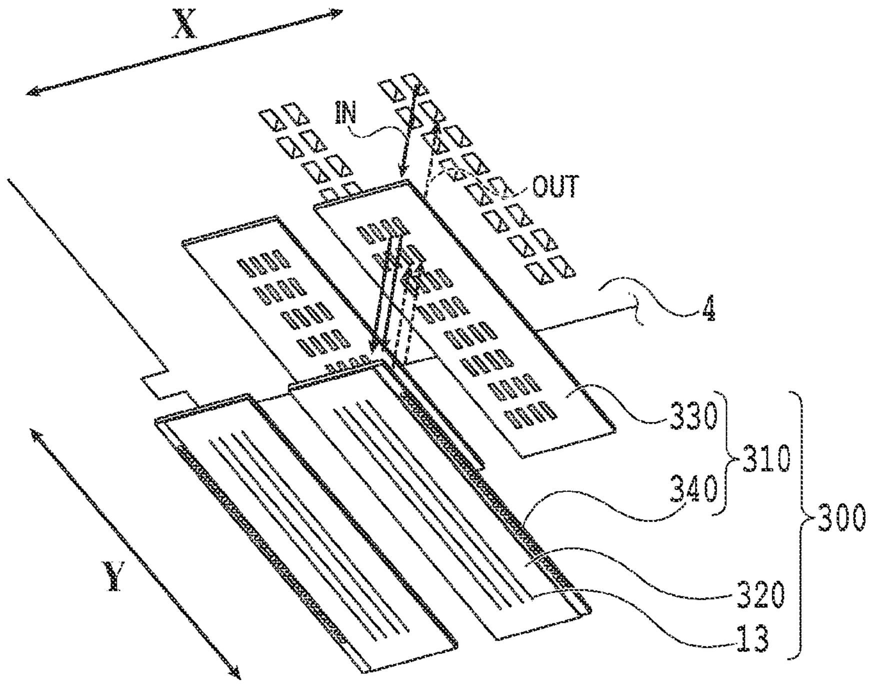
Figure 18:
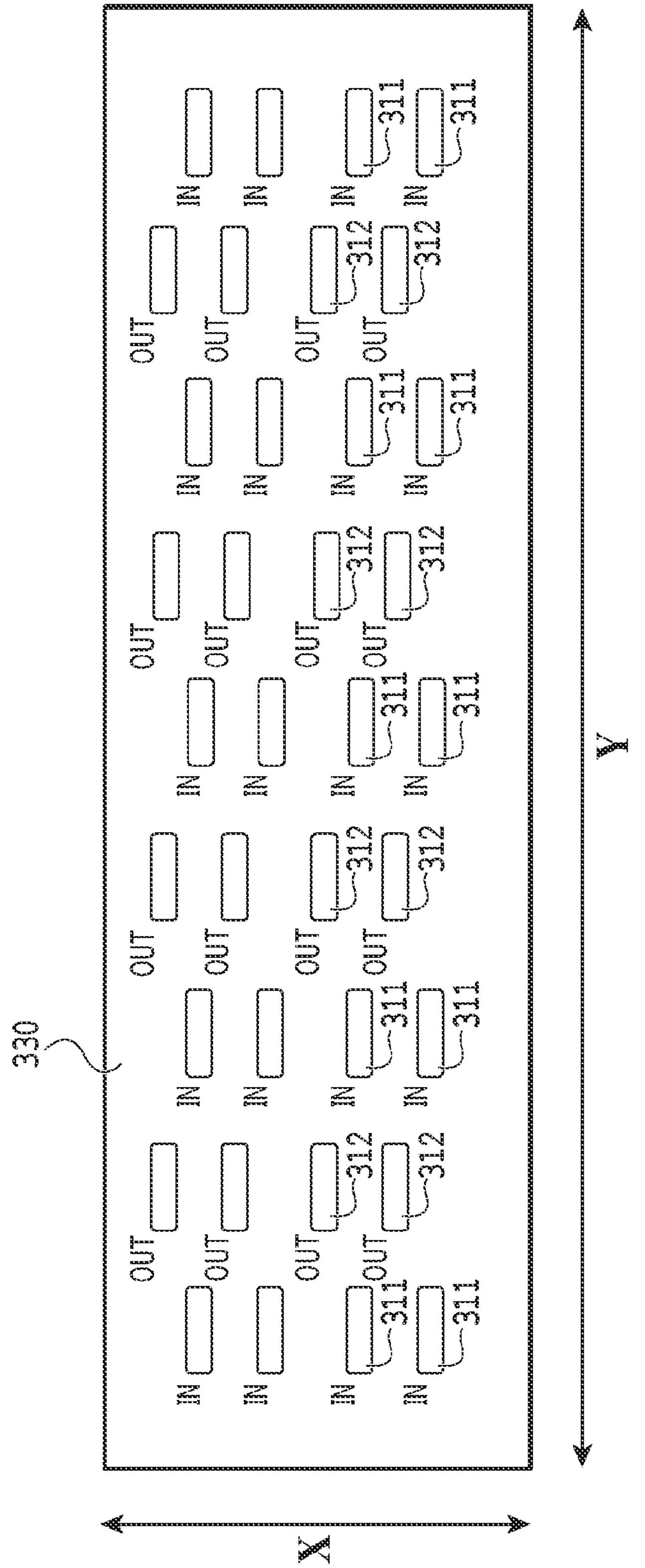
FIG. 18 is a view illustrating an opening plate.
Figure 19:
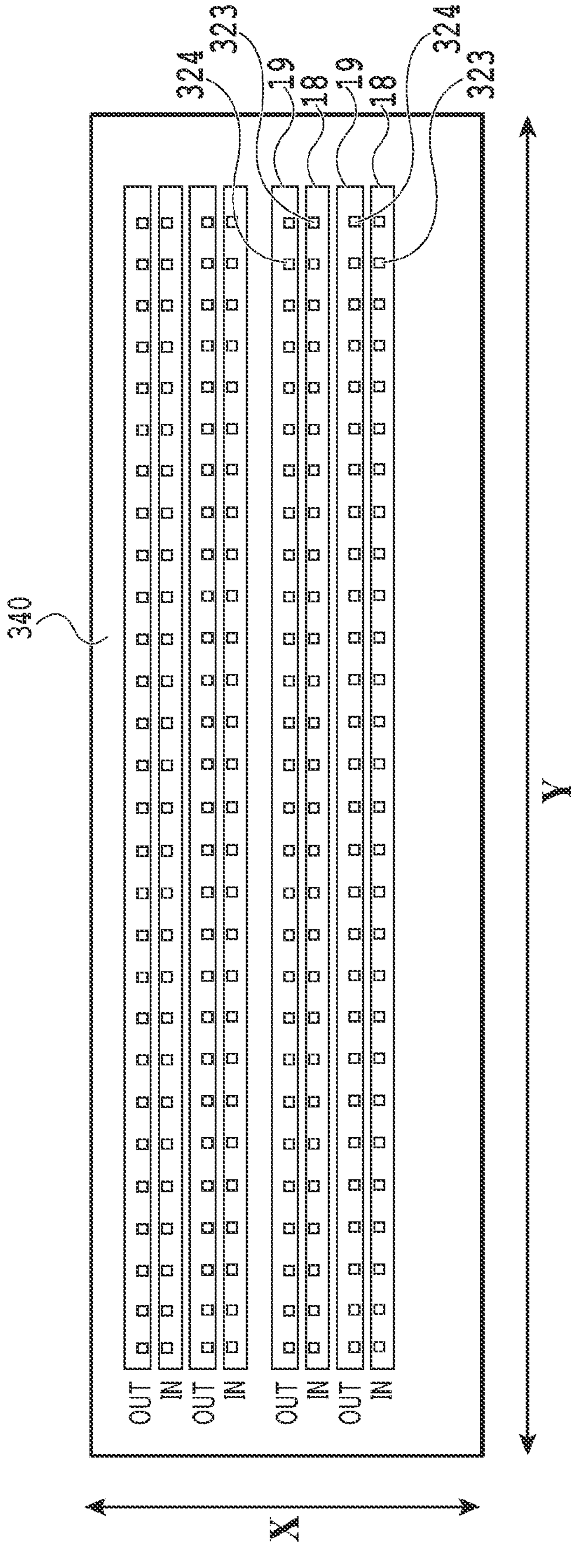
FIG. 19 is a view illustrating an ejection element substrate.

FIGS. 17A and 17B are schematic views illustrating a circulation path for an ink of one color in the ejection unit 3 in the first embodiment. FIG. 17A is an exploded perspective view of the ejection unit 3 as seen from the first support member 4 side. FIG. 17B is an exploded perspective view of the ejection unit 3 as seen from the ejection module 300 side. Note that the arrows denoted as “IN” and “OUT” in FIGS. 17A and 17B indicate the ink flow, and the ink flow will be described only for one color, but the inks of the other colors flow similarly. Moreover, in FIGS. 17A and 17B, illustration of the second support member 7 and the electric wiring member 5 is omitted, and description of them is also omitted in the following description of the configuration of the ejection unit. Moreover, as for the first support member 4 in FIG. 17A, a cross section along the line XVII-XVII in FIG. 3A is illustrated. Each ejection module 300 includes an ejection element substrate 340 and an opening plate 330. FIG. 18 is a view illustrating the opening plate 330. FIG. 19 is a view illustrating the ejection element substrate 340.

The ejection unit 3 is supplied with an ink from each circulation unit 54 through the joint member 8 (see FIG. 3A). An ink path for an ink to return to the joint member 8 after passing the joint member 8 will now be described. Note that illustration of the joint member 8 is omitted in drawings to be mentioned below.

Each ejection module 300 includes the ejection element substrate 340 and the opening plate 330, which are the silicon substrate 310, and further includes the discharge port forming member 320. The ejection element substrate 340, the opening plate 330, and the discharge port forming member 320 form the ejection module 300 by being stacked and joined such that each ink's channels communicate with each other. The ejection module 300 is supported on the first support member 4. The ejection unit 3 is formed by supporting each ejection module 300 on the first support member 4. The ejection element substrate 340 includes the discharge port forming member 320, and the discharge port forming member 320 includes a plurality of ejection port arrays each being a plurality of ejection ports 13 forming a line. Part of the ink supplied through ink channels in the ejection module 300 is ejected from the ejection ports 13. The ink not ejected is collected through ink channels in the ejection module 300.

As illustrated in FIGS. 17A and 17B and FIG. 18, the opening plate 330 includes a plurality of arrayed ink supply ports 311 and a plurality of arrayed ink collection ports 312. As illustrated in FIG. 19 and FIGS. 20A to 20C, the ejection element substrate 340 includes a plurality of arrayed supply connection channels 323 and a plurality of arrayed collection connection channels 324. The ejection element substrate 340 further includes the common supply channels 18 communicating with the plurality of supply connection channels 323 and the common collection channels 19 communicating with the plurality of collection connection channels 324. The ink supply channels 48 and the ink collection channels 49 (see FIGS. 3A and 3B) disposed in the first support member 4 and the channels disposed in each ejection module 300 communicate with each other to form the ink channels inside the ejection unit 3. Support member supply ports 211 are openings in cross section forming the ink supply channels 48. Support member collection ports 212 are openings in cross section forming the ink collection channels 49.

The ink to be supplied to the ejection unit 3 is supplied from the circulation unit 54 (see FIG. 3A) side to the ink supply channels 48 (see FIG. 3A) in the first support member 4. The ink that has flowed through the support member supply ports 211 in the ink supply channels 48 is supplied to the common supply channels 18 in the ejection element substrate 340 through the ink supply channels 48 (see FIG. 3A) and the ink supply ports 311 in the opening plate 330, and enters the supply connection channels 323. The channels up to this point are the supply-side channels. Thereafter, the ink passes through the pressure chambers 12 (see FIG. 3B) in the discharge port forming member 320 and flows into the collection connection channels 324 of the collection-side channels. Details of the ink flow in the pressure chambers 12 will be described below.

In the collection-side channels, the ink that has entered the collection connection channels 324 flows into the common collection channels 19. Thereafter, the ink flows from the common collection channels 19 into the ink collection channels 49 in the first support member 4 through the ink collection ports 312 in the opening plate 330, and is collected into the circulation unit 54 through the support member collection ports 212.

Regions of the opening plate 330 where the ink supply ports 311 or the ink collection ports 312 are not present correspond to regions of the first support member 4 for separating the support member supply ports 211 and the support member collection ports 212. Also, the first support member 4 does not have openings at these regions. Such regions are used as bonding regions in a case of bonding the ejection module 300 and the first support member 4.

In FIG. 18, a plurality of arrays of openings arranged along the X direction are provided side by side in the Y direction in the opening plate 330, and the openings for supply (IN) and the openings for collection (OUT) are arranged alternately in the Y direction while being shifted from each other by a half pitch in the X direction. In FIG. 19, in the ejection element substrate 340, the common supply channels 18 communicating with the plurality of supply connection channels 323 arrayed in the Y direction and the common collection channels 19 communicating with the plurality of collection connection channels 324 arrayed in the Y direction are arrayed alternately in the X direction. The common supply channels 18 and the common collection channels 19 are separated by the ink type. Moreover, the number of ejection port arrays for each color determines the numbers of common supply channels 18 and common collection channels 19 to be disposed. Also, the number of the disposed supply connection channels 323 and the number of the disposed collection connection channels 324 corresponds to the number of ejection ports 13. Note that a one-to-one correspondence is not necessarily essential, and a single supply connection channel 323 and a single collection connection channel 324 may correspond to a plurality of ejection ports 13.

Each ejection module 300 is formed by stacking and joining the opening plate 330 and the ejection element substrate 340 as above such that each ink's channels communicate with each other, and is supported on the first support member 4. As a result, ink channels including the supply channels and the collection channels as above are formed.

Figure 20A:
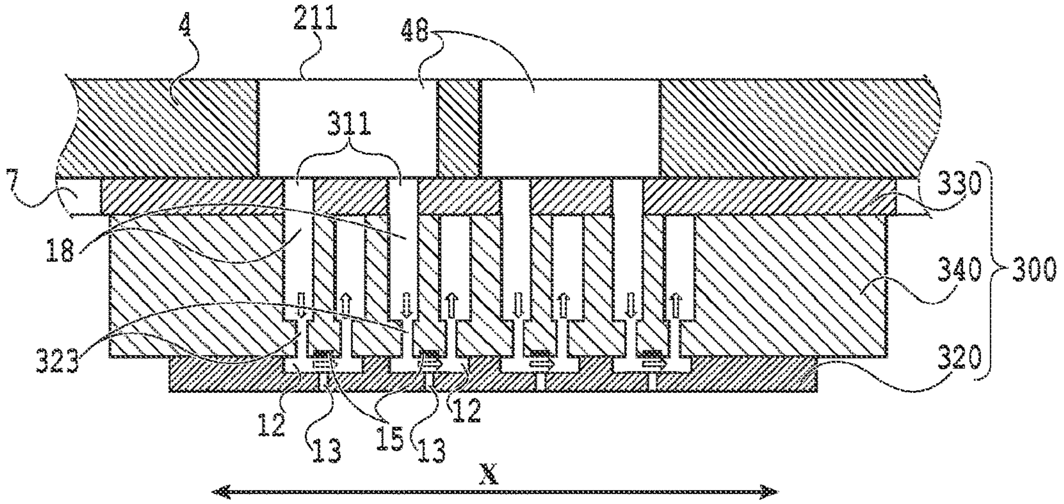
FIGS. 20A to 20C are cross-sectional views illustrating ink flows.
Figure 20B:
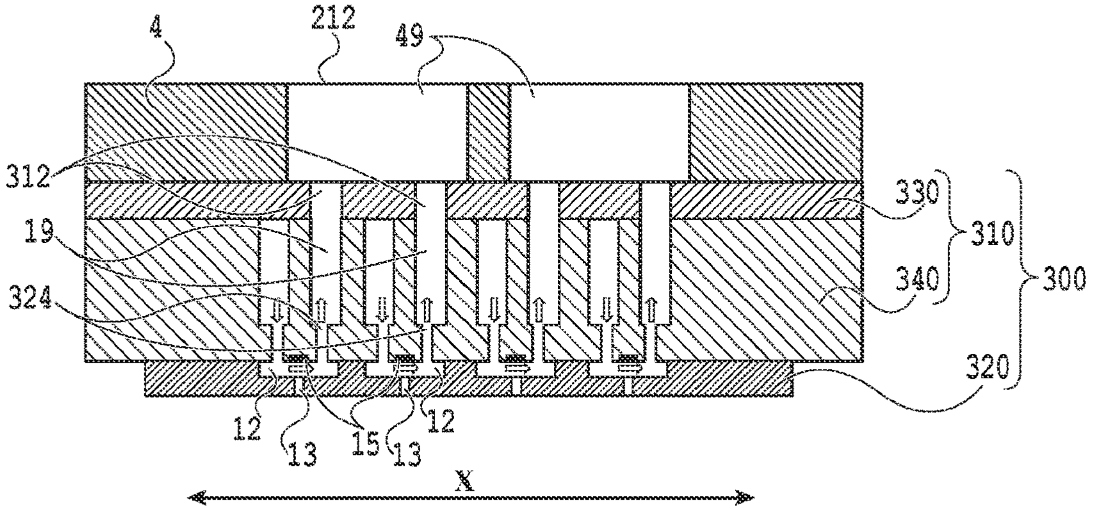
Figure 20C:
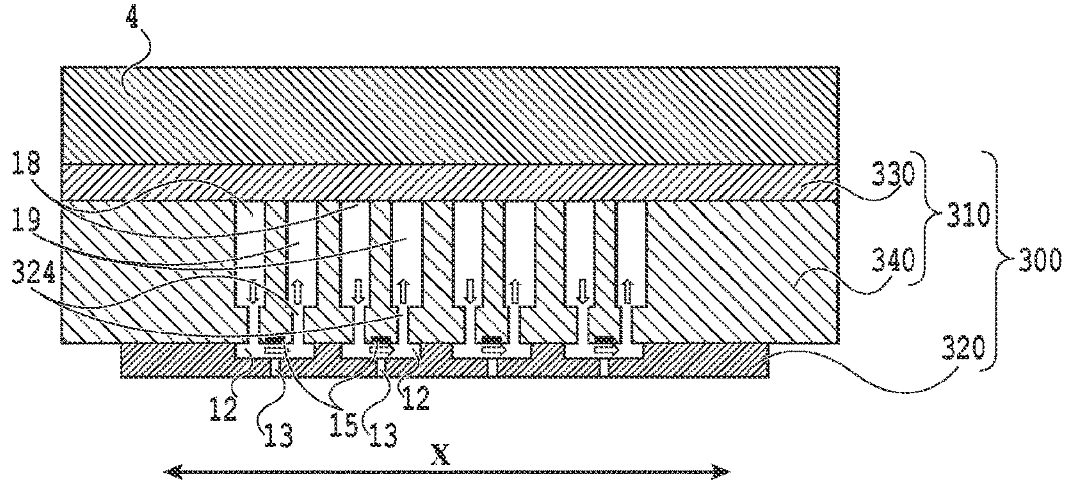

FIGS. 20A to 20C are cross-sectional views illustrating ink flows at different portions of the ejection unit 3. FIG. 20A is a cross section taken along the line XXA-XXA in FIG. 17A, and illustrates a cross section of a portion of the ejection unit 3 where ink supply channels 48 and ink supply ports 311 communicate with each other. FIG. 20B is a cross section taken along the line XXB-XXB in FIG. 17A, and illustrates a cross section of a portion of the ejection unit 3 where ink collection channels 49 and ink collection ports 312 communicate with each other. Also, FIG. 20C is a cross section taken along the line XXC-XXC in FIG. 17A, and illustrates a cross section of a portion where the ink supply ports 311 and the ink collection ports 312 do not communicate with channels in the first support member 4.

As illustrated in FIG. 20A, the supply channels for supplying the inks supply the inks from the portions where the ink supply channels 48 in the first support member 4 and the ink supply ports 311 in the opening plate 330 overlap and communicate with each other. Moreover, as illustrated in FIG. 20B, the collection channels for collecting the inks collect the inks from the portions where the ink collection channels 49 in the first support member 4 and the ink collection ports 312 in the opening plate 330 overlap and communicate with each other. Furthermore, as illustrated in FIG. 20C, the ejection unit 3 locally has regions where no opening is provided in the opening plate 330. At such regions, the inks are neither supplied nor collected between the ejection element substrate 340 and the first support member 4. The inks are supplied at the regions where the ink supply ports 311 are provided, as illustrated in FIG. 20A. The inks are collected at regions where the ink collection ports 312 are provided, as illustrated in FIG. 20B. Note that the first embodiment has been described by taking the configuration using the opening plate 330 as an example, but a configuration not using the opening plate 330 may be employed. For example, the configuration in which channels corresponding to the ink supply channels 48 and the ink collection channels 49 are formed in the first support member 4, and the ejection element substrate 340 is joined to the first support member 4 may be employed.

Figure 21A:
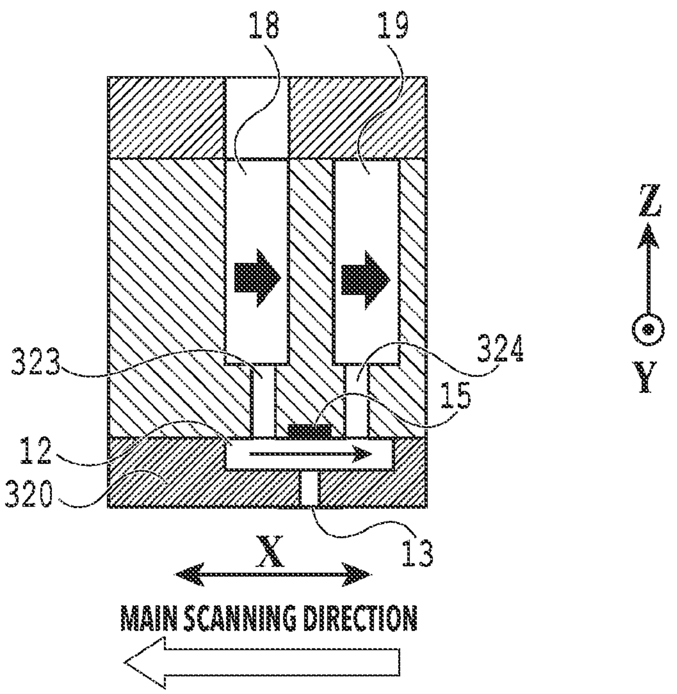
FIGS. 21A and 21B are cross-sectional views illustrating the vicinity of an ejection port.
Figure 21B:
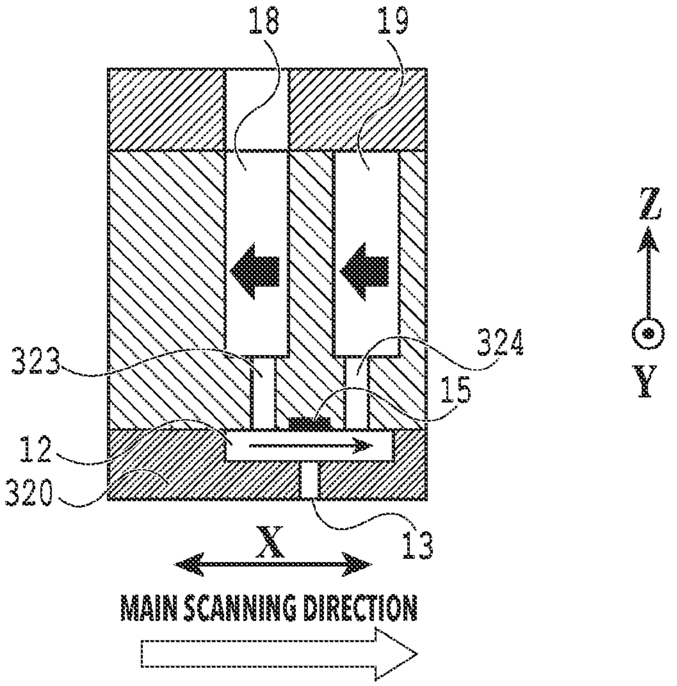

FIGS. 21A and 21B are cross-sectional views illustrating the vicinity of an ejection port 13 in an ejection module 300. Note that the bold arrows illustrated in the common supply channel 18 and the common collection channel 19 in FIGS. 21A and 21B indicate the oscillating movement of an ink which occurs in the configuration using the serial liquid ejection apparatus 50. The ink supplied to the pressure chamber 12 through the common supply channel 18 and the supply connection channel 323 is ejected from the ejection port 13 as the ejection element 15 is driven. In a case where the ejection element 15 is not driven, the ink is collected from the pressure chamber 12 into the common collection channel 19 through the collection connection channel 324, which is a collection channel.

In a case of ejecting the ink circulated as above in the configuration using the serial liquid ejection apparatus 50, the ink ejection is affected to no small extent by the oscillating movement of the ink inside the ink channels caused by the main scanning of the liquid ejection head 1. Specifically, the influence of the oscillating movement of the ink inside the ink channels appears as a difference in the amount of the ink ejected and a deviation in ejection direction. In a case where the common supply channels 18 and the common collection channels 19 have cross-sectional shapes which are wide in the X direction, which is the main scanning direction, the inks inside the common supply channels 18 and the common collection channels 19 more easily receive inertial forces in the main scanning direction so that the inks oscillate greatly. This leads to a possibility that the oscillating movements of the inks may affect the ejection of the inks from the ejection ports 13. Moreover, widening the common supply channels 18 and the common collection channels 19 in the X direction widens the distance between the colors. This may lower the printing efficiency.

Hence, each common supply channel 18 and each common collection channel 19 in the first embodiment whose cross sections are illustrated in FIGS. 21A and 21B have a configuration that each common supply channel 18 and each common collection channel 19 extend in the Y direction and also extend in the Z direction, which is perpendicular to the X direction, which is the main scanning direction. With such a configuration, the common supply channel 18 and the common collection channel 19 are given small channel widths in the main scanning direction. By giving the common supply channel 18 and the common collection channel 19 small channel widths in the main scanning direction, the oscillating movement of the ink inside the common supply channel 18 and the common collection channel 19 by the inertial force acting on the ink and exerted in the direction opposite to the main scanning direction (the black hold arrows in FIGS. 21A and 21B) during main scanning becomes smaller. This reduces the influence of the oscillating movement of the ink in the ejection of the ink. Moreover, by extending the common supply channel 18 and the common collection channel 19 in the Z direction, their cross-sectional areas are increased. This reduces the channel pressure drop.

As described above, each common supply channel 18 and each common collection channel 19 are given small channel widths in the main scanning direction. This configuration reduces the oscillating movement of the ink inside the common supply channel 18 and the common collection channel 19 during main scanning but does not eliminate the oscillating movement. Thus, in the first embodiment, in order to reduce the difference in ejection between the ink types that may be generated by the reduced oscillating movement, the configuration is such that the common supply channel 18 and the common collection channel 19 are disposed at positions overlapping each other in the X direction.

As described above, in the first embodiment, the supply connection channels 323 and the collection connection channels 324 are provided so as to correspond to the ejection ports 13. Moreover, the correspondence relationship between the supply connection channels 323 and the collection connection channels 324 establishes such that the supply connection channels 323 and the collection connection channels 324 are arrayed in the X direction with the ejection ports 13 interposed therebetween. Thus, if the common supply channel 18 and the common collection channel 19 have a portion(s) where the common supply channel 18 and the common collection channel 19 do not overlap each other in the X direction, the correspondence between the supply connection channels 323 and the collection connection channels 324 in the X direction breaks. This lack of correspondence affects the ink flow in the pressure chambers 12 in the X direction and the ink ejection. If this lack of correspondence is combined with the influence of the oscillating movement of the ink, there is a possibility that it may further affect the ink ejection from each ejection port.

Thus, by disposing the common supply channel 18 and the common collection channel 19 at positions overlapping each other in the X direction, the oscillating movement of the ink inside the common supply channel 18 and the common collection channel 19 during main scanning is substantially the same at any position in the Y direction, in which the ejection ports 13 are arrayed. Thus, the pressure differences generated in the pressure chambers 12 between the common supply channel 18 side and the common collection channel 19 side do not greatly vary. These low pressure differences enable stable ejection.

Also, some liquid ejection heads which circulate an ink therein are configured such that the channel for supplying the ink to the liquid ejection head and the channel for collecting the ink are the same channel. However, in the first embodiment, the common supply channel 18 and the common collection channel 19 are different channels. Moreover, the supply connection channels 323 and the pressure chambers 12 communicate with each other, the pressure chambers 12 and the collection connection channels 324 communicate with each other, and the inks are ejected from the ejection ports 13 in the pressure chambers 12. That is, the configuration that the pressure chambers 12 serving as paths connecting the supply connection channels 323 and the collection connection channels 324 include the ejection ports 13, is formed. Hence, in each pressure chamber 12, an ink flow flowing from the supply connection channel 323 side to the collection connection channel 324 side is generated, and the ink inside the pressure chamber 12 is efficiently circulated. The ink inside the pressure chamber 12, which tends to be affected by evaporation of the ink from the ejection port 13, is kept fresh by efficiently circulating the ink inside the pressure chamber 12.

Also, since the two channels, namely the common supply channel 18 and the common collection channel 19, communicate with the pressure chamber 12, the ink can be supplied from both channels in a case where it is necessary to perform ejection with a high flow rate. That is, compared to the configuration in which only a single channel is formed for ink supply and collection, the configuration in the first embodiment has an advantage that not only efficient circulation can be performed but also ejection at a high flow rate can be handled.

Incidentally, the oscillating movement of the ink causes a less effect in a case where the common supply channel 18 and the common collection channel 19 are disposed at positions close to each other in the X direction. The common supply channel 18 and the common collection channel 19 are desirably disposed such that the gap between the channels is 75 μm to 100 μm.

The inks having received thermal energy from the ejection elements 15 in the pressure chambers 12 flow into the common collection channels 19. Hence, the temperature of the inks flowing through the common collection channels 19 is higher than the temperature of the inks in the common supply channels 18. Here, if only the common collection channels 19 are present at one portion of the ejection element substrate 340 in the X direction, the temperature may locally rise at that portion, thereby causing temperature unevenness within the ejection module 300. This temperature unevenness may affect the ejection.

The temperature of the inks flowing through the common supply channels 18 is lower than that in the common collection channels 19. Thus, if the common supply channels 18 and the common collection channels 19 are close to each other, the ink in the common supply channels 18 whose temperature is relatively lower lowers the temperature of the ink in the common collection channels 19 at the points where both channels are close. This suppresses a temperature rise. For this reason, it is preferable that the common supply channels 18 and the common collection channels 19 have substantially the same length, be present at positions overlapping each other in the X direction, and be close to each other.

Figure 22A:
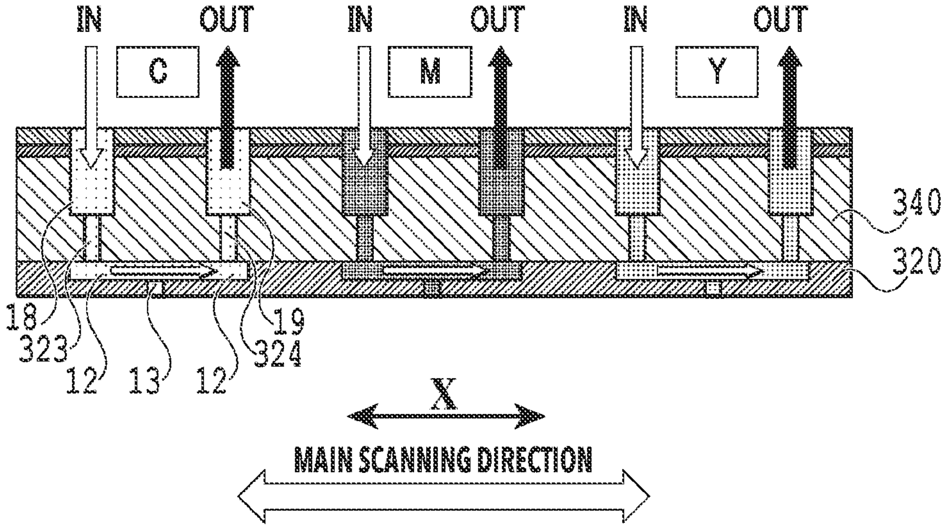
FIGS. 22A and 22B are views illustrating a channel configuration of the liquid ejection head.
Figure 22B:
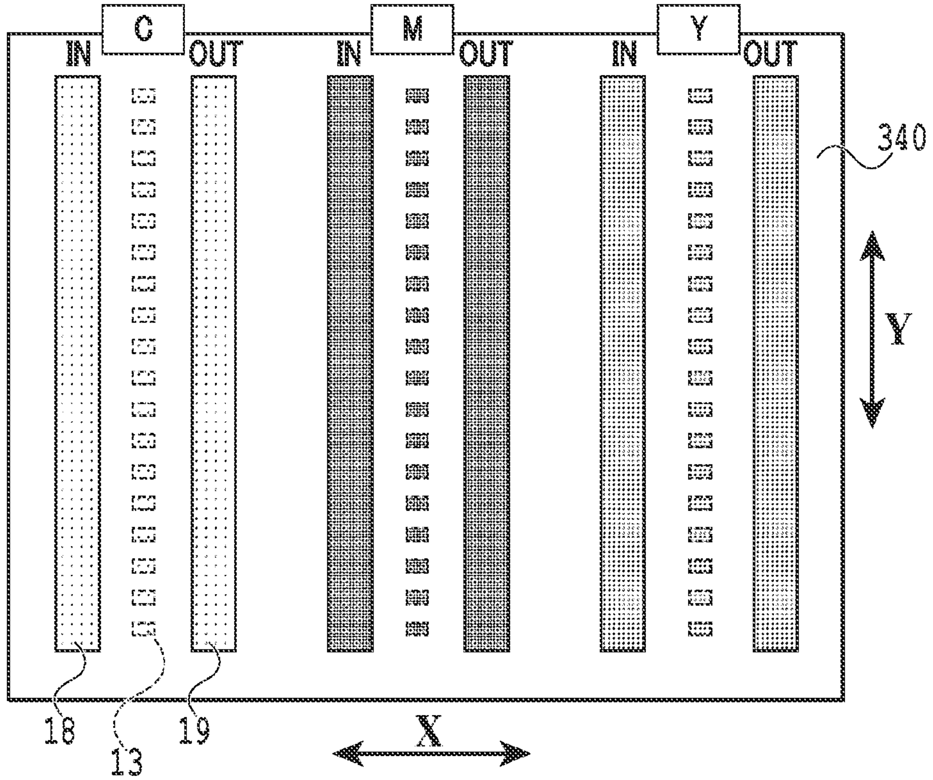

FIGS. 22A and 22B are views illustrating a channel configuration of the liquid ejection head 1 for the inks of the three colors of cyan (C), magenta (M), and yellow (Y). In the liquid ejection head 1, a circulation channel is provided for each ink type as illustrated in FIG. 22A. The pressure chambers 12 are provided along the X direction, which is the main scanning direction of the liquid ejection head 1. Also, as illustrated in FIG. 22B, the common supply channels 18 and the common collection channels 19 are provided along the ejection port arrays, which are arrays of ejection ports 13. The common supply channels 18 and the common collection channels 19 are provided so as to extend in the Y direction with the ejection port arrays therebetween.

Connection of Main Body Units and Liquid Ejection Head

Figure 23:
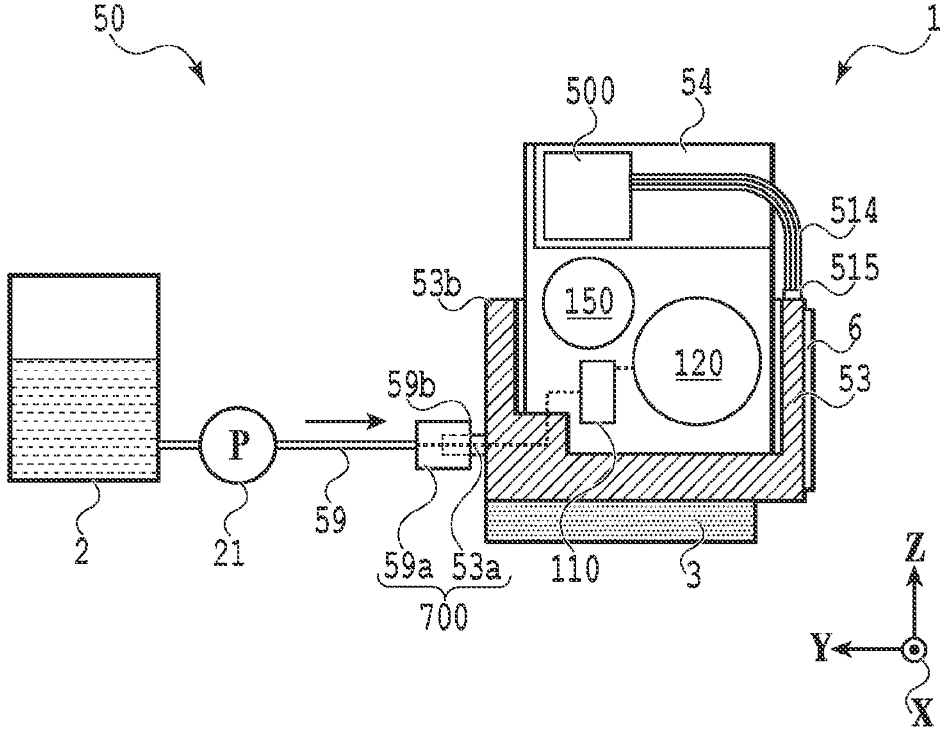
FIG. 23 is a schematic configuration diagram illustrating arrangement of a circulation pump and other components more specifically.

FIG. 23 is a schematic configuration diagram more specifically illustrating a state where an ink tank 2 and an external pump 21 provided as main body units of the liquid ejection apparatus 50 in the first embodiment and the liquid ejection head 1 are connected, and an arrangement of a circulation pump and so on. The liquid ejection apparatus 50 in the first embodiment has such a configuration that only the liquid ejection head 1 can be easily replaced in a case where a problem occurs in the liquid ejection head 1. Specifically, the liquid ejection apparatus 50 in the present embodiment has the liquid connection parts 700, with which the respective ink supply tubes 59 connected to the respective external pumps 21 and the liquid ejection head 1 can be easily connected to and disconnected from each other. This enables only the liquid ejection head 1 to be easily attached to and detached from the liquid ejection apparatus 50.

As illustrated in FIG. 23, each liquid connection part 700 has a liquid connector insertion slot 53*a* which is provided in a protruding manner on the head housing 53 of the liquid ejection head 1, and a cylindrical liquid connector 59*a* into which this liquid connector insertion slot 53*a* is insertable. The liquid connector insertion slot 53*a* is fluidly connected to an ink supply channel formed in the liquid ejection head 1, and is connected to the first pressure adjustment unit 120 through the filter 110 mentioned earlier. The liquid connector 59*a* is provided at the tip of the ink supply tube 59 connected to the external pump 21, which supplies the ink in the ink tank 2 to the liquid ejection head 1 by pressurization.

As described above, the liquid ejection head 1 illustrated in FIG. 23 has the liquid connection part 700. This facilitates the work of attaching, detaching, and replacing the liquid ejection head 1. However, in a case where the sealing performance between the liquid connector insertion slot 53*a* and the liquid connector 59*a* deteriorates, there is a possibility that the ink supplied by pressurization by the external pump 21 may leak from the liquid connection part 700. The leaked ink may cause a problem in the electrical system if attached to the circulation pump 500, for example. To address this, in the first embodiment, the circulation pump, etc., are disposed as below.

Arrangement of Circulation Pump, etc.

As illustrated in FIG. 23, in the first embodiment, in order to avoid attachment of the ink leaking from the liquid connection part 700 to the circulation pump 500, the circulation pump 500 is disposed higher than the liquid connection part 700 in the direction of gravity. Specifically, the circulation pump 500 is disposed higher than the liquid connector insertion slot 53*a*, which is a liquid inlet in the liquid ejection head 1, in the direction of gravity. Moreover, the circulation pump 500 is disposed at such a position as to be out of contact with the constituent members of the liquid connection part 700. In this way, even if the ink leaks from the liquid connection part 700, the ink flows in a horizontal direction, which is the opening direction of the opening of the liquid connector 59*a* or downward in the direction of gravity. This prevents the ink from reaching the circulation pump 500 located higher in the direction of gravity. Moreover, disposing the circulation pump 500 at a position separated from the liquid connection part 700 also reduces the possibility of the ink reaching the circulation pump 500 through members.

Furthermore, an electric connection part 515 electrically connecting the circulation pump 500 and the electric contact substrate 6 through a flexible wiring member 514 is provided higher than the liquid connection part 700 in the direction of gravity. Thus, the possibility of the ink from the liquid connection part 700 causing an electrical trouble is reduced.

In addition, in the first embodiment, a wall portion 531 of the head housing 53 is provided. Thus, even if the ink jets out of the liquid connection part 700 from its opening 59*b*, the wall portion 53*b* blocks that ink and thus reduces the possibility of the ink reaching the circulation pump 500 or the electric connection part 515.

Circulation Pumps

Next, a configuration and operation of each circulation pump 500 incorporated in the above liquid ejection head 1 will be described in detail with reference to FIGS. 24A and 24B and FIG. 25.

Figure 24A:
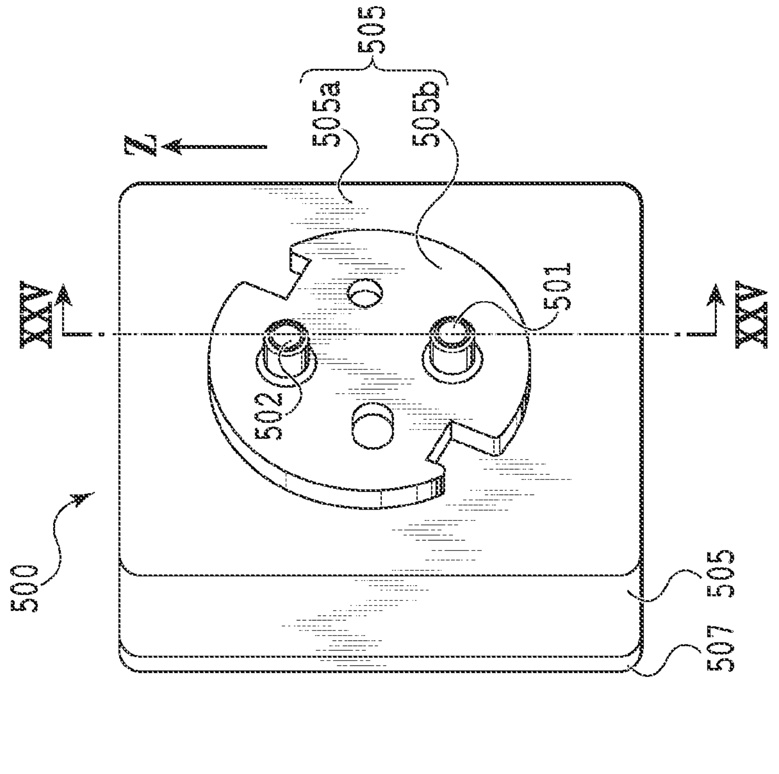
FIGS. 24A and 24B are external perspective views of the circulation pump.
Figure 24B:
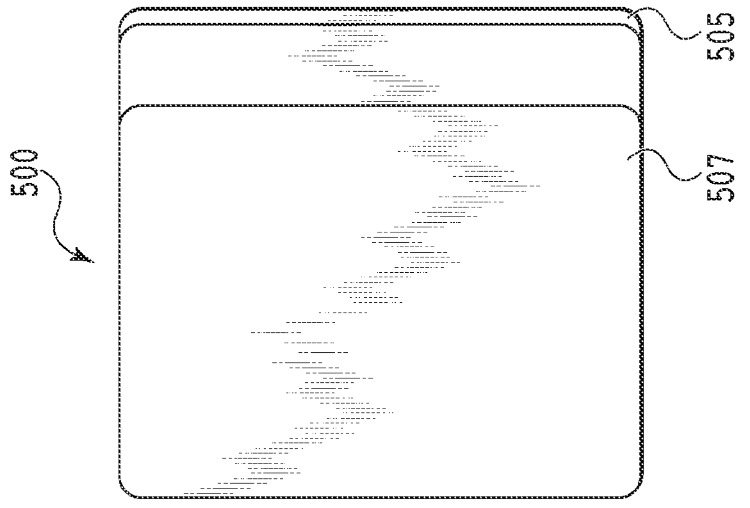

FIGS. 24A and 24B are external perspective views of the circulation pump 500. FIG. 24A is an external perspective view illustrating the front side of the circulation pump 500, and FIG. 24B is an external perspective view illustrating the back side of the circulation pump 500. An outer shell of the circulation pump 500 includes a pump housing 505 and a cover 507 fixed to the pump housing 505. The pump housing 505 includes a housing-part main body 505*a* and a channel connection member 505*b* adhesively fixed to the outer surface of the housing-part main body 505*a*. In each of the housing-part main body 505*a* and the channel connection member 505*b*, a pair of through-holes communicating with each other are formed at two different positions. One of the pair of through-holes provided at one position forms a pump supply hole 501. The other of the pair of through-holes provided at the other position forms a pump discharge hole 502. The pump supply hole 501 is connected to the pump inlet channel 170 connected to the second pressure control chamber 152. The pump discharge hole 502 is connected to the pump outlet channel 180 connected to the first pressure control chamber 122. The ink supplied from the pump supply hole 501 passes through a later-described pump chamber 503 (see FIG. 25) and is discharged from the pump discharge hole 502.

Figure 25:
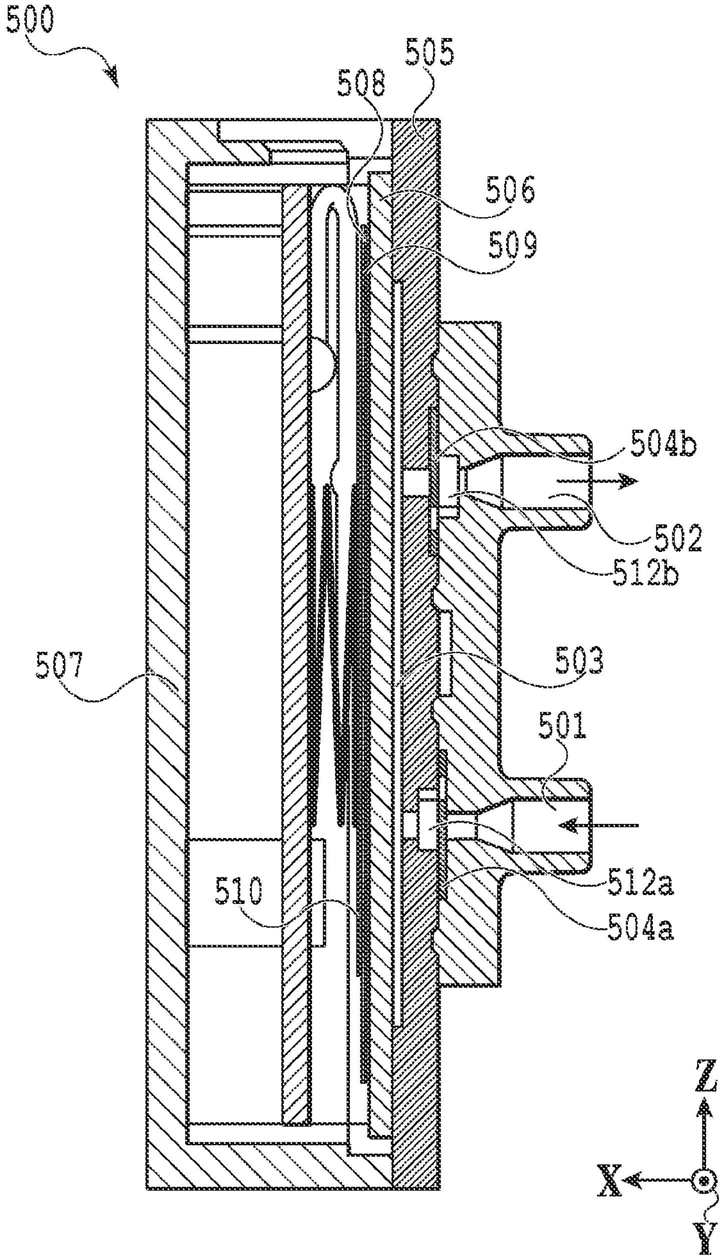
FIG. 25 is a cross-sectional view of the circulation pump.

FIG. 25 is a cross-sectional view of the circulation pump 500 illustrated in FIG. 24A along the XXV-XXV line. A diaphragm 506 is joined to the inner surface of the pump housing 505, and the pump chamber 503 is formed between this diaphragm 506 and a recess formed in the inner surface of the pump housing 505. The pump chamber 503 communicates with the pump supply hole 501 and the pump discharge hole 502, which are formed in the pump housing 505. Also, a check valve 504*a* is provided at an intermediate portion of the pump supply hole 501. A check valve 504*b* is provided at an intermediate portion of the pump discharge hole 502. That is, the circulation pump 500 includes check valves in channels through which the second channel and the third channel communicate with each other. Specifically, the check valve 504*a* is disposed such that a part thereof is movable in the leftward direction in FIG. 25 within a space 512*a* formed at an intermediate portion of the pump supply hole 501. The check valve 504*b* is disposed such that a part thereof is movable in the rightward direction in FIG. 25 within a space 512*b* formed at an intermediate portion of the pump discharge hole 502.

As the diaphragm 506 is displaced so as to increase the volume of the pump chamber 503, the pump chamber 503 is depressurized. In response to this displacement, the check valve 504*a* is separated from the opening of the pump supply hole 501 in the space 512*a* (that is, moves in the leftward direction in FIG. 25). By being separated from the opening of the pump supply hole 501 in the space 512*a*, the check valve 504*a* shifts to an open state in which the ink is allowed to flow through the pump supply hole 501. As the diaphragm 506 is displaced so as to reduce the volume of the pump chamber 503, the pump chamber 503 is pressurized. In response to this displacement, the check valve 504*a* comes into tight contact with the wall surface around the opening of the pump supply hole 501. The check valve 504*a* is thus in a closed state in which the check valve 504*a* blocks the ink flow through the pump supply hole 501.

The check valve 504*b*, on the other hand, comes into tight contact with the wall surface around an opening in the pump housing 505 as the pump chamber 503 is depressurized, thereby shifting to a closed state in which the check valve 504*b* blocks the ink flow through the pump discharge hole 502. Also, as the pump chamber 503 is pressurized, the check valve 504*b* is separated from the opening in the pump housing 505 and moves toward the space 512*b* (that is, moves in the rightward direction in FIG. 25), thereby allowing the ink to flow through the pump discharge hole 502.

Note that the material of each of the check valves 504*a* and 504*b* only needs to be one that is deformable according to the pressure in the pump chamber 503. For example, the material of each of the check valves 504*a* and 504*b* can made from an elastic material such as Ethylene-Propylene-Diene Methylene linkage (EPDM) or an elastomer, or a film or thin plate of polypropylene or the like. However, the material is not limited to these.

As described above, the pump chamber 503 is formed by joining the pump housing 505 and the diaphragm 506. Thus, the pressure in the pump chamber 503 changes as the diaphragm 506 is deformed. For example, in a case where the diaphragm 506 is displaced toward the pump housing 505 (displaced toward the right side in FIG. 25), thereby reducing the volume of the pump chamber 503, the pressure in the pump chamber 503 increases. As a result, the check valve 504*b* disposed so as to face the pump discharge hole 502 shifts to the open state so that the ink in the pump chamber 503 is discharged. At this time, the check valve 504*a* disposed so as to face the pump supply hole 501 is in tight contact with the wall surface around the pump supply hole 501, thereby suppressing backflow of the ink from the pump chamber 503 into the pump supply hole 501.

Conversely, in a case where the diaphragm 506 is displaced in the direction in which the pump chamber 503 widens, the pressure in the pump chamber 503 decreases. As a result, the check valve 504*a* disposed so as to face the pump supply hole 501 shifts to the open state so that the ink is supplied into the pump chamber 503. At this time, the check valve 504*b* disposed in the pump discharge hole 502 comes into tight contact with the wall surface around an opening formed in the pump housing 505 to close this opening. This suppresses backflow of the ink from the pump discharge hole 502 into the pump chamber 503.

As described above, in the circulation pump 500, the ink is sucked and discharged as the diaphragm 506 is deformed and thereby changes the pressure in the pump chamber 503. At this time, in a case where bubbles have entered the pump chamber 503, the displacement of the diaphragm 506 changes the pressure in the pump chamber 503 to a lesser extent due to the expansion or shrinkage of the bubbles. Accordingly, the amount of the liquid to be sent decreases.

To resolve this phenomenon, the pump chamber 503 is disposed in parallel with gravity so that the bubbles having entered the pump chamber 503 can easily gather in an upper portion of the pump chamber 503. In addition, the pump discharge hole 502 is disposed higher than the center of the pump chamber 503. This improves the ease of discharge of bubbles in the pump and thus stabilizes the flow rate.

MODIFICATIONS

Next, various modifications of the above-described embodiments will be described. The modifications to be presented below are applicable to all of the first to third embodiments.

First Modification

Figure 26A:
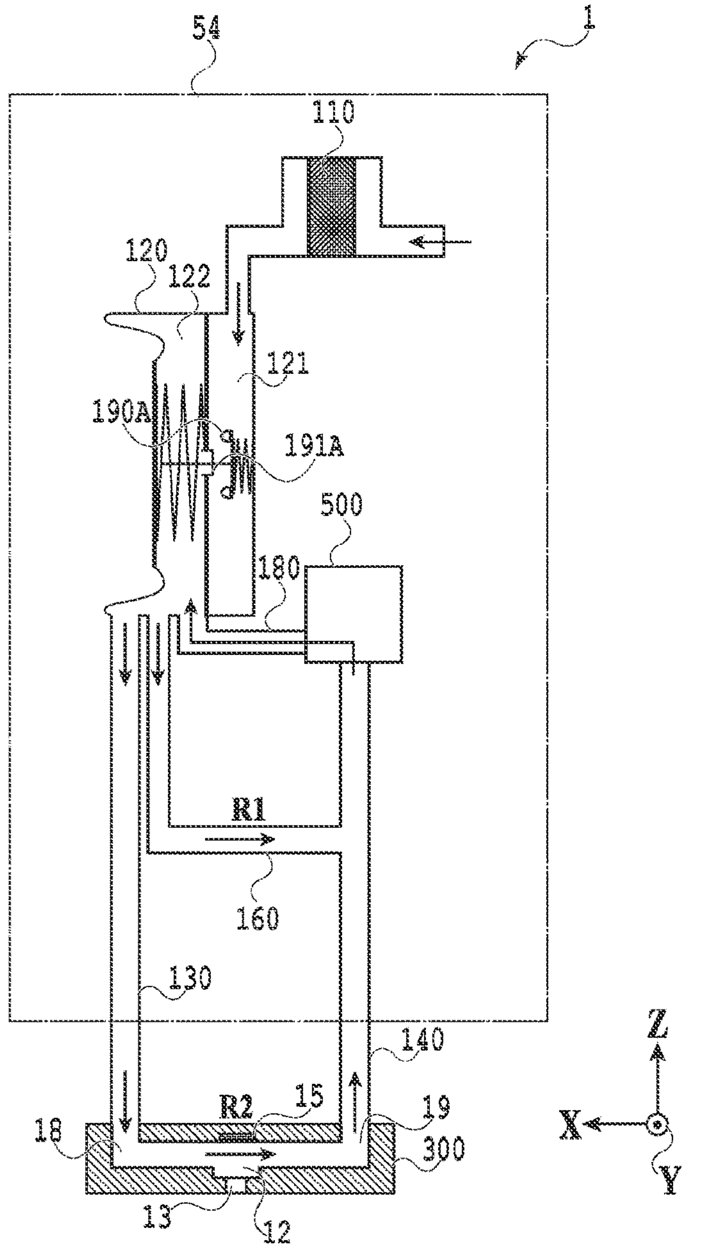
FIGS. 26A and 26B are views schematically illustrating circulation paths.
Figure 26B:
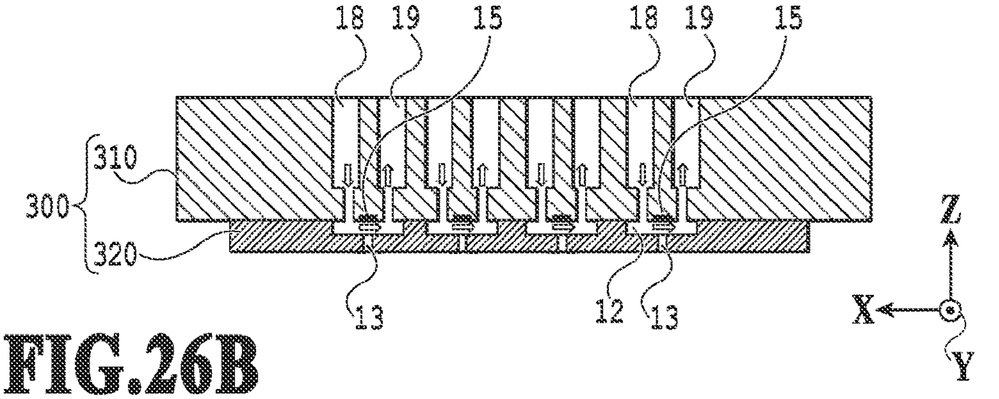
Figure 27A:
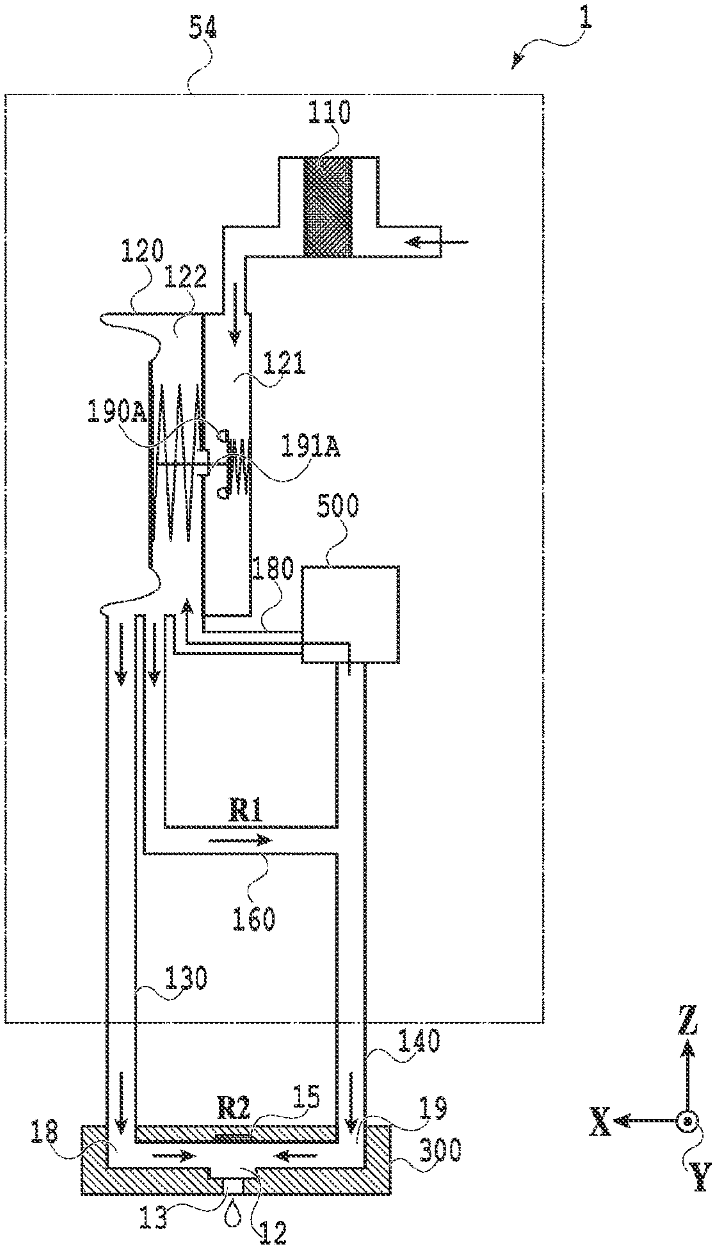
FIGS. 27A and 27B are views schematically illustrating the circulation paths.
Figure 27B:
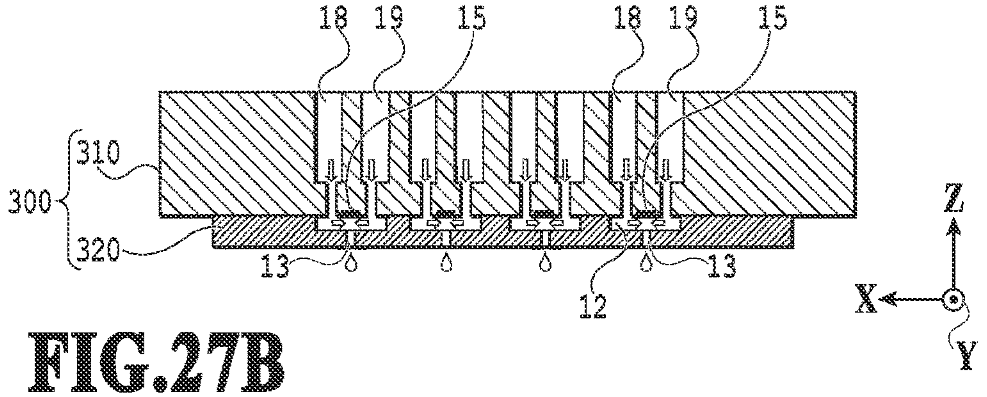

FIGS. 26A and 26B and FIGS. 27A and 27B are views schematically illustrating circulation paths in a first modification. FIGS. 26A and 26B illustrate the circulation paths in a case of performing circulation without performing ejection. FIGS. 27A and 27B illustrate the circulation paths in a case of performing high-duty printing. The first modification represents an example in which the second pressure adjustment unit 150 is not disposed, and the bypass channel 160 and the collection channel 140 are directly connected to each other.

In this configuration, the flow resistance of a channel through which the ink flows to the collection channel 140 through the bypass channel 160 is denoted as R1, and the flow resistance of a channel through which the ink flows to the collection channel 140 from the supply channel 130 through the ejection module 300 will be denoted as R2. The amount of the ink flowing through each channel is in inverse ratio to the resistance. For this reason, the ratio of the flow rate through the channel passing through the bypass channel 160 to the flow rate through the channel passing through the ejection module 300 is R2 to R1. Based on this relationship, each flow resistance is set to obtain an amount of circulation that can suppress thickening of the ink in the vicinity of the ejection ports 13 in the ejection module 300. Specifically, each flow resistance is set such that the flow velocity of the liquid in the pressure chambers will be a predetermined flow velocity or more. The flow resistance R1 of the bypass channel 160 is controlled by, for example, changing its channel cross-sectional area or channel length or providing a constriction.

In the first modification too, in a case of performing a high-duty print operation, an ink is supplied to each pressure chamber 12 from both sides, as illustrated in FIGS. 27A and 27B. Specifically, the ink supplied to the supply channel 130 from the first pressure control chamber 122 is supplied to the ejection ports 13 through the common supply channels 18 in the ejection module 300. On the other hand, part of the ink supplied to the bypass channel 160 from the first pressure control chamber 122 is supplied to the first pressure control chamber 122 through the circulation pump 500 and the pump outlet channel 180. Also, part of the ink supplied to the bypass channel 160 is supplied to the collection channel 140 and then supplied to the ejection ports 13 through the common collection channels 19 in the ejection module 300. Thus, the ink to be ejected from the ejection ports 13 is supplied from both the supply channel 130 and the collection channel 140.

Also, even in a case where there is only one pressure adjustment unit as described above, the ink can be circulated through the circulation path in response to movement of the carriage in the scanning direction.

Second Modification

Figure 28A:
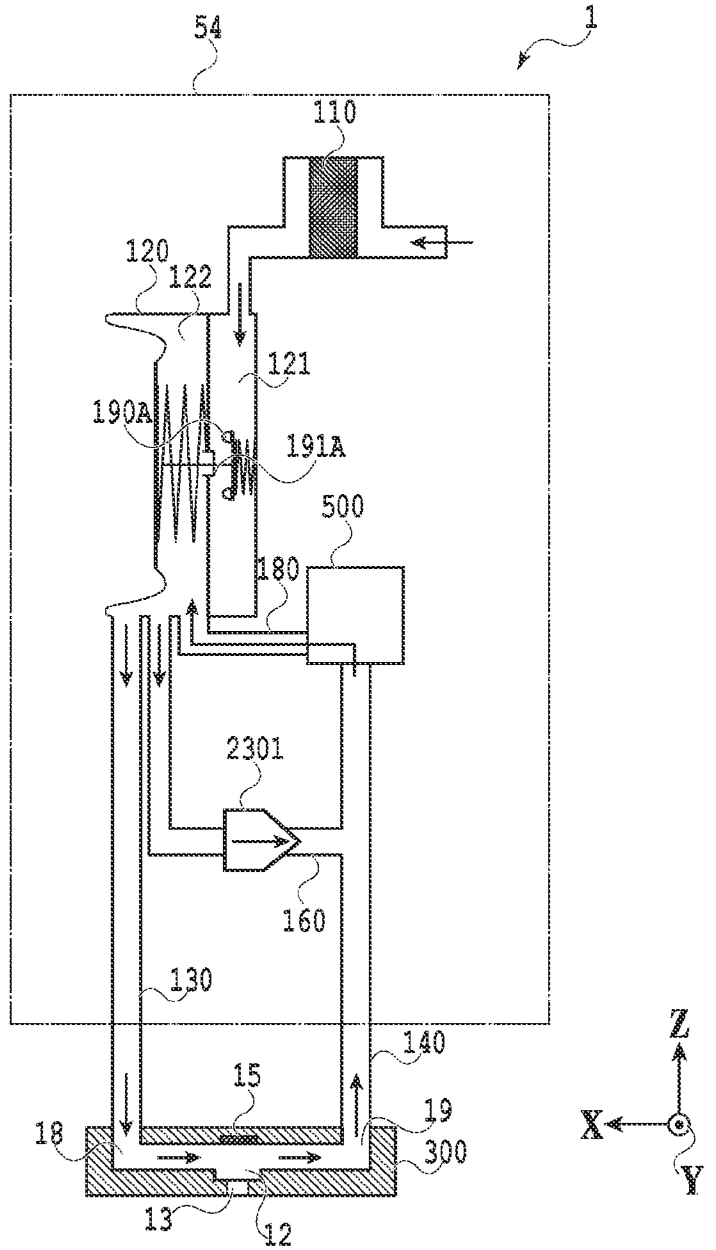
FIGS. 28A and 28B are views schematically illustrating circulation paths.
Figure 28B:
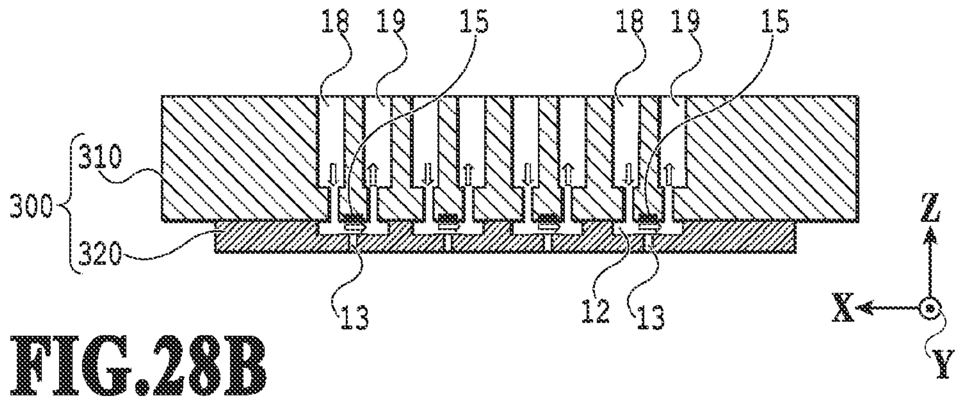
Figure 29A:
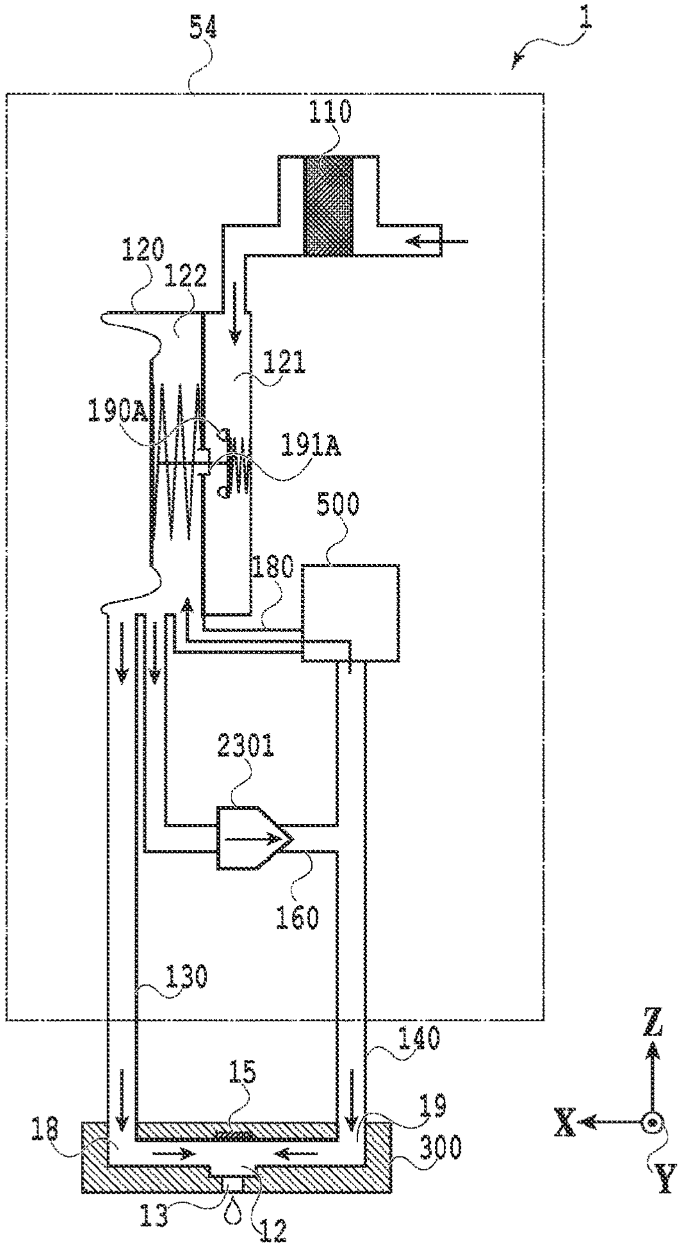
FIGS. 29A and 29B are views schematically illustrating the circulation paths.
Figure 29B:
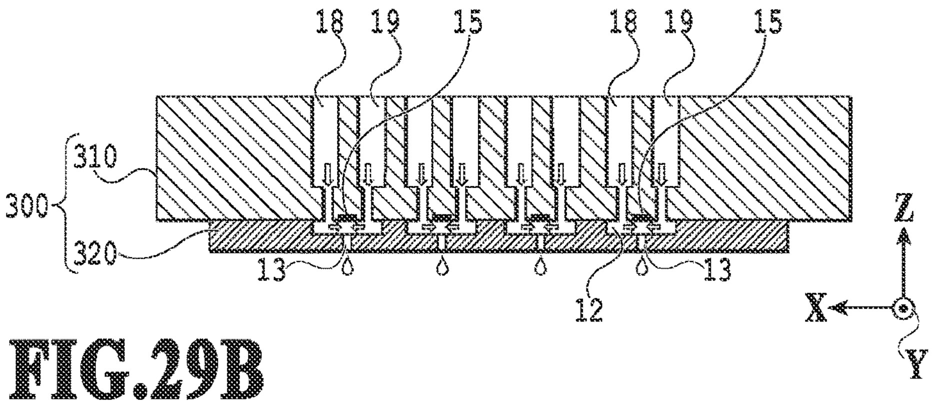

FIGS. 28A and 28B and FIGS. 29A and 29B are views schematically illustrating circulation paths in a second modification. FIGS. 28A and 28B illustrate the circulation paths in a case of performing circulation without performing ejection. FIGS. 29A and 29B illustrate the circulation paths in a case of performing high-duty printing. The second modification represents an example in which the second pressure adjustment unit 150 is not disposed, the bypass channel 160 and the collection channel 140 are directly connected to each other, and a relief valve 2301 is disposed in the bypass channel 160.

The relief valve 2301 is configured such that the ink flows into the relief valve from the upstream side toward the downstream side of the relief valve in a case where the pressure downstream of the relief valve reaches a predetermined value or less. Specifically, the relief valve is configured to open in a case where the pressure on the collection channel side of the relief valve becomes lower than the pressure on the supply channel side of the relief valve to a predetermined degree or more. The flow of the ink to be supplied is basically the same as that in a configuration in which the second pressure adjustment unit 150 is disposed as illustrated in FIG. 5. The differential pressure between the controlled pressure in the first pressure control chamber 122 and the controlled pressure in the relief valve 2301 determines the amount of circulation within the ejection module 300. The controlled pressure in the relief valve 2301 is set to obtain an amount of circulation that can suppress thickening of the ink in the vicinity of the ejection ports 13 in the ejection module 300.

With the configuration of the second modification too, in a case of performing a high-duty print operation, an ink is supplied to each pressure chamber 12 from both sides, as illustrated in FIGS. 29A and 29B. Specifically, the ink supplied to the supply channel 130 from the first pressure control chamber 122 is supplied to the ejection ports 13 through the common supply channels 18 in the ejection module 300. On the other hand, part of the ink supplied to the bypass channel 160 from the first pressure control chamber 122 passes through the relief valve 2301 and is supplied to the first pressure control chamber 122 through the circulation pump 500 and the pump outlet channel 180. Also, part of the ink supplied to the bypass channel 160 passes through the relief valve 2301, is supplied to the collection channel 140, and is then supplied to the ejection ports 13 through the common collection channels 19 in the ejection module 300. Thus, the ink to be ejected from the ejection ports 13 is supplied from both the supply channel 130 and the collection channel 140.

Also, even in a case where there is only one pressure adjustment unit as described above, the ink can be circulated through the circulation path in response to movement of the carriage in the scanning direction.

Third Modification

Figure 30:
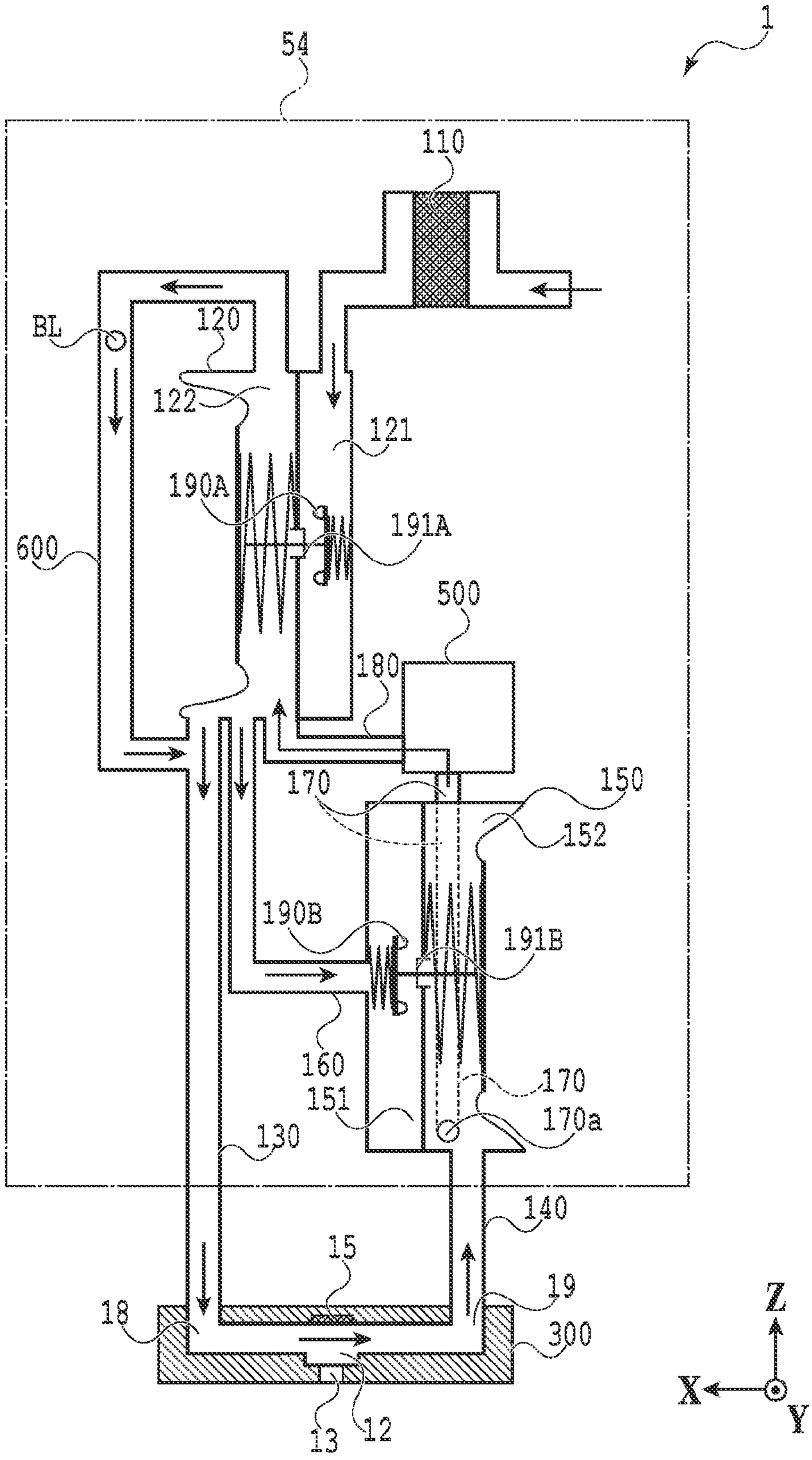
FIG. 30 is a view schematically illustrating a circulation path.

FIG. 30 is a view schematically illustrating a circulation path in a third modification. The third modification represents an example in which a second supply channel 600 is included through which the first pressure control chamber 122 of the first pressure adjustment unit 120 and the supply channel 130 communicate with each other.

The second supply channel 600 communicates at its one end portion with an upper end portion of the first pressure control chamber 122 in the direction of gravity, and communicates at its other end portion with an upper end portion of the supply channel 130 in the direction of gravity. By including this second supply channel 600, bubbles having flowed into the first pressure adjustment unit 120 from the upstream side or bubbles generated inside the circulation channel are efficiently discharged to the outside.

Specifically, the first pressure control chamber 122 of the first pressure adjustment unit 120 is disposed on an upper side in the liquid ejection head 1 in the direction of gravity. Thus, bubbles BL having flowed into the first pressure adjustment unit 120 along with the ink from the upstream side of the liquid ejection head 1 or bubbles BL having flowed into the first pressure control chamber 122 from the circulation channel ascend to an upper portion of the first pressure control chamber 122 or an upper portion of the second supply channel 600 and are gathered there. Note that the gathered bubbles BL do not move to the ejection module 300 at the flow velocity of the liquid flowing through the supply channel 130 and the second supply channel 600 during an ink ejection operation.

The bubbles BL gathered in the upper portions of the first pressure control chamber 122 and the second supply channel 600 can be discharged along with the ink by performing a suction process of forcibly sucking the ink from the ejection ports in a state where no liquid ejection operation is performed. The suction process is performed by bringing the cap member into tight contact with the ejection port surface of the liquid ejection head 1, in which the ejection ports are formed, and applying a negative pressure to the ejection ports from a negative pressure source connected to the cap member to thereby forcibly suck the ink from the ejection ports. The flow velocity of the ink generated inside the channels during this suction is higher than the flow velocity of the ink generated by a normal ink ejection operation. Hence, the bubbles BL gathered in the upper portions of the first pressure control chamber 122 and the second supply channel 600 move along with the ink to the pressure chambers 12 through the second supply channel 600 and the supply channel 130, and are then discharged from the ejection ports 13 along with the ink. Note that this suction process is generally executed in a suction recovery process which is performed by discharging a thickened ink and the like appearing in the ejection ports, the pressure chambers, or the like from the ejection ports to recover the ejection performance, an initial filling process of filling the ink into the channels, or the like.

As described above, by forming the second supply channel, bubbles included in the ink within the liquid ejection head 1 can be gathered and discharged at once by the suction process. Thus, a process of discharging bubbles can be performed efficiently.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-080993, filed May 17, 2022, which is hereby incorporated by reference herein in its entirety.

What is claimed is:

1. A liquid ejection head for ejecting a liquid while being scanned in a main scanning direction, comprising:

an ejection element configured to generate a pressure for ejecting the liquid in a pressure chamber;

a supply channel through which the liquid is supplied to the pressure chamber;

a collection channel connected to the supply channel through the pressure chamber and through which the liquid is collected from the pressure chamber;

a circulation pump capable of supplying the liquid from the supply channel into the pressure chamber, and collecting the liquid in the pressure chamber through the collection channel and sending the liquid to the supply channel;

a first pressure adjustment unit disposed between an outlet channel of the circulation pump and the supply channel and configured to adjust a pressure in the supply channel;

a second pressure adjustment unit disposed between an inlet channel of the circulation pump and the collection channel and configured to adjust a pressure in the collection channel; and a bypass channel through which the first pressure adjustment unit and the second pressure adjustment unit communicate with each other, wherein at least one of the first pressure adjustment unit or the second pressure adjustment unit is configured such that pressures with different signs relative to a pressure at rest are generated in response to a forward scan and a backward scan in the main scanning direction.

2. The liquid ejection head according to claim 1, wherein both of the first pressure adjustment unit and the second pressure adjustment unit are configured such that pressures with different signs relative to the pressure at rest are generated in response to a forward scan and a backward scan in the main scanning direction, and both of the first pressure adjustment unit and the second pressure adjustment unit are configured such that a negative pressure is generated in the second pressure adjustment unit relative to the pressure at rest in a case in which a positive pressure is generated in the first pressure adjustment unit relative to the pressure at rest in response to a scan in the main scanning direction.

3. The liquid ejection head according to claim 2, wherein the first pressure adjustment unit and the second pressure adjustment unit each include:

a valve chamber, a pressure control chamber, an opening through which the valve chamber and the pressure control chamber communicate with each other, and a valve configured to be capable of opening and closing the opening, a surface of the pressure control chamber is formed of a flexible member configured to be displaceable, the pressure control chamber includes:

a pressing plate capable of being displaced in conjunction with the flexible member, and a biasing member configured to bias the pressing plate in a direction in which a volume of the pressure control chamber increases, the pressure control chamber is configured to be capable of opening and closing the valve according to displacement of the pressing plate and the flexible member, the direction in which the biasing member biases the pressing plate corresponds to the main scanning direction, and the first pressure adjustment unit and the second pressure adjustment unit are configured such that the direction in which the biasing member of the first pressure adjustment unit biases the pressing plate of the first pressure adjustment unit is opposite to the direction in which the biasing member of the second pressure adjustment unit biases the pressing plate of the second pressure adjustment unit.

4. The liquid ejection head according to claim 3, wherein the displaceable pressing plates of the first pressure adjustment unit and the second pressure adjustment unit are disposed so as to be opposed in the main scanning direction.

5. The liquid ejection head according to claim 3, wherein the pressure control chambers of the first pressure adjustment unit and the second pressure adjustment unit are capable of contracting and expanding insides of the pressure control chambers with inertial forces in a case in which the liquid ejection head is scanned forward and backward in the main scanning direction.

6. The liquid ejection head according to claim 3, wherein the pressure control chambers of the first pressure adjustment unit and the second pressure adjustment unit each have a spring with a different spring characteristic as the biasing member.

7. The liquid ejection head according to claim 1, wherein at least one of the first pressure adjustment unit or the second pressure adjustment unit includes:

a valve chamber, a pressure control chamber, an opening through which the valve chamber and the pressure control chamber communicate with each other, and a valve configured to be capable of opening and closing the opening, a surface of the pressure control chamber is formed of a flexible member configured to be displaceable, the pressure control chamber includes:

a pressing plate capable of being displaced in conjunction with the flexible member, and a biasing member configured to bias the pressing plate in a direction in which a volume of the pressure control chamber increases, the pressure control chamber is configured to be capable of opening and closing the valve according to displacement of the pressing plate and the flexible member, and the direction in which the biasing member biases the pressing plate corresponds to the main scanning direction.

8. The liquid ejection head according to claim 7, wherein the bypass channel is connected to the valve chamber of the second pressure adjustment unit.

9. The liquid ejection head according to claim 7, wherein the outlet channel of the circulation pump is connected to the pressure control chamber of the first pressure adjustment unit.

10. The liquid ejection head according to claim 7, wherein the pressure control chamber of the second pressure adjustment unit is connected to the inlet channel of the circulation pump.

11. The liquid ejection head according to claim 7, further comprising a second supply channel through which the liquid is supplied to the liquid ejection head, wherein the outlet channel of the circulation pump is connected to the pressure control chamber of the first pressure adjustment unit.

12. The liquid ejection head according to claim 1, wherein the first pressure adjustment unit is connected to the second pressure adjustment unit through the pressure chamber, and the bypass channel communicates with an upstream side of the pressure chamber and a downstream side of the pressure chamber.

13. A liquid ejection head for ejecting a liquid while being scanned in a main scanning direction, comprising:

an ejection element configured to generate a pressure for ejecting the liquid in a pressure chamber;

a supply channel through which the liquid is supplied to the pressure chamber;

a collection channel connected to the supply channel through the pressure chamber and through which the liquid is collected from the pressure chamber;

a circulation pump capable of supplying the liquid from the supply channel into the pressure chamber, and collecting the liquid in the pressure chamber through the collection channel and sending the liquid to the supply channel;

a pressure adjustment unit disposed between an outlet channel of the circulation pump and the supply channel and configured to adjust a pressure in the supply channel; and a bypass channel through which the pressure adjustment unit and the collection channel communicate with each other, wherein the pressure adjustment unit is configured such that pressures with different signs relative to a pressure at rest are generated in response to a forward scan and a backward scan in the main scanning direction.

14. The liquid ejection head according to claim 13, wherein flow resistance of the bypass channel is set such that a flow velocity of the liquid in the pressure chamber is a predetermined flow velocity or more in a state in which the circulation pump is driven, thereby circulating the liquid through the pressure chamber.

15. The liquid ejection head according to claim 13, further comprising a relief valve disposed in the bypass channel, wherein the relief valve is configured to open in a case in which a pressure of the collection channel side of the relief valve becomes lower than a pressure of the supply channel side of the relief valve to a predetermined degree or more.

16. A liquid ejection apparatus comprising:

an ink tank; and a pump configured to supply a liquid from the ink tank to a liquid ejection head, wherein the liquid ejection head is a liquid ejection head for ejecting the liquid while being scanned in a main scanning direction, and includes:

an ejection element configured to generate a pressure for ejecting the liquid in a pressure chamber;

a supply channel through which the liquid is supplied to the pressure chamber;

a collection channel connected to the supply channel through the pressure chamber and through which the liquid is collected from the pressure chamber;

a circulation pump capable of supplying the liquid from the supply channel into the pressure chamber, and collecting the liquid in the pressure chamber through the collection channel and sending the liquid to the supply channel;

a first pressure adjustment unit disposed between an outlet channel of the circulation pump and the supply channel and configured to adjust a pressure in the supply channel;

a second pressure adjustment unit disposed between an inlet channel of the circulation pump and the collection channel and configured to adjust a pressure in the collection channel; and a bypass channel through which the first pressure adjustment unit and the second pressure adjustment unit communicate with each other, and at least one of the first pressure adjustment unit or the second pressure adjustment unit is configured such that pressures with different signs relative to a pressure at rest are generated in response to a forward scan and a backward scan in the main scanning direction.

* * * * *